US010332072B2

(12) United States Patent
Feely et al.

(10) Patent No.: US 10,332,072 B2
(45) Date of Patent: Jun. 25, 2019

(54) METHOD, COMPUTER READABLE MEDIUM, AND APPARATUS FOR CONSTRUCTING A CASE MANAGEMENT SYSTEM

(75) Inventors: Kathleen Feely, New York, NY (US); Nicole Tecco Reece, Brooklyn, NY (US); Arthur Chang, Brooklyn, NY (US); William Anderson, Brooklyn, NY (US); Andrea L. Hollen, Baltimore, MD (US); James Lindstrom, New York, NY (US)

(73) Assignee: Case Commons, Inc., New York, NY (US)

( * ) Notice: Subject to any disclaimer, the term of this patent is extended or adjusted under 35 U.S.C. 154(b) by 787 days.

(21) Appl. No.: 13/335,381

(22) Filed: Dec. 22, 2011

(65) Prior Publication Data

US 2012/0166206 A1   Jun. 28, 2012

Related U.S. Application Data

(60) Provisional application No. 61/426,778, filed on Dec. 23, 2010.

(51) Int. Cl.
*G06Q 10/10* (2012.01)
(52) U.S. Cl.
CPC .......... *G06Q 10/10* (2013.01); *G06Q 10/103* (2013.01)
(58) Field of Classification Search
CPC ....... G06Q 10/10; G06Q 50/24; G06F 19/322
See application file for complete search history.

(56) References Cited

U.S. PATENT DOCUMENTS

| 6,931,288 | B1* | 8/2005 | Lee et al. ................... 700/86 |
| 2003/0225761 | A1* | 12/2003 | Wagener et al. ............ 707/6 |
| 2004/0267569 | A1* | 12/2004 | Camp ............. G06Q 10/10 705/2 |
| 2005/0075917 | A1* | 4/2005 | Flores et al. ................ 705/8 |
| 2005/0108293 | A1* | 5/2005 | Lipman ........ G06F 17/30011 |
| 2007/0094039 | A1* | 4/2007 | Grant et al. ................ 705/1 |
| 2007/0112713 | A1* | 5/2007 | Seaman et al. .......... 706/45 |
| 2008/0081653 | A1* | 4/2008 | Mock et al. ............. 455/518 |
| 2008/0154824 | A1* | 6/2008 | Weir et al. ................ 706/45 |
| 2010/0161662 | A1* | 6/2010 | Jonas ........... G06F 17/30539 707/780 |
| 2011/0173264 | A1* | 7/2011 | Kelly ........................ 709/205 |

OTHER PUBLICATIONS

"Child Protective Services: A Guide for Caseworkers", U.S. Dept. of Health and Human Services, 2003.*
Michael J. McGuffin, Ravin Balakrishnan. "Interactive Visualization of Genealogical Graphs." Proceedings of IEEE Symposium on Information Visualization (InfoViz) 2005.*

* cited by examiner

*Primary Examiner* — Julie M Shanker
(74) *Attorney, Agent, or Firm* — Sughrue Mion, PLLC

(57) ABSTRACT

A social welfare services management method, apparatus, and computer readable medium is provided. The method includes inputting data about entities, linking the entities based on relationship between the entities; and performing a government defined unit of work based on said linking. The government defined unit of work relates to the social welfare services. As a result, a people centric approach to managing social welfare is provided.

40 Claims, 42 Drawing Sheets

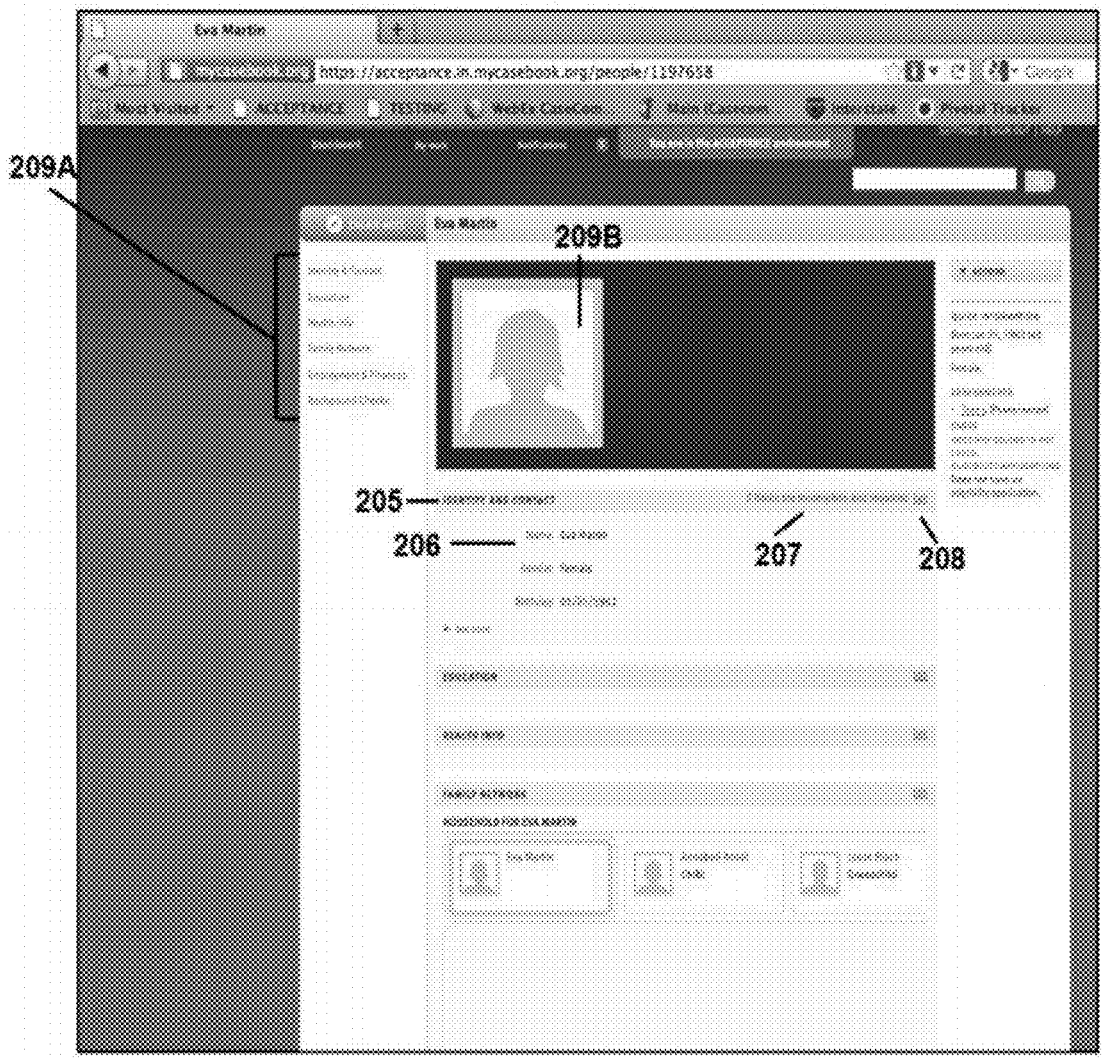

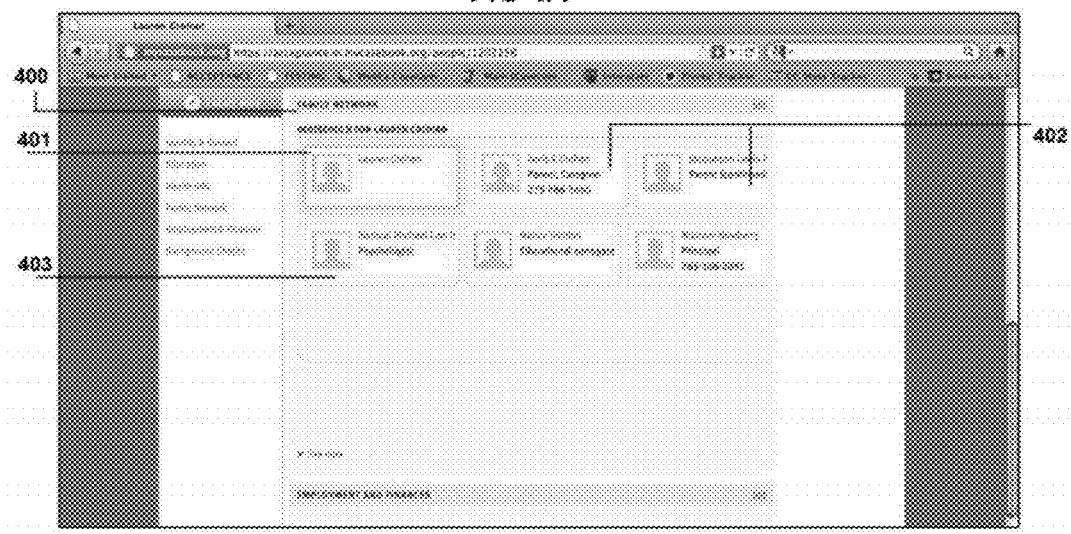

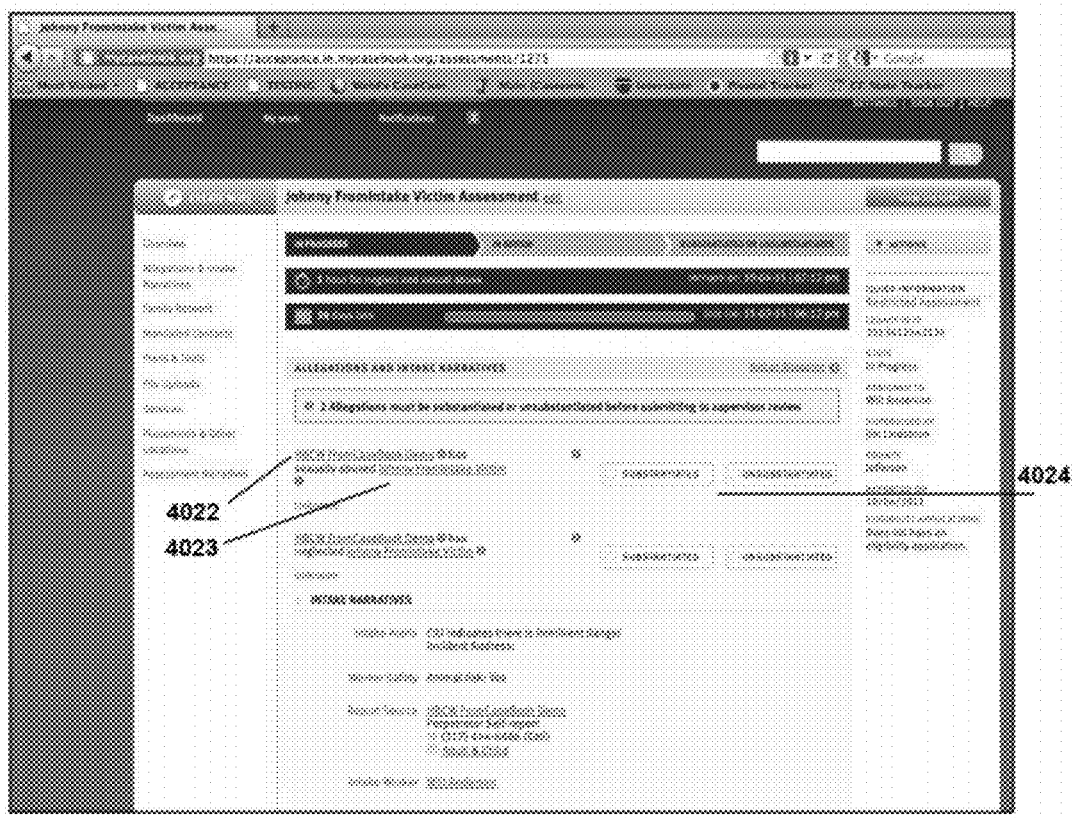

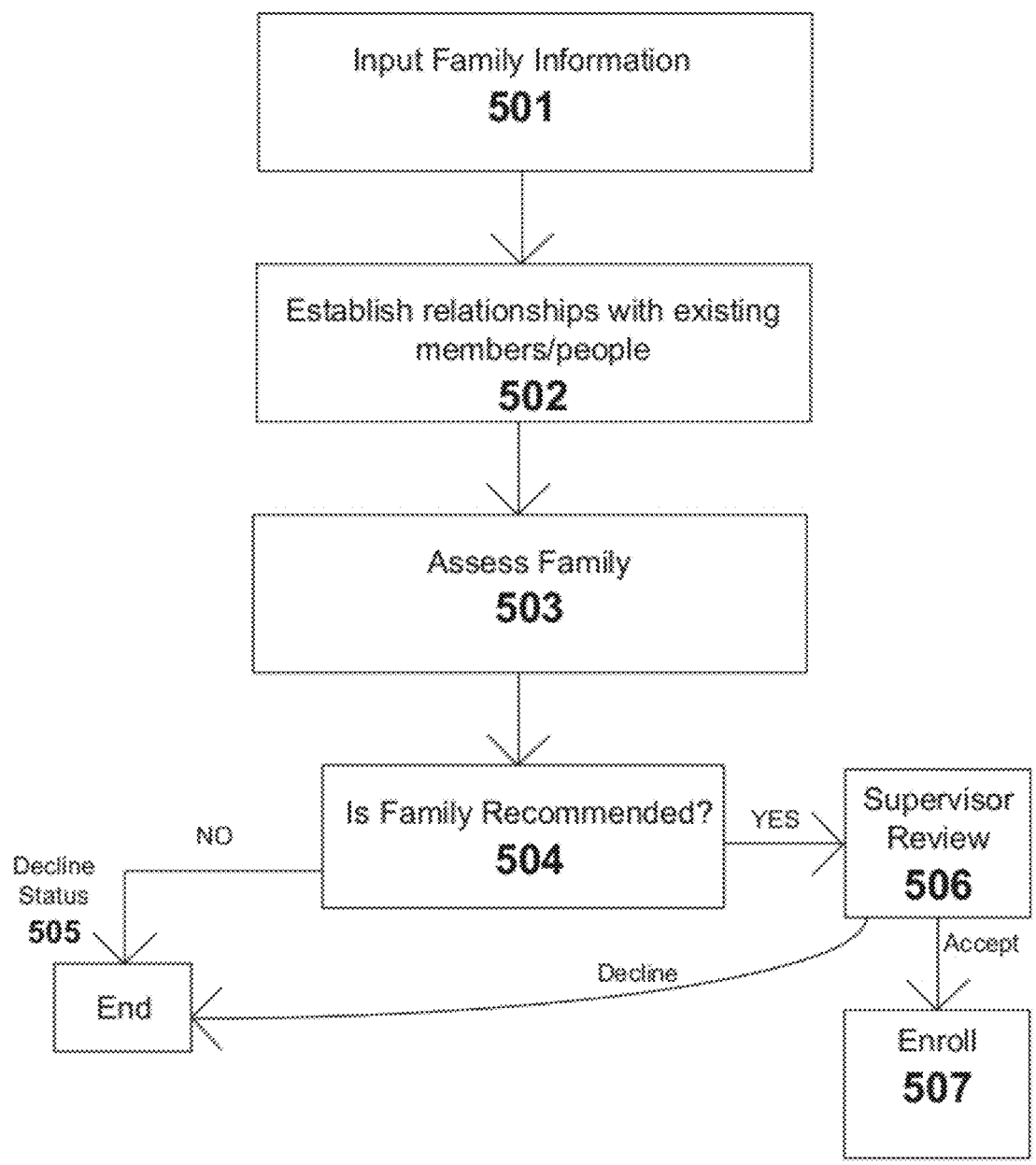

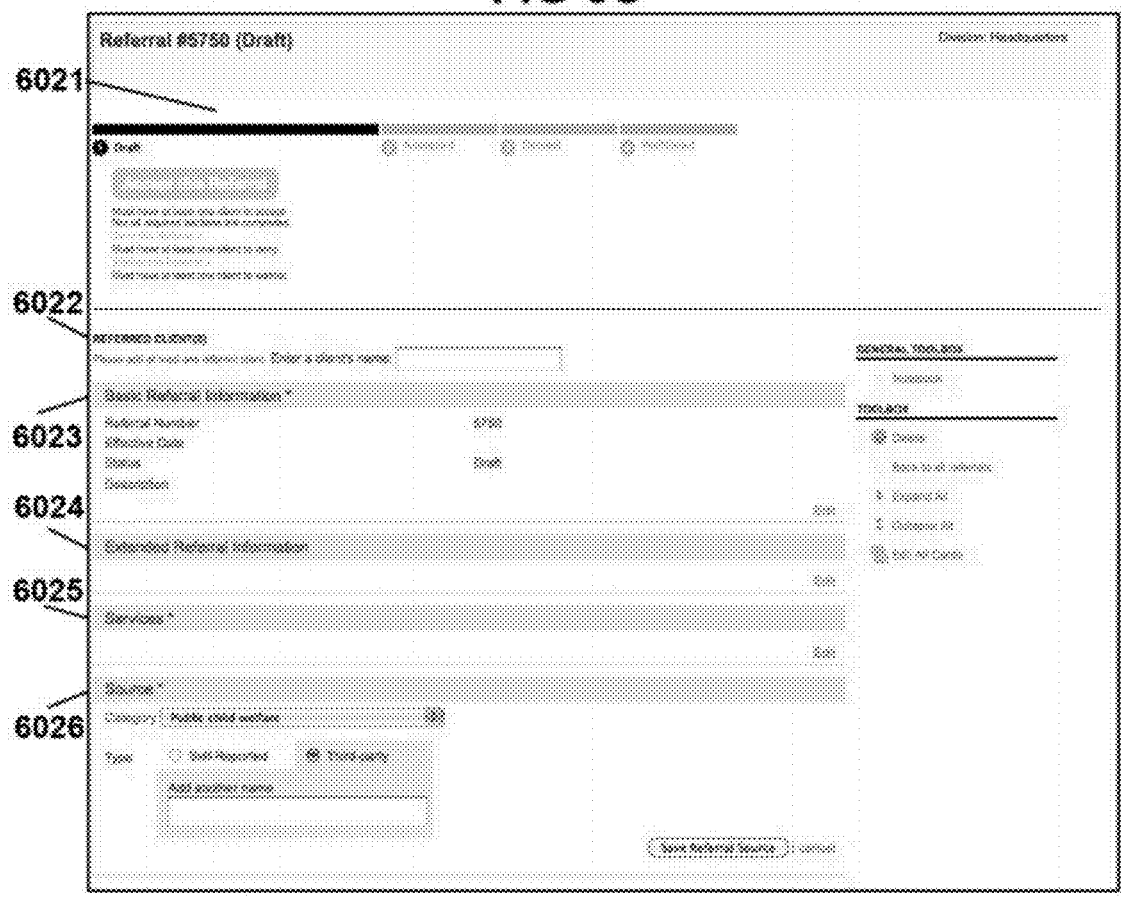

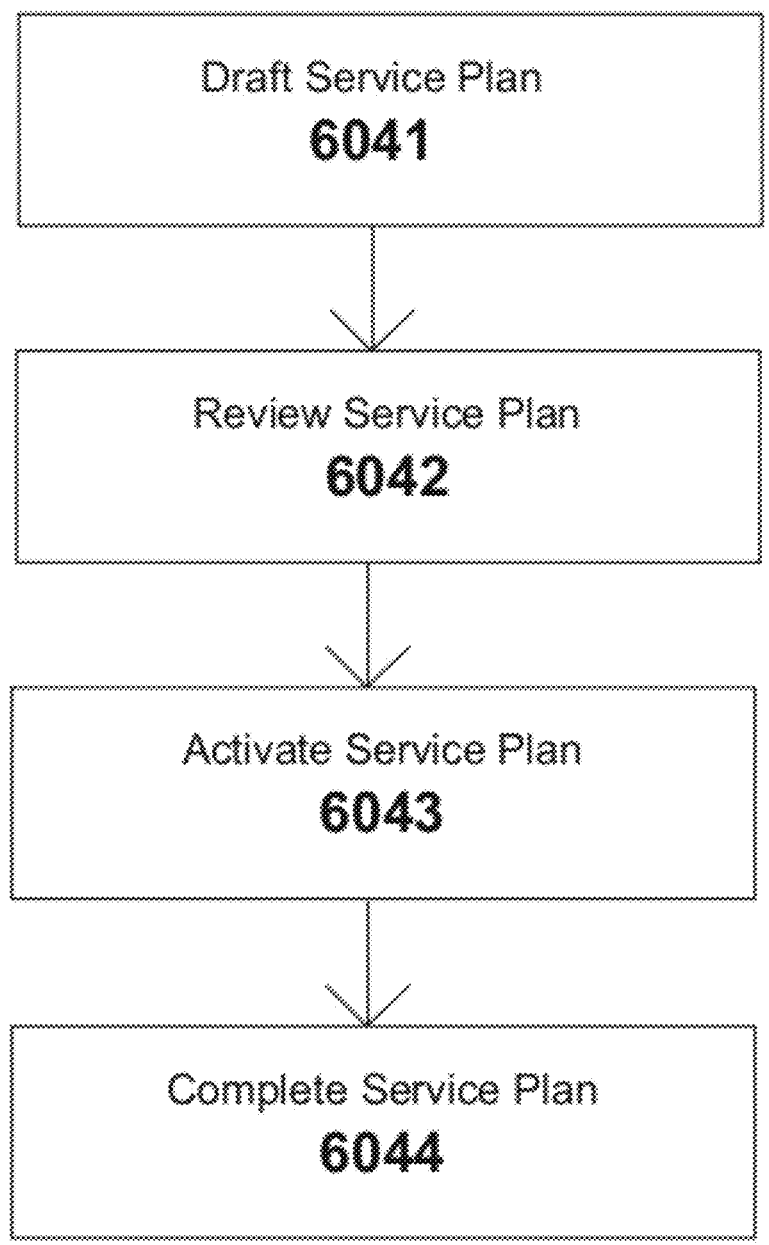

FIG 6F

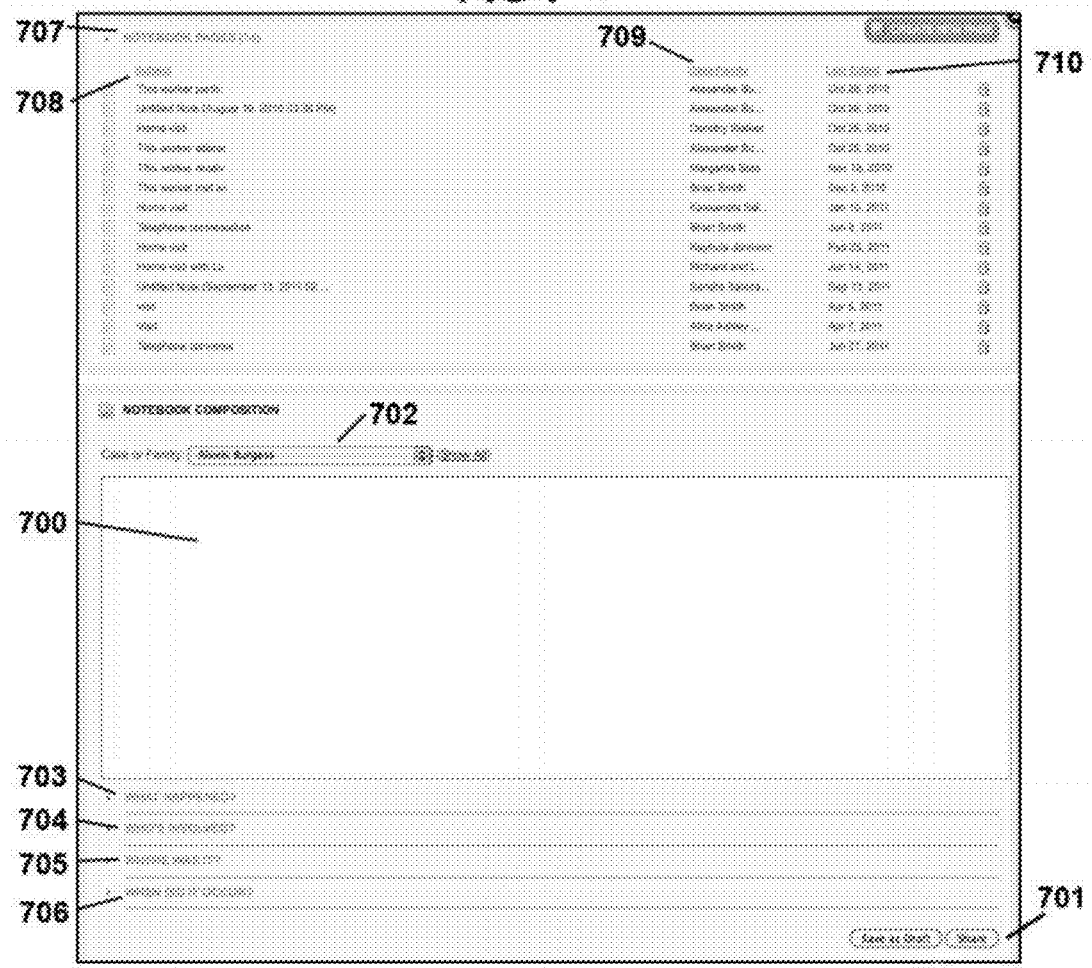

FIG 8A

Case Team

PRIMARY CASEWORKER

801 — Sophia Brown
- Title: Social Worker / Primary
- Email Address: sophiabrown@caseyfamilyservices.org
- Field Office
- Additional Information

SUPERVISOR

802 — Alexis Munson
- Title: Team Leader
- Email Address: amunson@caseyfamilyservices.org
- Field Office
- Additional Information

ASSOCIATES

803 — ADD A CONTRIBUTING TEAM MEMBER: [ ]

Ana Maria Vargas
- Title: Family Support Specialist
- Email Address: avargas@caseyfamilyservices.org
- Field Office
- Additional Information Kristina Stevens
- Title: Deputy Division Director
- Email Address: kstevens@caseyfamilyservices.org
- Field Office
- Additional Information Patrick Lyttle
- Title: Team Leader
- Email Address: plyttle@caseyfamilyservices.org
- Field Office
- Additional Information

FIG 8B

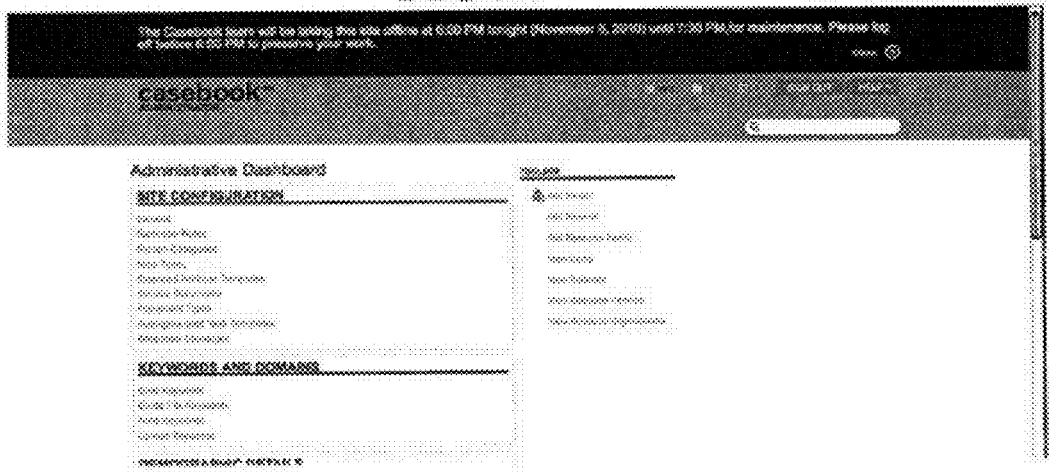

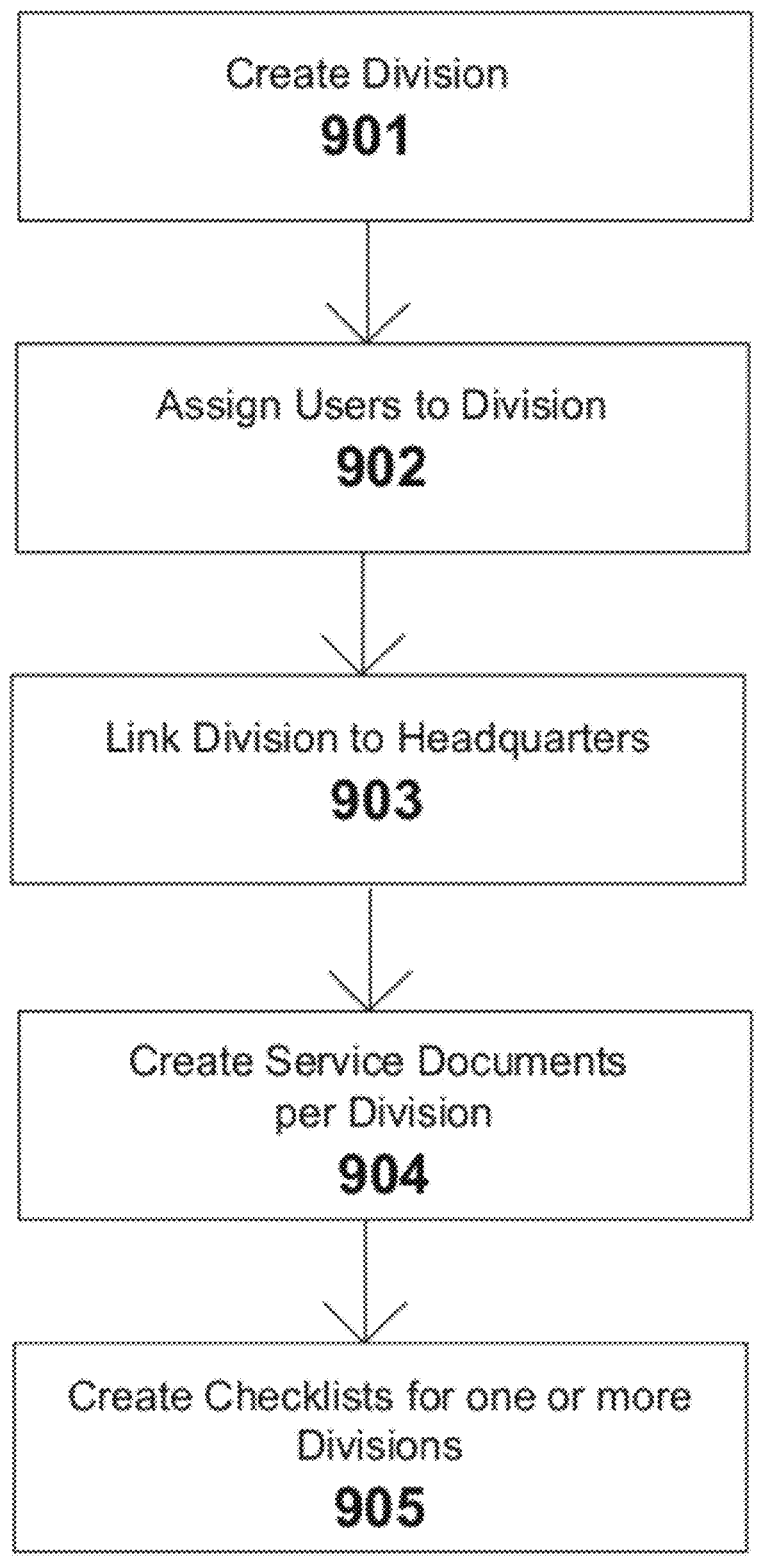

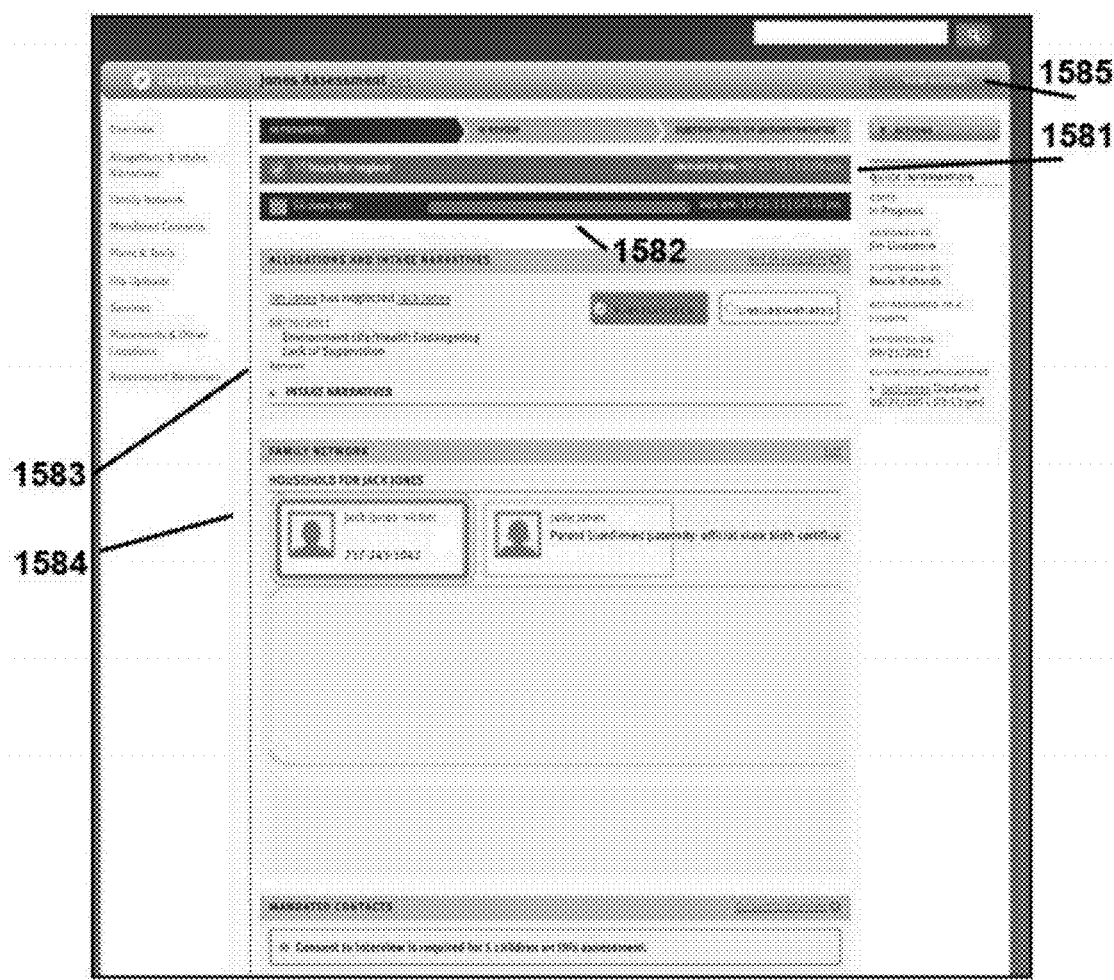

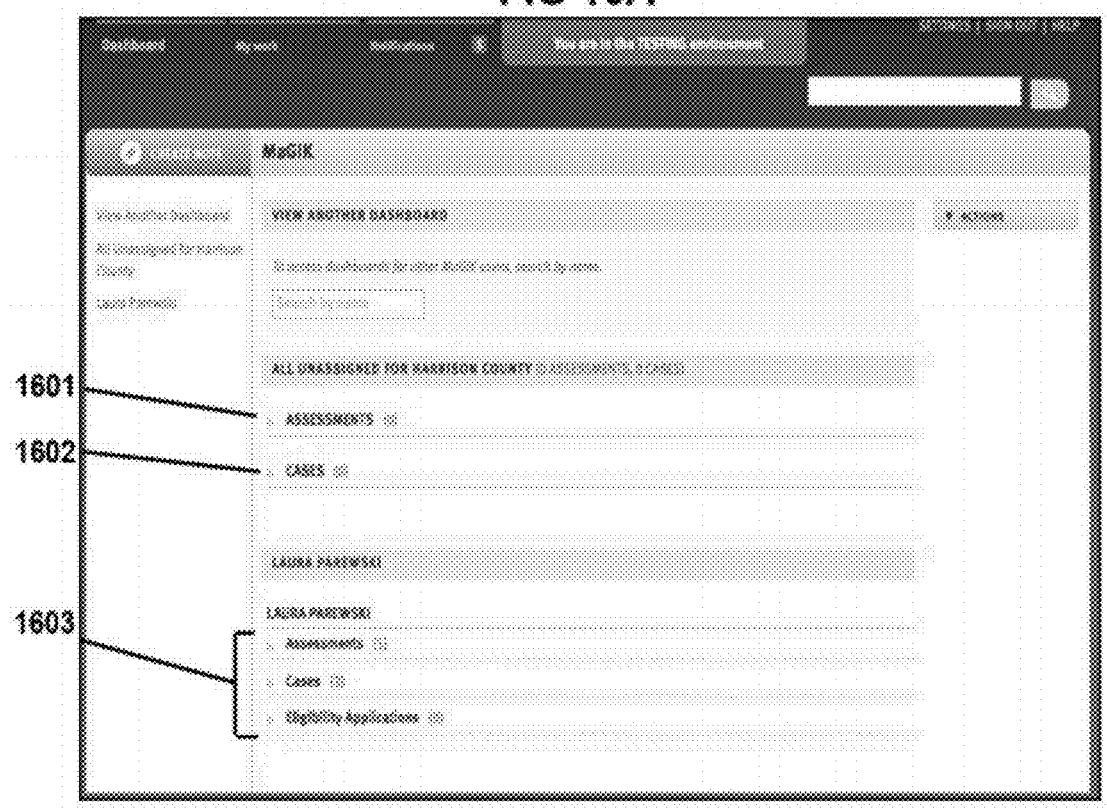

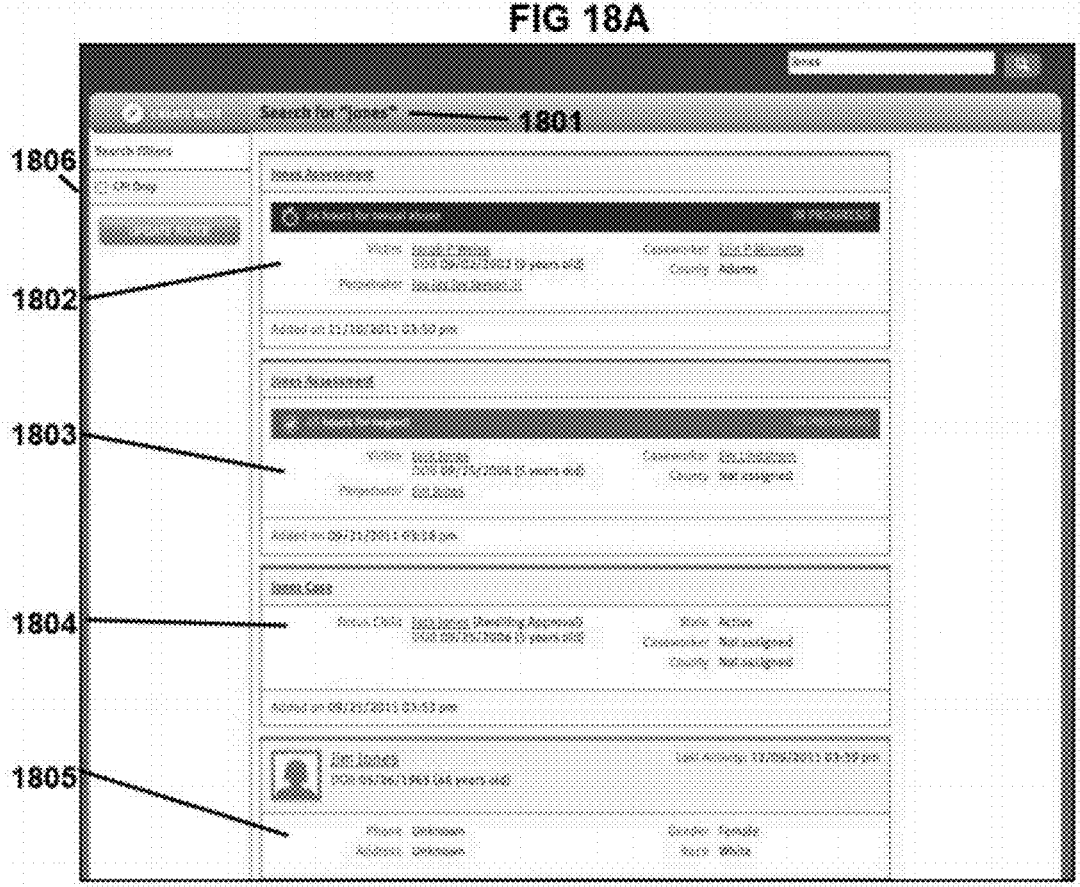

FIG 22

Table of Formal and Informal Relationships

| Formal Relationships | | Informal Relationship | |
|---|---|---|---|
| Case Worker | Supervisor | Baby sitter | Spiritual leader |
| Probation officer | Child care worker | Friend | Neighbor |
| Teacher | School counselor | Child care provider | Congregant |
| Principal | School Psychologist | | |
| CASA | Psychiatrist | | |
| School nurse | LCPA worker | | |
| Guardian ad-litum | Lawyer | | |
| Jurist | Doctor | | |
| Nurse | Eligibility worker | | |
| Group Home Staff | LCPA supervisor | | |
| School social worker | Counselor/therapy | | |

FIG 24

METHOD, COMPUTER READABLE MEDIUM, AND APPARATUS FOR CONSTRUCTING A CASE MANAGEMENT SYSTEM

CROSS-REFERENCE TO RELATED APPLICATION

This application claims benefit pursuant to 35 U.S.C. § 120 of the filing date of the Provisional Application Ser. No. 61/426,778 filed on Dec. 23, 2010 and titled "METHOD AND APPARATUS FOR CONSTRUCTING A CASE MANAGEMENT SYSTEM," which is incorporated herein by reference for all that it discloses.

BACKGROUND

1. Field

Apparatuses, methods, and computer readable mediums consistent with exemplary embodiments relate to a case management system, and more specifically, to management of data organized around an individual or a group of individuals.

2. Description of the Related Art

The administration of child welfare services is an extremely data intensive task. Providers of child welfare services must keep accurate and precise records of the recipients and of their services not only for the purpose of tracking the wellbeing of and making critical decisions about children's futures, but also to ensure effective resource management for the labor-intensive task of providing welfare services.

In recognition of this two-pronged need for detailed, data-driven administration of child welfare services, and in response to changes in modern technology, as a part of the 1993 Omnibus Budget Reconciliation Act, Congress enacted the Statewide Automated Child Welfare Information Systems (SACWIS) protocol. If any given State complies with the data-monitoring requirements of SACWIS, it receives substantial subsidies for the administration of its welfare services. As explained by the U.S. Department of Health and Human Services:

If a State elects to implement a SACWIS, the system is expected to be a comprehensive automated case management tool that meets the needs of all staff (including social workers and their supervisors, whether employed by the State, county, or contracted private providers) involved in foster care and adoptions assistance case management. SACWIS funding is available for development, implementation and operational costs. SACWIS funding is also available for SACWIS user-training services and SACWIS equipment costs for all staff (including private providers) to use the system.

In exchange for the additional funding provided to a State that elects to implement a SACWIS, the State must agree that the SACWIS will be the sole case management automation tool used by all public and private social workers responsible for case management activities. Furthermore, staff are expected to enter all case management information into SACWIS so it holds a State's "official case record"—a complete, current, accurate, and unified case management history on all children and families served by the Title IV-B/IV-E State agency. By law, a SACWIS is required to support the reporting of data to the Adoption and Foster Care Analysis Reporting System (AFCARS) and the National Child Abuse and Neglect Data System (NCANDS). Furthermore, a SACWIS is expected to have bi-directional interfaces with a State's Title IV-A (Temporary Assistance for Needy Families), Title XIX (Medicaid), and Title IV-D (Child Support) systems.

SACWIS systems must also collect and manage the information necessary to facilitate the delivery of child welfare support services, including family support and family preservation. States are encouraged to add complementary functionality to their SACWIS, such as functionality that supports child protective services, thereby providing a unified automated tool to support all child welfare services. States may incorporate other programs into a SACWIS (such as TANF emergency assistance, juvenile justice, mental health, and adult protective services) or provide access for other human service professionals (such as family courts, schools, medical providers, and providers of services to stabilize families and ensure child well-being).

Currently, most States and the District of Columbia are at some stage of SACWIS planning, development, implementation, or operations.

Accordingly, many States have attempted to develop information system solutions that meet the SACWIS standards, though few have reached full compliance. However, in the seventeen years which have passed since the implementation of SACWIS, much of the software that has been developed to comply with the SACWIS standards—though such software represented a significant step forward at the time of development—has evolved into a series of inefficient legacy systems, based on outdated data models and old to obsolete hardware. In fact, in some instances, social workers spend more time entering information into dated SACWIS systems than they actually spend providing direct support of the children and families they help.

In the time since the original SACWIS systems have been built, both the development processes and operational models of enterprise software have changed dramatically. Critically, the development of Web 2.0, robust open-source rapid development platforms, cloud-based computing and the arrival of commercial software-as-a-service ("SaaS") solutions have created an environment wherein vastly more efficient and flexible child welfare information systems may be developed. These changes have enabled the development of child welfare information systems that feature not only a substantial reduction in the administrative burden in the implementation of such systems, but also, based on social networking models, include more finely tuned and robust case management software and analytic tools.

SUMMARY

According to exemplary, non-limiting embodiments, a family case management system is established. A family case management application is built using an entity oriented model where the system is organized around an entity or group of entities. The case management application may be built using any combination of data models such as a social networking data model, a hierarchical data model, and a relational data model. In the case management application, a service plan is built, administered, and monitored via a network view of persons, relationships and groups of persons.

According to an aspect of an exemplary embodiment, a social welfare services management method is provided. The method includes: inputting data about entities; linking the entities based on relationship between the entities; and performing a government defined unit of work based on said linking. The government defined unit of work relates to the social welfare services.

According to another aspect of an exemplary embodiment, a case management method is provided. The case management method includes storing information related to social welfare, linking said input information to a case; and managing the case based on the linked information. The managing includes at least one of generating a service plan to be implemented in the case.

According to yet another aspect of an exemplary embodiment, a social welfare services management apparatus is provided. This apparatus includes a memory storing software instructions and a processor executing the software instructions. The software instructions include receiving data about entities; linking the entities based on relationship between the entities; and performing a government defined unit of work based on said linking. The government defined unit of work relates to the social welfare services.

BRIEF DESCRIPTION OF THE DRAWINGS

The accompanying drawings, which are incorporated in and constitute a part of this specification exemplify the exemplary embodiments and, together with the description, serve to explain and illustrate exemplary embodiments. Specifically:

FIGS. 2A-2E are views illustrating various attributes of the people element according to an exemplary embodiment.

FIGS. 4A-4C are views illustrating relationships attribute of the people element according to an exemplary embodiment.

FIGS. 5A-5D are a flowchart and views illustrating the resource family element according to an exemplary embodiment. Specifically, FIG. 5A is a flowchart illustrating a process of generating a resource family according to an exemplary embodiment. FIG. 5B is a view illustrating attributes of a generated resource family element according to an exemplary embodiment. FIG. 5C is a view illustrating attribute family licenses and approvals of the generated resource family according to an exemplary embodiment. FIG. 5D is a view illustrating adding a license to a generated resource family according to an exemplary embodiment.

FIGS. 6A-6F are views and flowcharts illustrating the case element according to an exemplary embodiment. Specifically, FIG. 6A is a view illustrating the case element according to an exemplary embodiment. FIG. 6B is a flowchart illustrating workflow states of a case according to an exemplary embodiment. FIG. 6C is a view illustrating workflow of a referral for a case according to an exemplary embodiment. FIG. 6D is a view illustrating a service plan of a case element according to an exemplary embodiment. FIG. 6E is a flowchart illustrating workflow of the service plan according to an exemplary embodiment. FIG. 6F is a view illustrating service documents of the case element according to an exemplary embodiment.

FIG. 7 is a view illustrating notes attribute according to an exemplary embodiment.

FIGS. 8A-8F are views illustrating attributes of the case element according to an exemplary embodiment. Specifically, FIG. 8A is a view illustrating case members attribute of the case element according to an exemplary embodiment. FIG. 8B is a view illustrating case network attribute of the case element according to an exemplary embodiment. FIG. 8C is a view illustrating auto generating tasks according to an exemplary embodiment. FIG. 8D is a view illustrating generating tasks by a user according to an exemplary embodiment. FIG. 8E is a view illustrating a planned page according to an exemplary embodiment. 8F is a view illustrating case log attribute of the case element according to an exemplary embodiment.

FIGS. 9A-9B are views illustrating communication within the case management system according to an example embodiment. Specifically, FIG. 9A is a view showing broadcast messages according to an exemplary embodiment. FIG. 9B is a view illustrating an exemplary broadcast message that appears on a configuration screen for a super administrator according to an exemplary embodiment.

FIG. 10 is a flowchart illustrating generating a division of a PO according to an exemplary embodiment.

FIGS. 11A and 11B are views of auditing logs according to an exemplary embodiment.

FIGS. 15A-15D are views and flowcharts illustrating exemplary state child welfare case management system according to an exemplary embodiment. In particular, FIG. 15A is a flow chart illustrating the life cycle of a case. FIG. 15B is a view illustrating an assessment interface according to an exemplary embodiment. FIG. 15C is a view illustrating assessment history interface according to an exemplary embodiment. FIG. 15D is a view illustrating an assessment interface according to another exemplary embodiment.

FIGS. 16A and 16B are views illustrating dashboard screens in a state child welfare case management system according to an exemplary embodiment.

FIGS. 18A-18B are views illustrating search results in a state child welfare case management system according to an exemplary embodiment. FIG. 18A is a view illustrating the results of a name search according to an exemplary embodiment. FIG. 18B is a view illustrating placement of a child search results according to an exemplary embodiment.

FIG. 22 is a table illustrating exemplary formal and informal relationships in a state child welfare case management system according to an exemplary embodiment.

FIG. 24 is a view illustrating new resource index in a state child welfare case management system according to an exemplary embodiment.

DETAILED DESCRIPTION OF EXEMPLARY EMBODIMENTS

Figure 1:
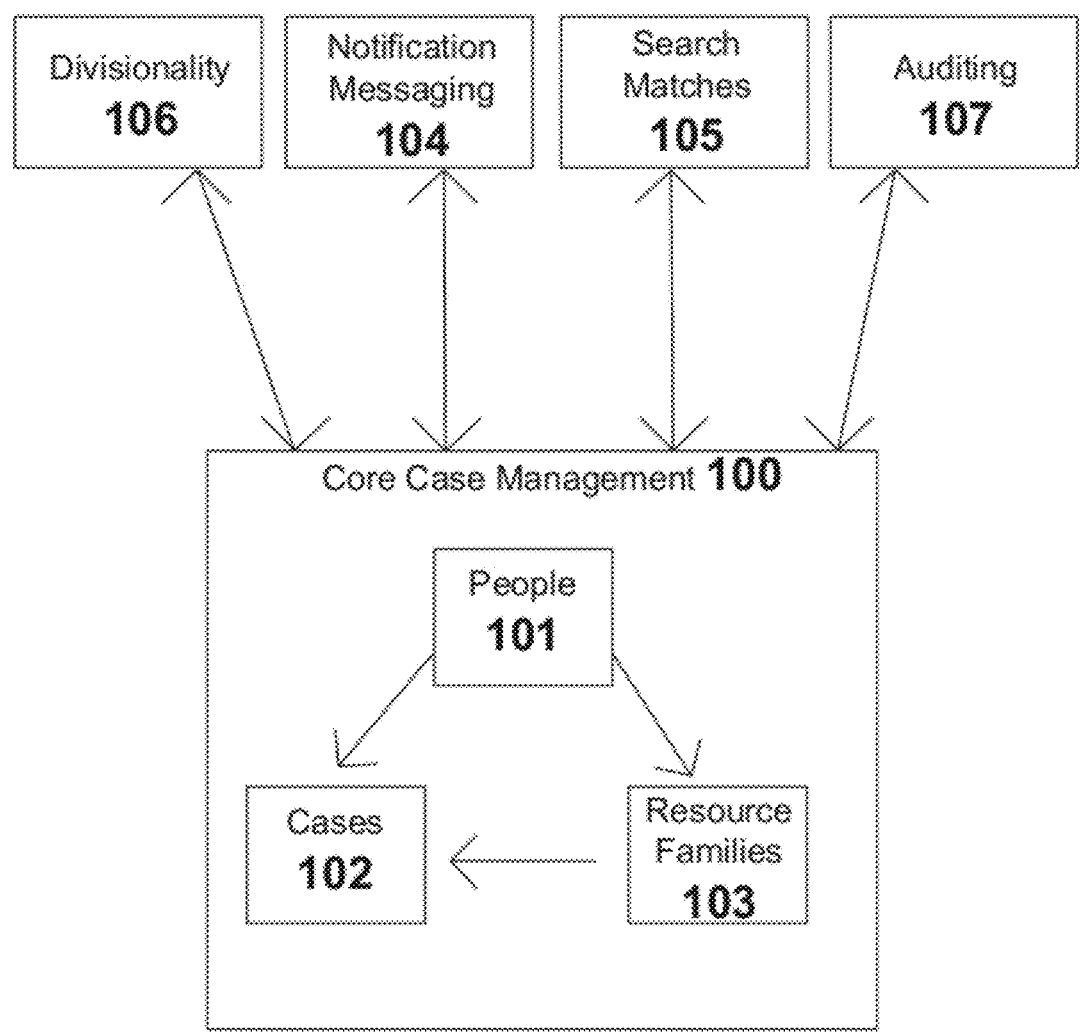
FIG. 1 is a block diagram illustrating a case management system according to an exemplary embodiment.

An exemplary embodiment describes a case management application built on and organized around entities of the network. A case is managed and organized using an entity oriented model such as a social networking data model, where a service plan and other work units are built, administered and monitored via a network view of persons, relationships and groups of persons. Unlike traditional case management software, the service plan created by an exemplary embodiment is fully aware of the support network for participants.

In an exemplary embodiment, the application is built upon a social networking platform that transcends the limitations of traditional case management systems by enabling a view of people over time beyond the scope of individual cases.

In an exemplary embodiment, access to near-real-time data for decision making by child welfare professionals is provided. An exemplary data management system is updated, in real-time, providing current view of the entities and data in the system.

In an exemplary embodiment, service plans are fully aware of the network for participants and family of participants.

In an exemplary embodiment, case management is configured to be able to actively focus user attention on a part of the support network that most needs user attention, triggered automatically i.e., using a pre-programmed or a user designated event, a response or a request.

In an exemplary embodiment, persistent history of persons, relationships, and groups in the network is provided.

In an exemplary embodiment, a fully longitudinal data model is provided.

In an exemplary embodiment, user access is configured to access a rich relationship history. Rich relationship definition protocols provide most social network groups being based on a "sign up" model, where group users actively sign up to groups based on shared interests. An exemplary embodiment allows for groups to be defined by a number of methods, including: groups defined by contextually sensitive relationship status (e.g. families, service providers, addresses, households); the relationship status of other parties (e.g. parent-child, caregiver-recipient, doctor-patient) being defined by a third party; a group without the input/approval of the members (e.g. by selecting a group of individuals to define as a group) is defined by a third party and is assigned attributes to that relationship. In an exemplary embodiment, contextually defined contacts are provided where individuals can have multiple roles depending on the relationship status in question.

In an exemplary embodiment, a system is provided with robust analytics. For example, analytics that are process driven and longitudinal, instead of existing as static-in-time data-points are provided. Analytics provide rich data to all levels of users, appropriate to the user level.

In an exemplary embodiment, real-time collaboration is enabled so two or more users can access and update the same documents and data elements simultaneously without interfering with or over-riding each other's work.

In an exemplary embodiment, a visual timeline of important person-related or family-related events is created automatically based on the actions and activities taken elsewhere in the system by any user associated with those persons and families.

In an exemplary embodiment, external users can be granted limited, secure access to a case to receive and send messages and files that can be transformed into case notes and can become part of the case/family record.

In an exemplary embodiment, a system is provided to enable a user to search for appropriate foster families for any youth based on a pre-determined set of selection criteria that match youth and family demographics and rank matches according to the criteria.

In an exemplary embodiment, a user is able to indicate when a foster family has been matched (or unmatched) with a particular youth and can indicate for all other users the status of the match for decision-making purposes.

In an exemplary embodiment, user friendly, flexible searches are provided in which relationships between people can be searched and obtained. When words are misspelled, close matches are provided.

In an exemplary embodiment, an audit log is created that captures each key stroke, data change and date stamps each action.

In an exemplary embodiment, an automated test suite that reviews and assesses the integrity and functionality of the entire code base is launched any time a line of code is added or edited to the application.

In an exemplary embodiment, an administrative dashboard that does not require programming skills or coding knowledge enables an authorized user to create forms, define demographics, add/edit/delete business rules and validations and perform additional configuration activities has been created.

In an exemplary embodiment, users move freely between screens and views without requiring any data to be supplied before making a leap to another part of the case. As a result, users only enter the information they know and are not forced to supply incorrect data to move forward and can do their work in a more natural flow. The system links data validation requirements to actions being taken rather than attaching validation to data fields. For example, a data element may not be a required field in the case until a user wants to submit a document for approval. At that time, the user will get notified of the requirement.

An exemplary case management system is described in greater detail below. A case management system may include one or more of the following components:
1) Core Case Management Elements
2) Additional Tools
3) Analytics Component
4) Hardware Components
5) An exemplary embodiment of a State child welfare Case Management System
6) Concluding Remarks Regarding an Exemplary Case Management System FIG. 1 is a view illustrating interworking between various components in the system. For example, as shown in FIG. 1, the core case management components 100 include people and all the corresponding attributes 101, cases and their attributes 102, and resource families 103 which include one or more people 101. Additional components include communication (notifications and messaging 104), searches and matches 105, divisionality 106, and auditing 107.

The system has three primary entities: person, group, and unit of work. People are the atomic unit of the application. The person record aggregates multiple sets of demographic data and associations with groups and units of work to provide an overall view of any person. People can be one or more of the following: internal staff, outside support staff (collaterals), relatives/kin, clients (youth, adults), and alleged/perpetrators of abuse. Units of work are the focus of a business process, such as: cases, assessments, licenses, enrollments, service referrals, eligibility assessments, and contracts.

A unit of work has the following characteristics: it has assigned staff (e.g., an ongoing case worker, an eligibility worker, etc.), it has associated people (e.g., license applicants), and it has attached work assets (e.g., checklists, tasks, documents, etc.). A group for case management is an organization, a family, a household, or an assistance group. Groups consist of one or more people. Families are flexible and can even be used to make arbitrary groupings of individuals, such as "the people that Johnny thinks of as his family, including fictive kin." Family groups can serve as assistance groups (for eligibility purposes) or household units (for licensing purposes). Groups have the following characteristics: they display a network of people that are contained within it, depending on a group's association with a work unit, it may: contain unique demographic sets (e.g., for eligibility, licensing), have links that archive its history of connections to units of work (e.g., cases, assessments, licensing applications).

Exemplary embodiments are described below. Also, additional toolkits and hardware in exemplary embodiments are provided. Exemplary analytics of the system are also explained. These descriptions are provided by way of examples only. These descriptions are not limitative and are intended only to provide examples of the case management system.

1. Core Case Management Elements

In an exemplary embodiment, core case management components include people, resource families, and cases. Also, an exemplary administration of the software is described as being one of the core components of the system.

People are an exemplary basic element of the core case management component. Because people transcend traditional case management silos (e.g., case silos or foster family silos), people only need to be created once and the demographic information associated with them never needs to be re-entered, just updated as new information becomes available or their circumstances change. People are a basic building block of a variety of other components such as families, cases, service providers, and so on. People and relationships among people is one of building blocks of the system. In an exemplary embodiment, information that is in some way related to a person is linked to that person. For example, information from multiple cases involving the person are linked to the person. A user of the system is able to see all cases the person was involved in. For example, the person may have been a perpetrator in several child abuse and neglect cases. As another example, the person may have been a resource family that provided housing in one case and may be a perpetrator in another case.

Figure 2A:

People element may have one or more of the following attributes as shown in FIG. 2A: information 200, history 2010, services 2030, relationships 2050, and service documents 2070.

Information attribute 200 may include identity information 201 that provides information such as name, gender, birth date, weight, height and so on, contact information 202 that provides information such as email address, telephone numbers, fax numbers and so on, addresses information 203 that provides various addresses for the person such as current, past, parent's address, school address, and so on, and relationship information 204 that provides status of the person as file active (current) in the system, for example. The relationship information 204 may further include emergency contacts. Each of these information attributes 200 may be edited in real time by a user by selecting an appropriate button for example.

Users may interact with the person autocompleter to find and add an existing person to a case, resource family, referral, or relationship. The autocompleter searches the Software's person index and allows the user to search for close matches based on sound-a-like technology and user-entered nicknames. If a person cannot be found, a user may add a new person to the Software's person index from the autocompleter.

Also, the system may indicate fields that are incomplete and require attention e.g., FIG. 2B. FIG. 2B is a view illustrating information attribute (identity and contact attribute) 205. As noted above, it includes general identity information 206 where an indicator is provided 207 indicating number of fields that require additional attention. When selecting to edit 208, these fields are emphasized so that the users can easily determine which fields are incomplete.

As illustrated in FIG. 2B, the people element may have different and/or additional attributes such as education information, health information, family network, and employment and finances 209A and other information such as legal information, physical description, and so on. Also, one or more images 209B may be associated with a person.

Exemplary people element can have many basic attributes along with specific demographic details that are configured per demographic group. The demographic groups can be client configurable categorizations that allow clients to specify which details are captured and revealed based on person roles. Some examples of current demographic groups include youth, other adults in the household, and foster parent demographic groups. Administrative users can identify and configure required demographic groups. Administrative users can define the demographic details that are configurable for each demographic group. Some basic information may be hard coded into the system and may not be changeable in order to comply with federal reporting or other requirements (e.g., the choices available for race). Others may be configurable by a super-administrator. Demographic details can be assigned to the appropriate demographic groups.

Figure 2C:
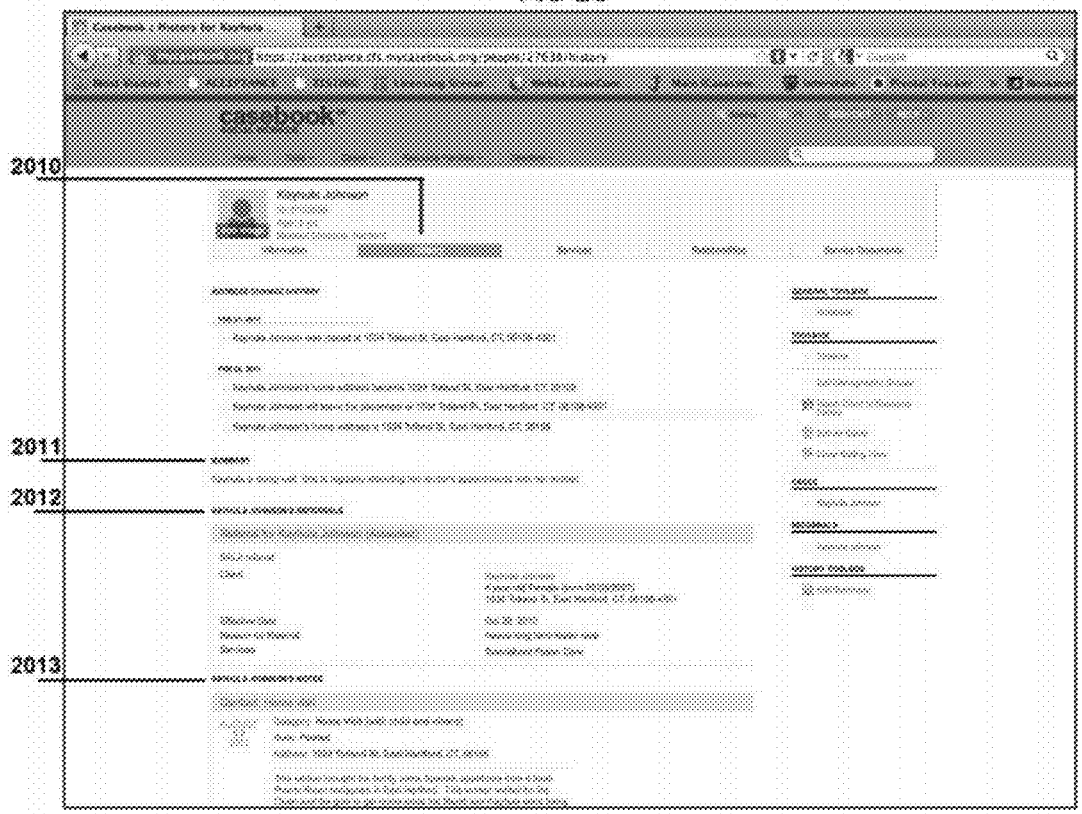

As actions are taken that reference/include particular people, the 'history' of the people involved in the actions is being build. FIG. 2C is a view illustrating exemplary history attribute according to an exemplary embodiment. The history attribute 2010 automatically consolidates information about a single person with a juxtaposed narrative summary completed by the caseworker 2011. The history attribute 2010 may include elements such as referrals 2012, placements (not shown), narrative summary 2011, and notes 2013.

Figure 2D:
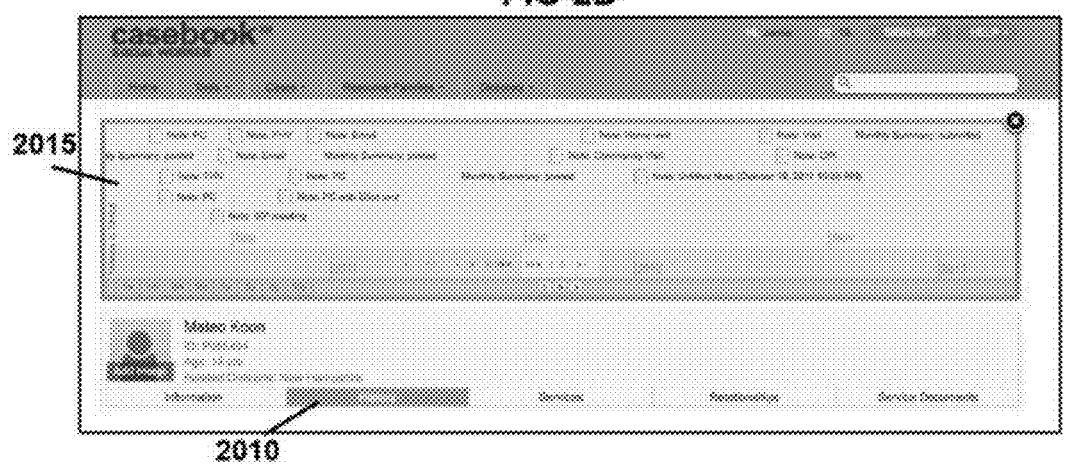
Figure 2E:
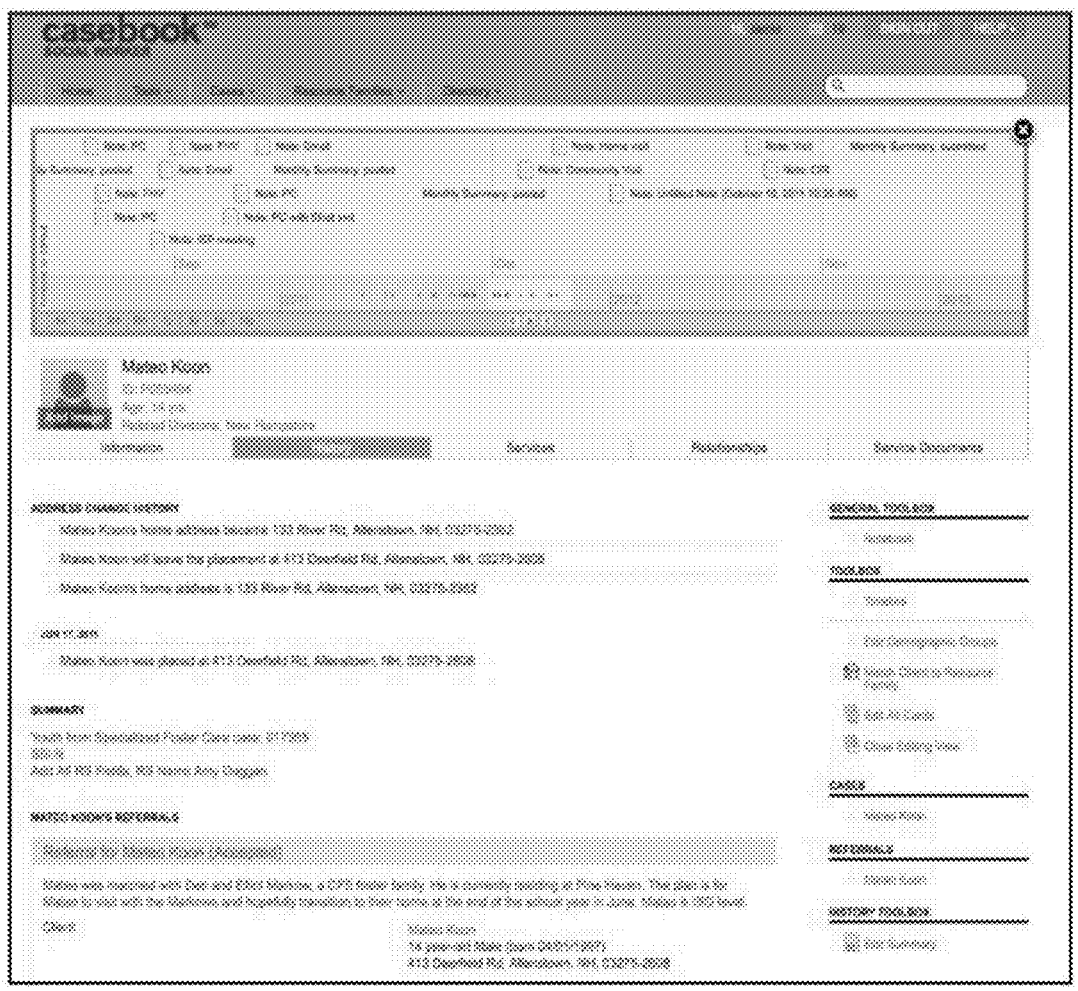

FIG. 2D is a view illustrating another exemplary embodiment of the history attribute 2010. This exemplary history attribute 2010 is depicted in a timeline according to an exemplary embodiment. The person timeline 2015 provides the caseworker with a consolidated visual of the activities in a person's life: Service documents, notes, placements, enrollments are placed on a timeline 2015 based on the input date. The timeline 2015 records events entered into the system through notes, placements, birthdays, case start and end dates, and the enrollments. It may also provide easy access (e.g., via links) to each of the events/activities occurring in the person's life so that the user can get a high level overview of the person and/or access a particular event to obtain the full information on the person.

Services attribute 2030 (refer back to FIG. 2A) may include the following three fields: placement, matches, and enrollments.

Placements attribute is an exemplary attribute indicating placement of a child by the welfare services. Placements is an attribute that may be completed by a Social Worker as described below and provides a record of changes in address for a child in a Provider Organization's ("PO") care. Placements may be with a resource family, resource organization, or other. PO users create Placements to track the location of a child and report to the state. They are also used to track payment periods. Pre-Placements build an address and social history for the child in foster care.

Figure 3A:
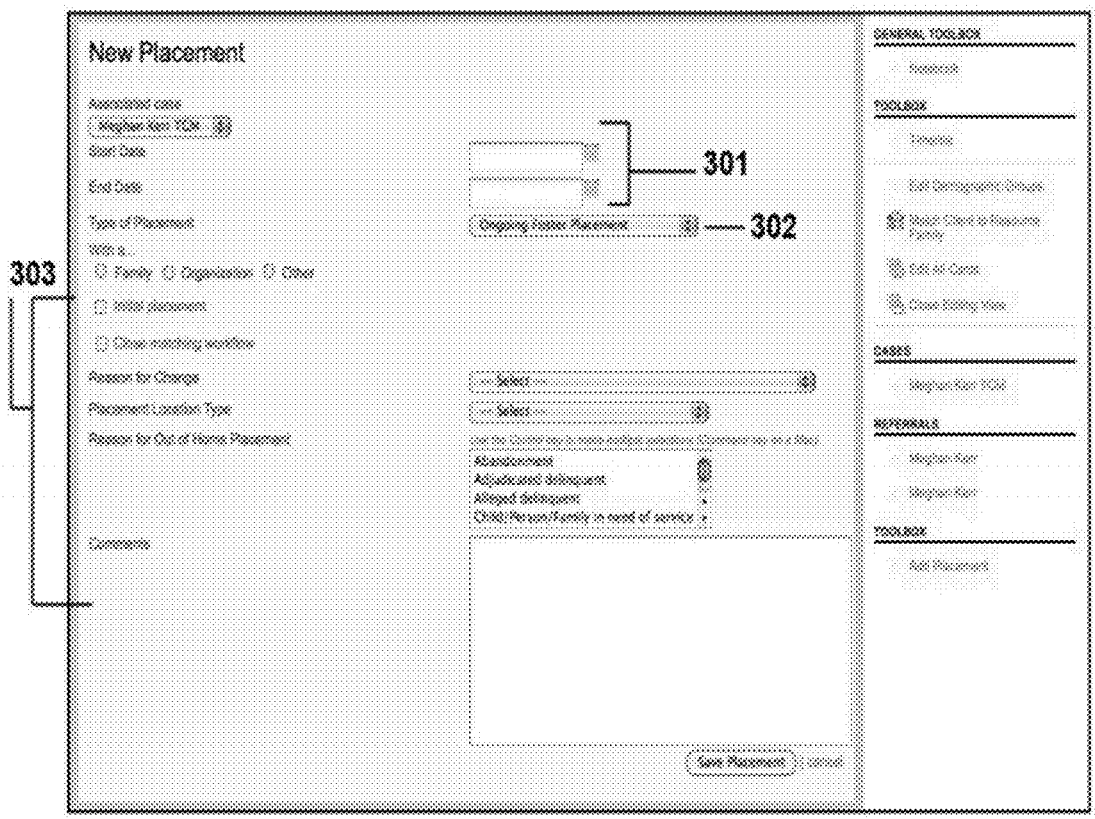
FIGS. 3A-3C are views illustrating service attributes of the people element according to an exemplary embodiment.

FIG. 3A is a view illustrating exemplary service attribute (specifically placement attribute) according to an exemplary embodiment. When creating a new placement, attributes such as: start date and end date 301, type of placement 302, and other attributes 303 are provided. In an exemplary embodiment, users (e.g., social workers) create placements for individuals. That is, the user may create pre-placement that does not need any approvals or an actual placement that may need to be approved by a supervisor or a higher authority. For example, the user may create a pre-placement and after a predetermined period, the user may submit the pre-placement to a supervisor for approval. Once the supervisor approves the pre-placement, it becomes the actual placement.

A person may have one ongoing placement at a time. A person may have one temporary placement at a time. A temporary placement may occur during the same time period as an ongoing placement. Ongoing placements may overlap on the closing and start date (to accommodate real life). Placement types are configurable by a super administrator. Users may be placed with a resource family, resource organization, or in an 'other' type placement. Placement location types are configurable by the super administrator. Users build a placement history (described above) for a youth through successive placements. When a placement is made, the physical address of the youth is changed so that the users always know where the child is located.

Another exemplary element of service 2030 (referring back to FIG. 2A) is matching. To aid caseworkers in selecting an appropriate resource family when a known resource family is not available, matching provides a preset algorithm for determining places that are likely to be good matches for the youth. The preset algorithm calculates and assigns weight to various criteria in order to help match a youth with a potential foster family. For example, an approved family is weighted more heavily than a family in the assessment process. The calculation also takes into account: the family's ability to accept male/female youth and children of certain ages. It also considers the geographic location of both the youth and the family and the ability of the family to care for a special needs youth. Other criteria include, but are not limited to: ability to keep the child in the same school district, the ability for families to accept siblings, etc.

Figure 3B:
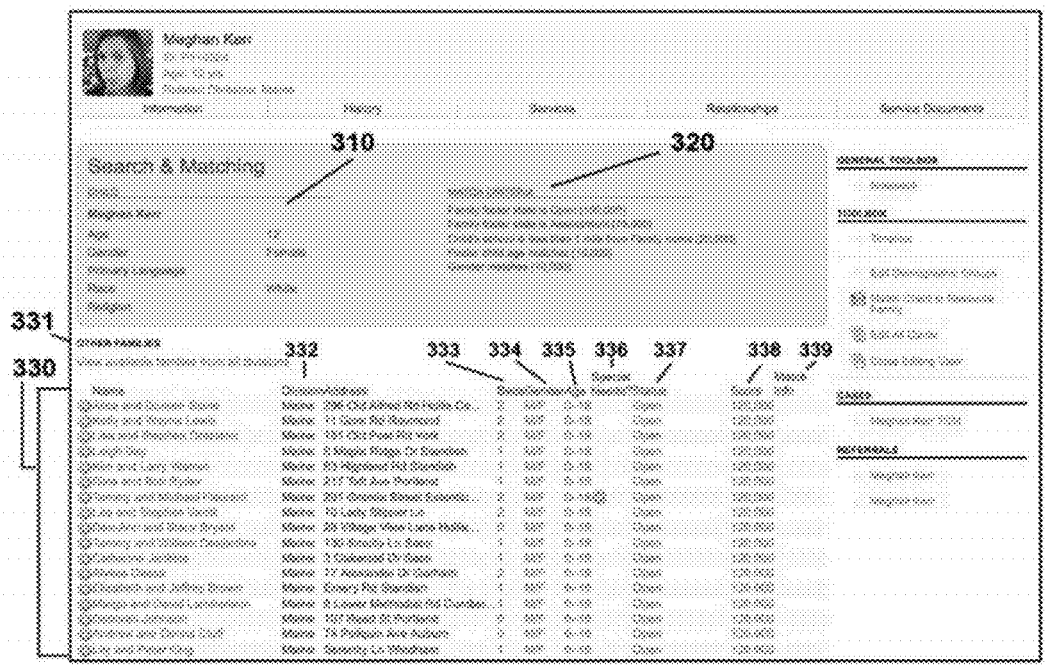

FIG. 3B is a view illustrating exemplary service attribute (specifically matching of the service attribute) according to an exemplary embodiment. In the matching, information about the person (child) is displayed 310 (this information was described above with reference to people attribute). Next, matching criteria is shown 320. Matching criteria, as described above, may include open family foster homes, proximity of the home to the child's school, age and gender matches, and so on. A list of families matching various criteria may be displayed 330. That is, the user may filter which families to display by manipulating the match criteria described above.

For each family, information such as name 331, address 332, number of available beds 333, gender wanted 334, age 335, whether they accept children with special needs 336, status (accepting/not accepting) 337 may be displayed. In addition, information such as matching score 338 and other matching information 339 may be provided when filters are set up. For example, the matching score may relate to a particular matching criteria when all families are selected and displayed.

In an exemplary embodiment, one youth may be matched at a time. The algorithm is preset and runs automatically when matching is invoked from the person page. In order to capture match information for current and historic purposes, a user can indicate a 'match' between a youth and a foster family. This match will signal to all users that a particular foster family is under consideration for a particular youth. When a match is either affirmed (and turned into a placement) or negated (and no placement will occur), a historic record of that match experience will be captured on both the youth's and foster family's record. Users can see a variety of relevant information to help them select matches, and users may select many resource families to indicate a match. Matches may be listed on a person's services page. Users may close a match by creating a placement or ending the match process. When a resource family and youth are matched, all other users can see that indication.

Figure 3C:
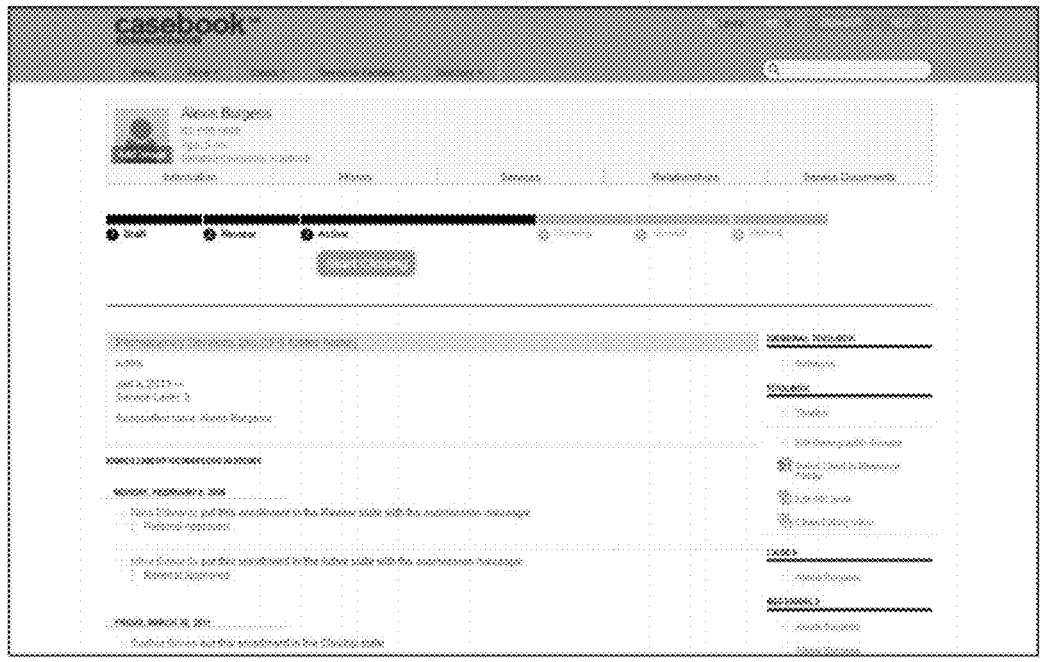

In addition, the service attribute 2030 may include enrollments field. FIG. 3C is a view illustrating exemplary enrollment according to an exemplary embodiment. Enrollments capture the sign up and attendance of parents, clients, and resource families in services offered by various providers. For example, a parent may be signed up for a parenting class or for drug treatment. The court may require that the parent attends this course as a condition to keeping custody of the child. As such, monitoring attendance is important. As another example, the child may be signed up for a group treatment session, which may also be a condition to him or her staying at the foster home. The exemplary case management system provides an automated easy way to monitor the attendance and alert the social worker if a parent or a child misses the class. Users can be enrolled in multiple services. People cannot be enrolled in a single service during overlapping time periods. Users can attach attendance records to services.

Relationships component 2050 of the people element includes relationship of the person to other people in the network. Relationships can be created among people within the system. That is, the system may automatically determine relationships between people based on the input information. Also, in an exemplary embodiment, if one of those people has a case and the correct relationship, the person will automatically be pulled into the case network on all associated cases. For example, the people database has information on a family A that includes mother, father, and a daughter. A case (described in greater detail below) is opened for the daughter of family A, the information about mom and dad in the family A is automatically linked to the case. Also, in an exemplary embodiment, when a new case is input, information about the people involved in the case is automatically stored in the people database. Relationship types may be hard coded into the system. Relationships may be temporal. Their currency affects whether the person will be displayed in the case network as a current relationship.

FIG. 4A is a view illustrating a relationships attribute according to an exemplary embodiment. In an exemplary relationships component 400, the person 401 may be displayed in an emphasized manner. Family members 402 may be hierarchically displayed as they relate to the person 401 e.g., in a family tree. Other people that are related to the person 401 such as a teacher 403, a counselor (not shown), and so on may also be displayed.

Figure 4B:
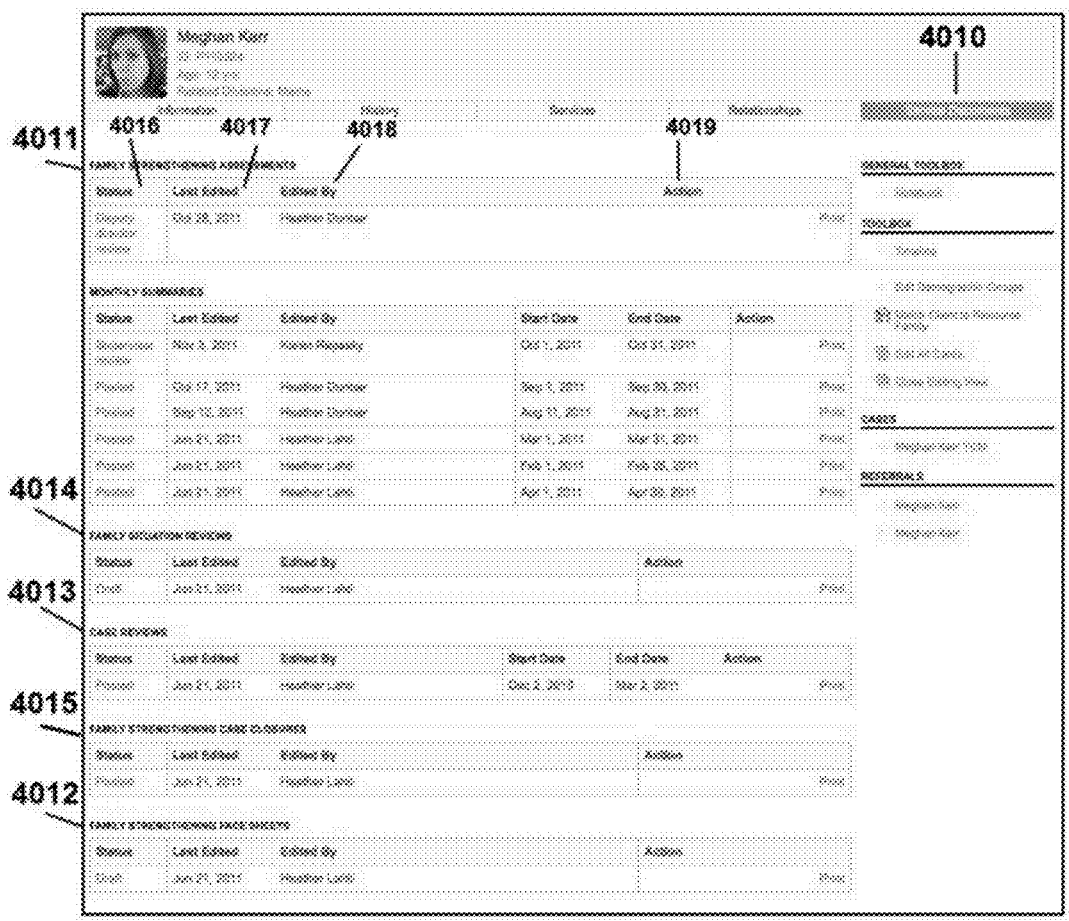

Another component of the people element includes service documents 2070. Users record case information in semi-structured narrative documents called service documents 2070. A service document is a form that is a combination of pre-populated information. FIG. 4B is a view illustrating an exemplary service documents component 4010 according to an exemplary embodiment. In FIG. 4B, documents are sorted by various categories such as family strengthening assessments category 4011, family strengthening face sheets 4012, case reviews 4013, family situation reviews 4014, and family strengthening case closures 4015. For each document information such as status 4016, dates 4017 such as last edit date, start date and end date of the user involved in the case and so on, an author 4018, and actions 4019 that may be taken with respect to each document e.g., print, submit, email, and so on, is provided.

In another exemplary embodiment, documents may be categorized according to plans and reports, photos and evidence, and assessments. Although other documents such as social security card, parking ticket, medical record, prescription, and so on may also be stored in the system, they are stored as documents unless they are related to one of the cases and/or reports. In an exemplary embodiment, service documents component may be provided for service related documents. In another exemplary embodiment, a document that is attached to a message in the system may be uploaded directly into the appropriate document category.

Service documents have date strategies (date by which a particular goal needs to be achieved, approval workflow, and immutability to maintain a permanent record of the document. Super-administrators configure service documents for all divisions and may assign a service document to all divisions or to just a few. The super-administrator may configure service documents by creating sections for the documents. For each section, the super-administrator may add questions for which answers may vary. That is, the answer format may be in a structured form or in a narrative. The super-administrator also orders sections and questions and assigns workflow approval path and date strategy for the generated service documents. The super-administrator also indicates which fields, questions are required and which are optional. The documents may be assigned to a particular division and case or a resource family. Super-administrators may include 'contexts' in a service document. Contexts automatically include information about referrals, placements, significant events, critical incidents, allegations, enrollments, post-close contacts, permanency goals, and service plan progress. The case management system creates a moment-in-time snapshot of a Service Document when the service document is submitted for approval. The Service Document archive (history) lists the service document snapshots.

Some of the service documents for a case (described below) may include Permanency Planning Assessment, Family Strengthening Assessment, Case Review, Monthly Summary, Case Closing document, Family Strengthening Closing, Permanency Planning Face Sheet, Family Strengthening Face Sheet, and Critical Incident Report. Some of the service documents for a resource family (also described below) may include Resource Family Annual Review, Home Study, and Resource Family Closing document.

Another component of the people element may include allegations (not shown in FIG. 2A). When a person is either the victim or perpetrator of an instance of physical or sexual abuse or neglect, that activity is recorded as an allegation. The allegation is stored in the person section of the system. FIG. 4C is a view illustrating documenting allegations according to an exemplary embodiment. For example, allegations may be created for abuse or neglect. Allegations may include the names of the victim(s) 4021, name of the perpetrator(s) 4022, detailed contact information for the allegation report source 4023 (including images and audio/video streams), users track status 4024 of founded or unfounded (substantiated or not).

Another component of the core case management element is resource families. In an exemplary embodiment, resource families are families that are willing to foster children. Each resource family may comprise a family team that will include one primary caseworker. The primary caseworker must be an active user. Resource Families may have one case supervisor. The resource family supervisor is usually the primary caseworker's managerial supervisor. Any of the users may be added as resource family team members. For example, a case worker that performs the home assessment may be added as an associate member.

The resource families may also include identity information, contact information, address information, relationship information i.e., other members in the family.

FIG. 5A is a flowchart illustrating a process of generating a resource family workflow according to an exemplary embodiment. In operation 501, resource families are input into the system after basic data is received from multiple sources including walk-ins, phone calls, and referrals from existing resource families.

Once a family's demographic information has been entered and relationships established in operation 502, the user submits the resource family for assessment. During the assessment in operation 503, the user completes a home study and enters the results into the system through the checklist and associated service document. At any point, users enter notes about contacts with the resource family. Depending on the outcome of the home study and other interactions, the user recommends the resource family i.e., makes a decision to accept the resource family, or does not recommend the resource family i.e., makes a decision to reject the resource family, in operation 504. If the family is not recommended, it is identified in the system as declined and the process ends in operation 505. If the user decides to recommend the family, the decision is submitted through a workflow process within the case management system to the supervisor and deputy director for approval in operation 506. If the family is recommended for approval, a user tracks licenses, checks available beds, and enrolls the family i.e., stores the family information in the resource family database in operation 507. If the supervisor does not approve the family, the status of the family is declined and the process ends, in operation 505.

Figure 5B:
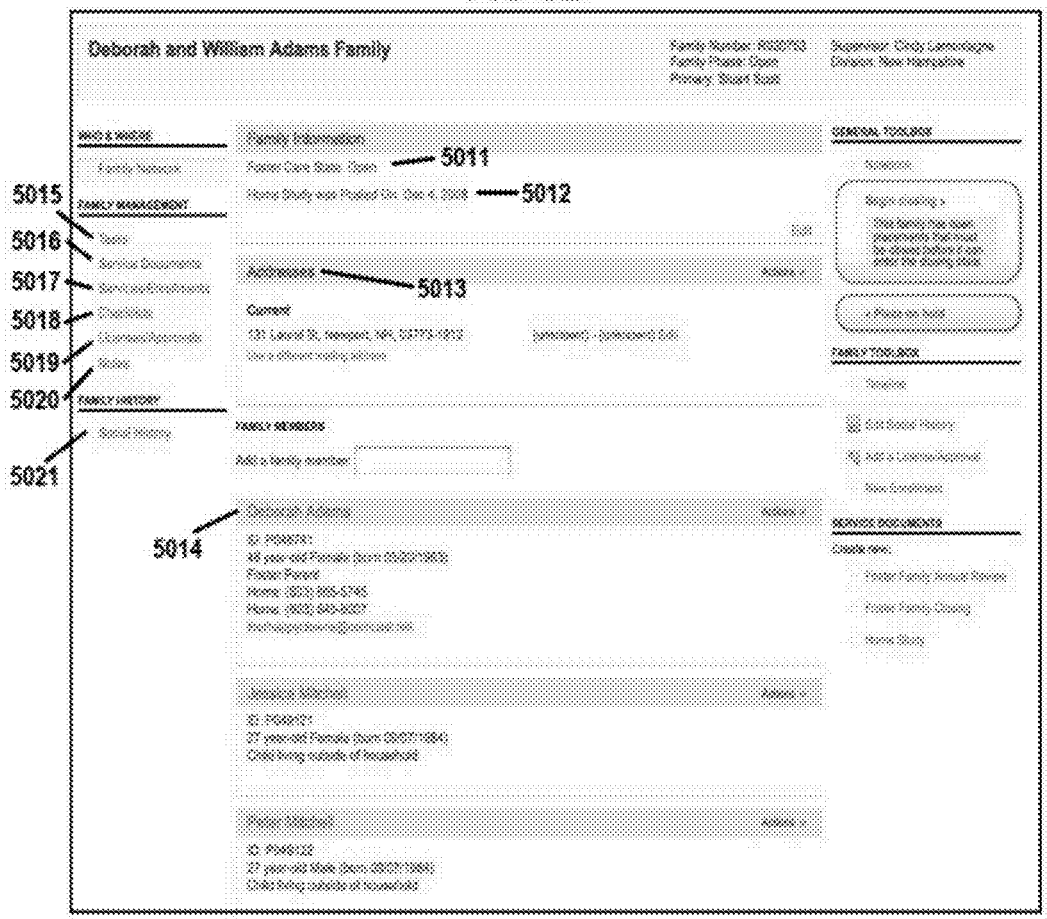

FIG. 5B is a view illustrating attributes of a generated resource family according to an exemplary embodiment. In FIG. 5B, the status of the family is indicated as open 5011 e.g., enrolled. Some exemplary alternative statuses may be closed (declined) and on hold/prospective (evaluation in progress). The family element further includes documents 5012 e.g., such as home study conducted on a particular date and notes related thereto, address information 5013, family members 5014. The user may add/edit/remove family members. The user may also invite family members to join the system where these members will obtain limited information directed to their family and/or prospective cases.

Some exemplary attributes of the resource family component include tasks 5015, service documents 5016, services/enrollments 5017, checklists 5018, licenses approvals 5019, notes 5020, and social history 5021. Tasks 5015 are provided for the case worker and may include elements such as post placement meeting and are described in greater detail below.

Service documents 5016 are similar to the service documents described with respect to the service documents attribute as it relates to people. For example, service document 5016 may include a home study, foster family annual review, foster family closing assessment and so on.

Service/enrollments 5017 may show the resource families being enrolled in classes to enhance their abilities as foster parents. Users may track attendance for resource families that have an accepted enrollment. Enrollments as discussed above also have a workflow.

Checklists 5018 are provided for the case worker and may include elements such as whether a DMV check, an FBI background check, and so on were completed. Resource families have automatically generated checklists 5018 associated with them that enable users to track the completion of required steps in the resource family approval process. The checklist enables users to select a start and end dates for appropriate actions and to indicate when a particular checklist task is not applicable. When a new individual is added to a resource family, a new checklist is automatically generated for that individual. Information regarding completed checklist items can be automatically pulled into service documents.

License approvals 5019 illustrate licenses that were obtained by the family. For example, resource families require licenses, in most cases, to be allowed to accept the placement of children. Licenses certify that the resource family provides a nurturing environment that meets the basic safety and support structure for a youth. Further, additional notes 5020 and social history 5021 maybe provided. Resource family licensing requires the completion of state and federal background checks, including Motor Vehicles, police, FBI, national sexual and violent offender data bases, and child protective directories. In addition, it requires a thorough assessment of the home environment, the capabilities of the foster parents and in depth analysis of the prospective foster parents financial, medical, emotional readiness to foster. These inputs are summarized in a recommendation for or against providing a foster care/adoption/respite or other type of state-allowed license/authorization.

Figure 5C:
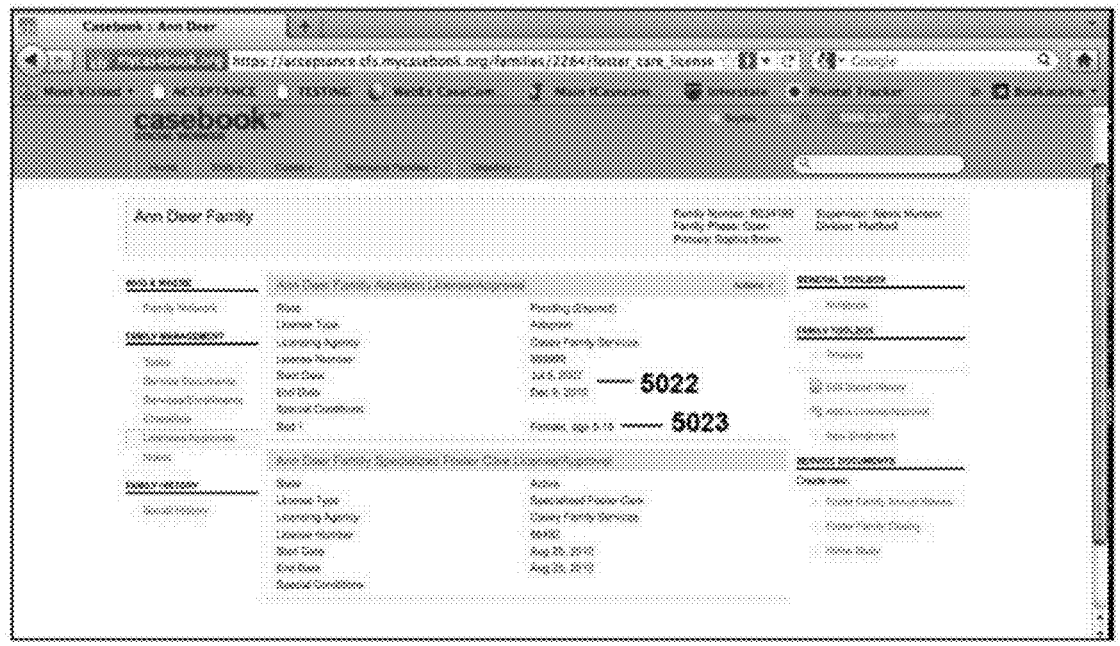

FIG. 5C is a view illustrating attribute family licenses and approvals of the generated resource family according to an exemplary embodiment. Licenses may have a work flow with one or more levels of approval, dates 5022 such as expiration date which renders the license ineffective, applications for number of children 5023 allowed to be placed with the resource family with indications for types of children that the resource family would accept.

Figure 5D:
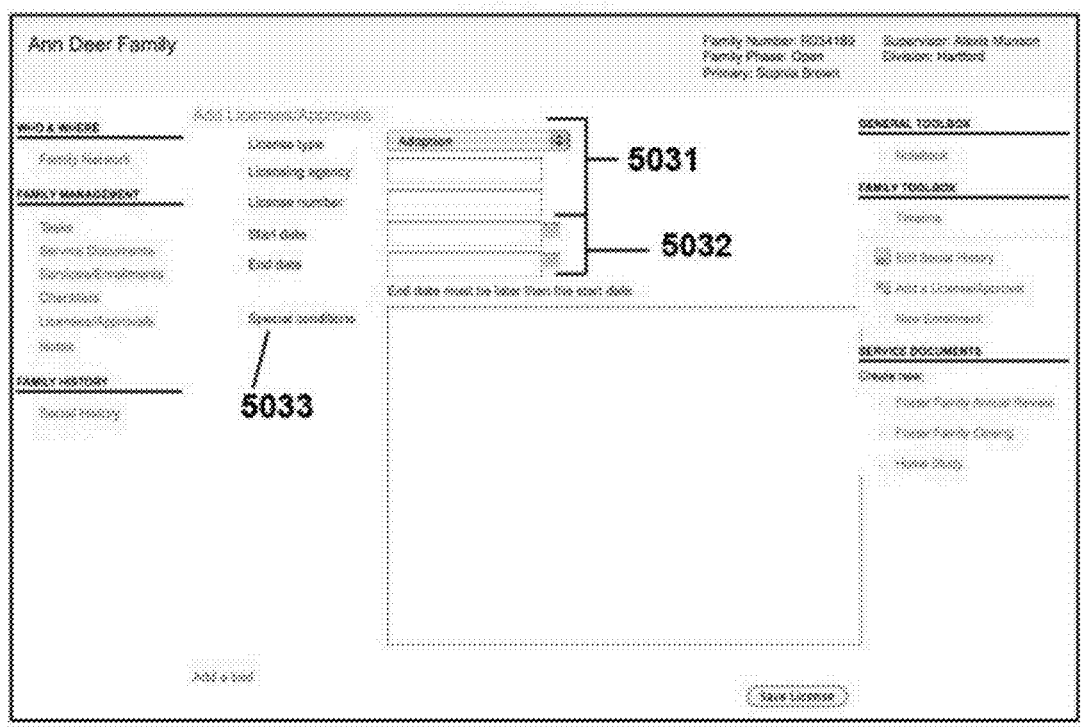

FIG. 5D is a view illustrating adding a license to a generated resource family according to an exemplary embodiment. The user may input license information 5031 such as type, agency, and number, date information 5032, and other notes 5033.

According to an exemplary embodiment, all the necessary family information is easily managed including each person in the family individually (as described with respect to the people element). For each family in the resource family element, information such as tasks, service documents, checklists, licenses, and so on are easily managed (viewed, edited, added, and/or deleted).

Another component of the core case management element is cases. Cases component is workflow management tools that includes containers of work that help social workers track and manage the progress of families and children toward better outcomes. Many people are involved in cases in many different ways including the clients, their family, collaterals, and the PO (provider organization) case team. The PO's case team uses notes, service plans, and service documents to track progress to goals and maintain high practice standards. These tools are also used to report case progress to the state child welfare agencies where the PO division is located. Cases also contain system tools to enable executive staff to reconstruct the actions taken, by whom, and when in case of the need to audit the services delivered by any PO.

Figure 6A:
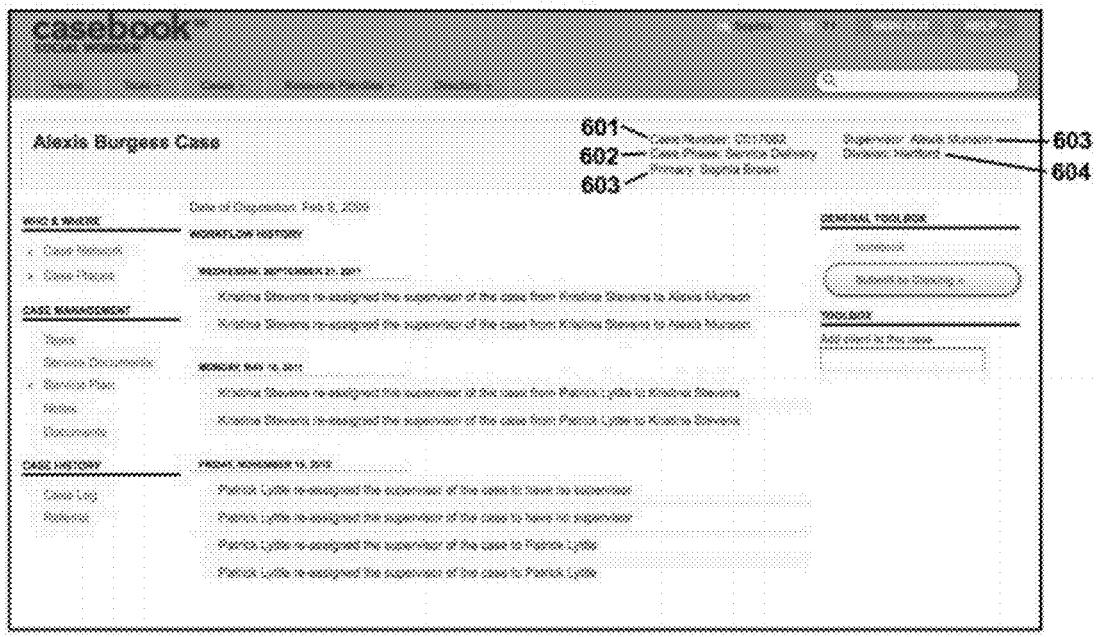

FIG. 6A is a view illustrating the case element according to an exemplary embodiment. Cases may be created from referrals or directly by supervisors and above. The date of disposition may be set. Each case is uniquely identified by an auto-generated number. Cases are also assigned to a geographic division or office. Each case belongs to a single division. Divisions are assigned to cases based on the division of the referral. Cases may be transferred between divisions.

In an exemplary case depicted in FIG. 6A, a case number 601, a case state 602, a contact person 603, and a division 604 are provided. Case states may include active or inactive. Another example of case states may be assessment, service delivery, closing, and closed. Case work flow indicates the administrative state of a segment of work.

Figure 6B:
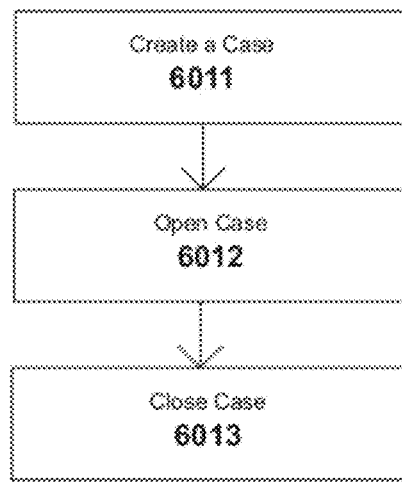

FIG. 6B is a flowchart illustrating workflow states of a case according to an exemplary embodiment. In operation 6011, a case is created from a referral or directly by a supervisor or above. The default state of the case is the initial state i.e., the Assessment phase. This is the first phase of the process. In this state, basic information is input such as name of case, one or more assessments that include allegation (described above) with corresponding people. Assessments may further include safety assessments where a supervisor or an agent fills out a checklist or responds to a number of questions related to the safety of the victim (focus child). Additionally, assessments may further include risk level evaluation, where a user may fill out a questionnaire and the system automatically determines risk factors based on the answers provided.

FIG. 6C is a view illustrating workflow of an incoming referral for a case according to an exemplary embodiment. Referrals are requests for PO services that are received by providers from state child protection agencies, other non-profits, mandated reports, and the public at large. Users add enough information to referrals to allow supervisors to make an informed decision about whether they can adequately meet the needs of the individual(s) being referred. Depending on available resources, PO supervisors' waitlist, deny, or accept referrals. PO supervisors transform accepted referrals into cases and begin delivering services. The system requires and validates some information on a referral before allowing it to be accepted.

As shown in FIG. 6C, a referral may have four states 6021: draft, accepted, denied, waitlisted. When a referral is drafted it includes basic information such as people 6022, demographic information, relationships between referral people, reasons for referrals 6023 (which may include additional detailed information 6024) and likely services they will require 6025. In addition, users may create and edit the name of the referral source 6026.

If a referral cannot be confirmed, it may be denied 6021. That is, this referral will not be further investigated and the allegation will be considered closed. On the other hand, there may be too many referrals already in the system and a referral may need to be waitlisted 6021. That is, the social worker will be assigned to this referral sometime in the future. A referral may be accepted 6022. For example, referrals may be submitted for supervisory review to determine if they should be accepted or not.

If a referral is accepted, a new case is generated or the referral may be added to an existing case. Approved users may create cases from referrals. Users may create one or many cases from a referral. Referrals are automatically linked to the cases created from them. When the Assessment phase 6011 as shown in FIG. 6B is completed, a supervisor or above may move a case forward, s/he may submit a case to Service Delivery/Open Status in operation 6012 as shown in FIG. 6B. When a case is moved to Service Delivery, the date of that move establishes the date of disposition. (The Date of Disposition populates the default date for service documents and service plans and is an important date in future Casebook actions, although these can be overwritten manually).

Figure 6D:
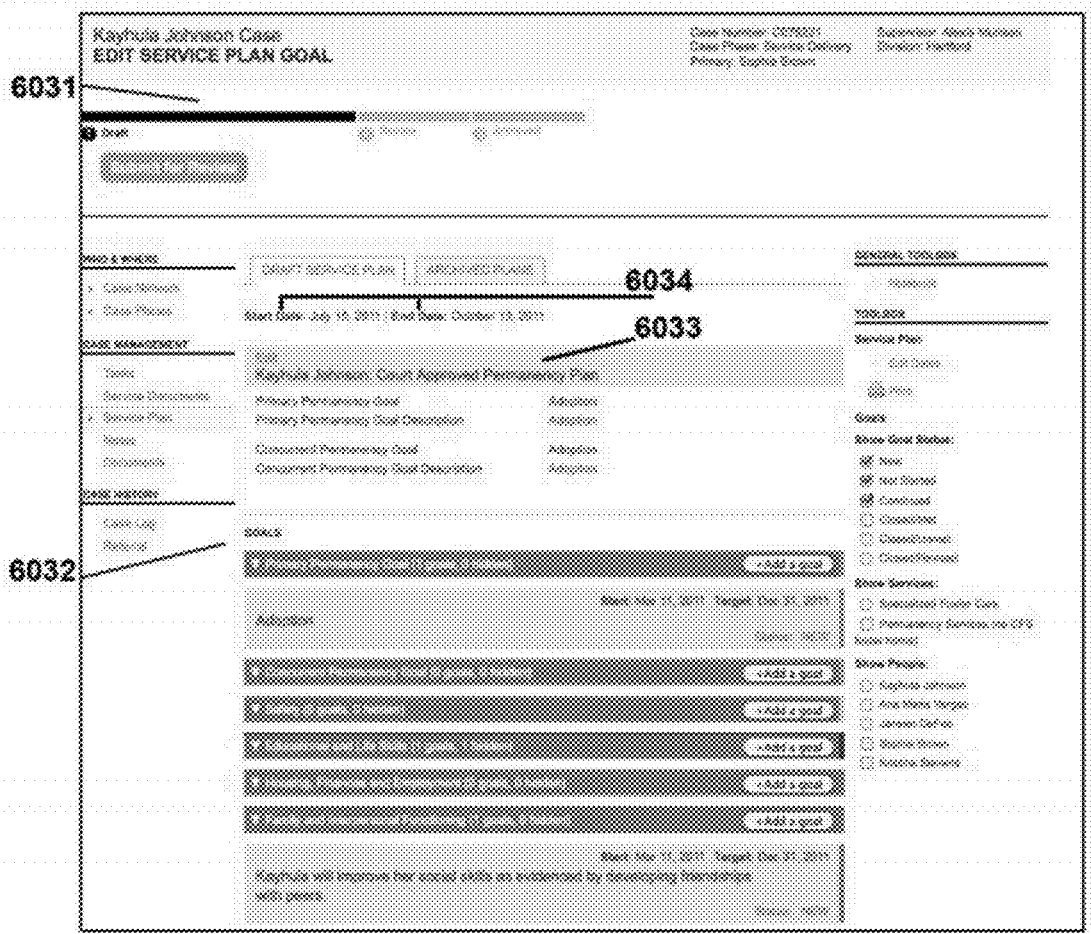

When the case is opened, a service plan can be generated. FIG. 6D is a view illustrating a service plan of a case element according to an exemplary embodiment. Service plans have the following states 6031: draft, review, active, and archived. In a draft state, information such as goals 6032 including housing, safety, educational, financial goals are drafted. The plan may require court approval and as such fields are provided that would indicate whether the plan is court approved 6033 and the dates for the plan 6034.

FIG. 6E is a flowchart illustrating workflow of the service plan according to an exemplary embodiment. In FIG. 6E, a user drafts a service plan in operation 6041. The user may input and/or edit people involved, create goals, goal tasks, and assign goal tasks to individuals from the Case Network (people associated with the case described in detail below), provide dates and so on. The draft service plan inherits the goals from the active service plan. Users cannot edit these "locked" goals to preserve the historic record. The service plan may require attendance of various services. Once the plan is drafted, it is submitted to a Supervisor for review in operation 6042.

During the review of the service plan, the Supervisor can edit tasks, suggested services, dates and so on. In addition, the Supervisor may add or delete tasks and services. The Supervisor may also add notes and return the service plan to the case worker for further edits or after it is approved. The supervisor has three options when a service plan is under review. S/he can edit the service plan. S/he can return the service plan to the social worker for additional work (with or without a message). S/he can approve (post) the service plan.

Once the plan is approved by the Supervisor, it becomes active in operation 6043. Active Service Plans allow users to edit goal tasks 6032 and update the progress description on the goals. By way of an example, a plan may become active only upon further approval by the Court. Accordingly, additional fields may be provided indicating the date the plan was submitted to the court, the date the court approved the plan, and the judge who approved it. The plan may also include participant's consents and waivers and so on. Caseworkers record and track the progress of the case team members and goals that would improve outcomes for affected children and families using this plan. Information on a service plan can be filtered by various criteria to show those goals associated with particular individuals, in particular domains, or by date.

Once the plan is completed, it becomes an archived service plan in operation 6044. Completed Service Plans are no longer editable but may be printed or used to generate new plans. When all the work associated with a case is completed, the case may be concluded, as shown in operation 6013 in FIG. 6B. This conclusion phase has two sub-phases: closing and closed. That is, when the case is concluded, the users submit the case to the closing phase to finish any administrative work required on the case. This move signals that the case is near conclusion but allows users to continue to take any actions on the case prior to closure. The case is not locked and edits may still be made. Subsequently, after all administrative work has been completed, a deputy director may move the case to the closed state. Once a case is closed, the unit of work no longer appears on the user's workload or on their supervisor's planner page. No additional actions can be taken on a closed case; it is locked. It can be re-opened at a later date by a deputy director if necessary.

In a case, there is also a service documents component (similar to the one described above with respect to the people element). Service documents capture and display critical information about a case in a consolidated format that may then be submitted to the state or other interested stakeholders. The service documents are designed to minimize data re-entry, allow divisional differences to accommodate jurisdictional differences, and be printed for inclusion in the permanent record. Case service documents serve both permanency planning cases and family strengthening cases. Some of the exemplary service documents for a case may include: Case Review, Family Situation Review, Permanency Planning Assessment, Family Strengthening Assessment, Monthly Summary, Family Situation Review, Permanency Planning Face Sheet, Family Strengthening Face Sheet, Case Closure, Family Strengthening Case Closure, Safety Plan and Critical Incident Reports. Critical Incident Reports (CIR) contain special behavior which alerts the deputy director and any other desired party via email when a critical incident report is filed. Super-administrators may add additional CIR email recipients through the configuration workbench.

Figure 6F:
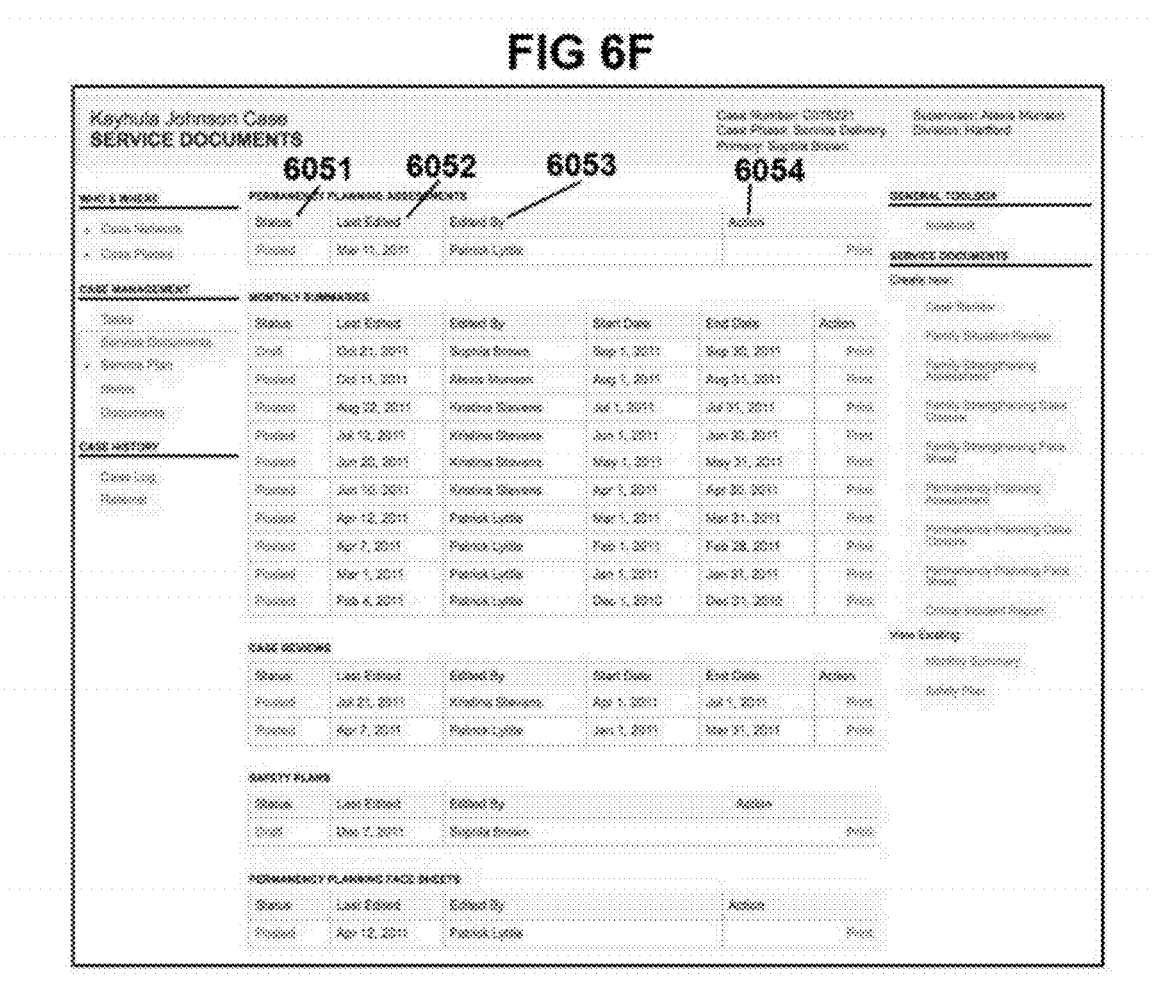

FIG. 6F is a view illustrating service documents according to an exemplary embodiment. For each document, status 6051, dates 6052, author/editor 6053, and action 6054 are provided (described above with respect to the people element). Some exemplary service documents may be incident report, case review, safety plans, permanency planning face sheets, monthly summaries. The service documents automatically include people including the resource family members. That is, each service document may be associated with more than one entity. For example, a home study may be associated with a resource family and a case to which the resource family is assigned.

Similar to people and resource family element, case element has notes attribute. The user may post additional notes on a case. Notes may have types configured by an administrator. A note can be associated with a person(s) in the context of either a case or a resource family. In other words, there may be items that fall outside the attribute fields described above or that are better addressed in a free format e.g., case workers' observations.

Users may record common interactions with children, families, and other case or family participants in the "Notebook". Notebook is a collection of notes. Notes contain both unstructured (narrative) and structured data. Much of the structured data is pre-populated with relevant case data to ease data entry and event recording.

FIG. 7 is a view illustrating notes attribute in a form of a notebook according to an exemplary embodiment. The Notebook includes a draft box 700 that is unique for each user. The notes are private in a draft state until the user determines to share the notes e.g., by selecting item 701. Users fill in both structured and unstructured data. For example, the user may enter free text in the draft box 700.

The user is further required to fill in structured data. For example, the user must select the case or resource family with which the note is associated via a drop down menu 702 that includes the list of all of the accessible cases/resource families. The user may be required to describe the event 703. The user may further be required to fill in people involved 704. The people may be selected from a directory or new people may be added. The user must also associate an address 705 with the note e.g., I met the child in Central Park or at the mother's home. The user must further select dates, and may add times.

The information can be entered into the system by multiple parties. In particular, collateral inputs may be made by others. When a collateral submits a message, the user is unable to edit the information submitted by collateral, but he or she can transform the message into a note and add structured data out of the entry to minimize transcription or re-work.

The generated notes are automatically saved e.g., autosaved and added to a drafts box. Moreover, the notes can be spawned. Spawning allows users to create related notes from longer bodies of text. Spawning allows users to create children notes from longer bodies of text. By way of an example, users highlight a portion of text in a parent note and click spawn. Upon clicking spawn note, a new draft note is created (without altering the 'parent' note). A parent-child relationship between the source and destination notes is documented and preserved in hyperlink. The parent-child hyperlink is displayed with the note on the note index page.

A collection of notes 707 may form a virtual notebook. Each note is considered to be a page in this virtual notebook and may be sorted by subject 708, related people/cases 709 and edit dates 710. Once notes have been shared, they can be accessed via the case or resource family about which the note is written. Notes that have been associated with individuals, with a case, or resource family can also be viewed on that person's information page.

Figure 8B:
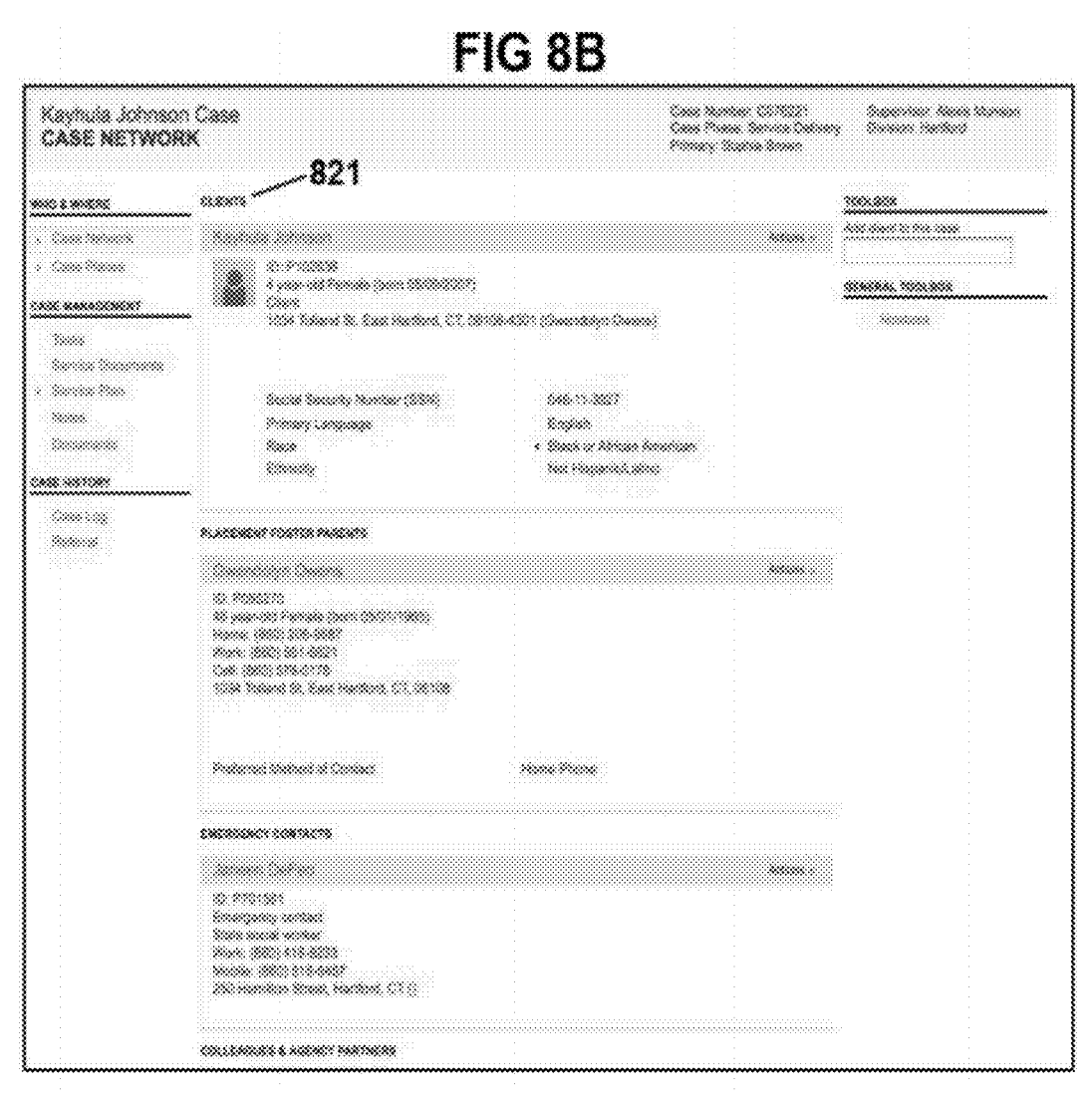
Figure 8C:
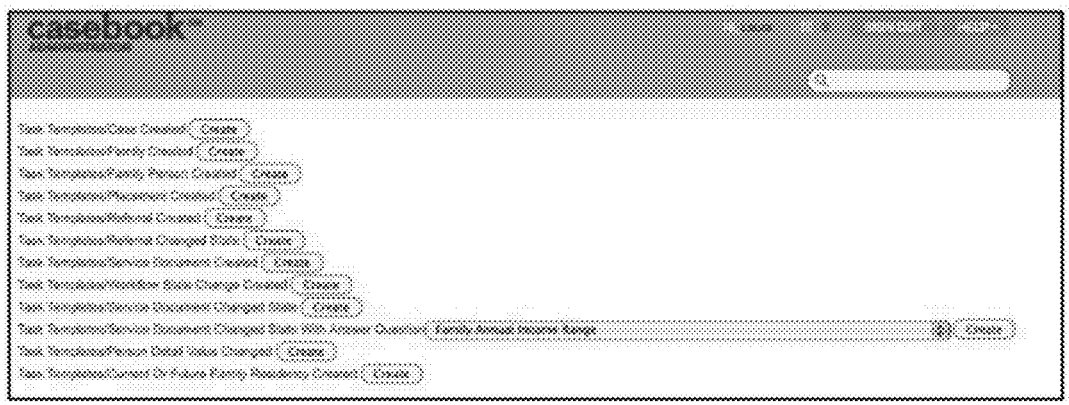

The case includes a number of members forming a team (FIG. 8A). Team members may include no more than one primary caseworker 801, no more than one case supervisor 802, associate team members 803, permanency team, post-close contacts, and special types of relationships. Associate team 803 members may be any other members such as other social workers involved in the case e.g., one that interviewed the child, one that obtained intake information, one that provided counseling to a mother, and so on. Any user or network member may be added to the permanency team. Upon addition, a visual indicator is added to the person's information card indicating that the user is a member of the permanency team. In addition, any user or person in the case network may be added as a post-close contact. Users may indicate post-close contacts through the actions rollover. The designation of post-close contact means that individual is likely to have a long-term connection to the youth(s) in the case, beyond the duration of the case. In addition, there are a few special categories of relationship: legal custodians, legal guardians, and emergency contacts. People who have these relationships are automatically part of the Case Team.

Case Team Members are PO-approved users of the case management system. Case Team Members may fill multiple roles. The Case Team forms a Case Network. The Case Network is built by consolidating the relationships people have in the community to the clients on the case. The Case Network helps caseworkers maintain a consolidated list of interested parties sorted into helpful categories. Different amounts of a person's demographic information are collected and displayed on the case network based on their demographic group.

The categories of people in a case network may include clients 821 shown in FIG. 8B. Clients can be adults or children. There can be one or many clients on a case. Clients may be added from the autocompleter on the Case Network page. Client demographic information may be automatically displayed and pulled in from the person page. Another category of people in the case network is Family members, who are adults and children that have a familial relationship to the clients. Another category may be other children i.e., children that may live with the client before, now, or in the future, but are not family. Another category may be collaterals, who are other important people in the clients' lives, including but not limited to service providers, friends and neighbors, school counselors, and so on.

Based on the designated roles and/or involvement in the case and specific events associated with the case (or resource family), notifications may be sent to users. Notifications are flexible and programmed in real time so as to include only a particular category of people in the case network or to exclude sending the reminders to some of the people in the particular category based on their individual preferences.

Another attribute of the case element is case places, which are any address at which a client has lived or is living. Case Places provide a geographic grounding in the movement history of the clients. Case Places also show the geographic location of other families, households and service providers.

Yet another attribute of the case element is tasks. Case tasks remind the user to complete required or suggested actions. Some tasks may be pre-configured by a super-administrator and as such automatically generate tasks. Users can also create unique tasks through the task index. Tasks and reminders help users maintain focus on the upcoming pieces of work.

The case management system automatically generates some tasks based on super-administrator configuration and will also automatically generate reminders based on preset rules. Such task reminders include, but are not limited to: reminders for court appointments, family visits, home visits, allegation investigations, annual physicals, the social worker assessing a foster family has <x> days to complete the assessment or a supervisor has <x> days to approve a placement, etc. The case management system will calculate these tasks/reminders based on when the first step of the process took place e.g., the social worker was assigned to assess the family starts the first counter. For example, when the social worker submits a placement for approval the counter starts for the supervisor to review. This functionality aids users in prioritizing their work and not letting required actions or imminent deadlines to slip by. Users may also create custom tasks for cases or families to aid their memory.

Tasks and reminder may be assigned to users when specific actions are taken. For example, a task may be created when a case, resource family, placement, or referral is created or when a person is added to a resource family as shown by way of an example in FIG. 8C. In addition, tasks may be generated when one or more of the following elements or attributes are modified: case, referral, resource family, service document workflow state, service document contains a specific questions and is submitted through workflow transition, and a specified detail table attribute (like marital status) is changed.

Figure 8D:
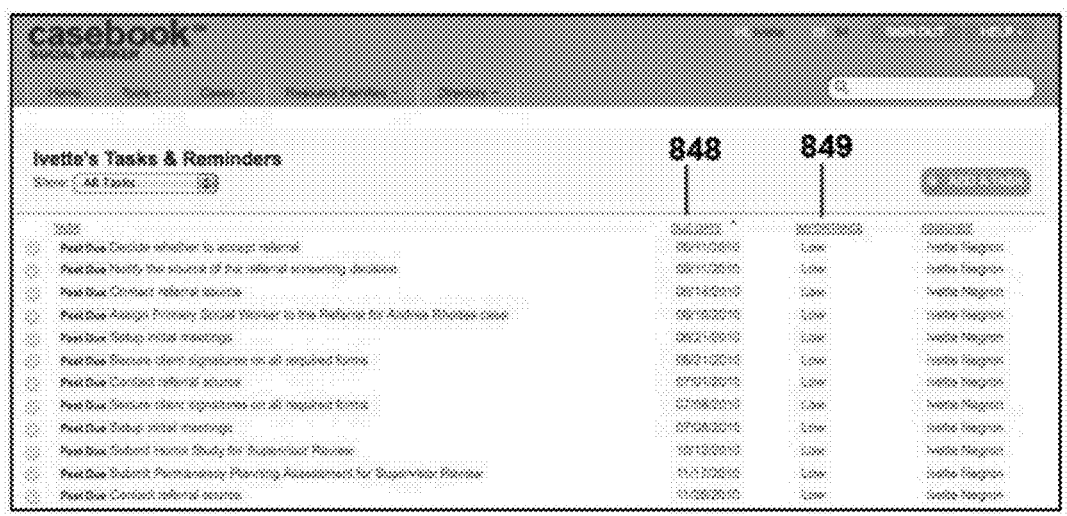

Users may create custom tasks and assign them to other case or resource family participants, as shown by way of an example in FIG. 8D. In addition, users may set a due date 848 and task importance 849 for the tasks they create. Case tasks display a comprehensive task list that is accessible through both the planner page and the main navigation.

Figure 8E:
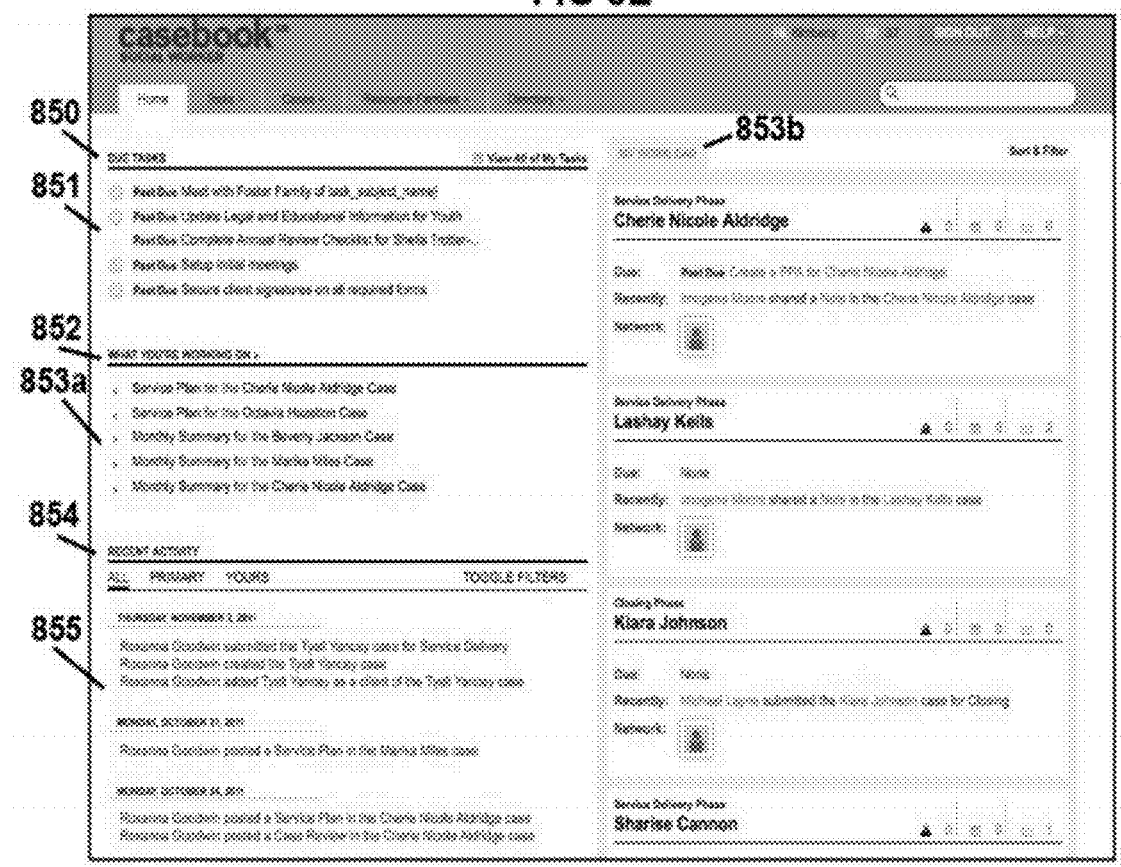

Planner pages may be set up as a home page for all users except super-administrator and collateral users. The planner page guides users in what work they need to accomplish in the case management system that day. FIG. 8E is a view illustrating a planner page according to an exemplary embodiment. The planner page has a number of tasks.

The planner page includes tasks that are due 850, what is currently being worked on 852, and recent activity 854. Under the due tasks section 850, various tasks 851 are displayed indicating when they are due and brief description of each is provided. The planner page has a currently worked on area 853a, which is further expanded in area 853b. The planner page further shows a predetermined number of most recent documents in which there was some activity 855. Activity feed 854 lists most recent actions 855 performed by the user, their supervisor, and their team members. The activity feed can be filtered by a number of different filters, such as by families, by cases in which the user is the primary caseworker, by date, and so on. The user may filter their workload by cases or families in which they are the primary caseworker. Supervisor and Deputy Director users review and resolve escalations, monitor work and progress of hierarchically subordinate caseworkers. Activity feed filters are 'sticky' so that they remain on the most recently used filter settings.

In addition to service documents, the case element includes documents attribute. This documents attribute may include users uploading files like court documents, evidence scans, images, birth certificates (or any other electronic file) to maintain an easily accessible archive of important case documentation. Users may link documents to notes after a document has been properly uploaded.

Figure 8F:
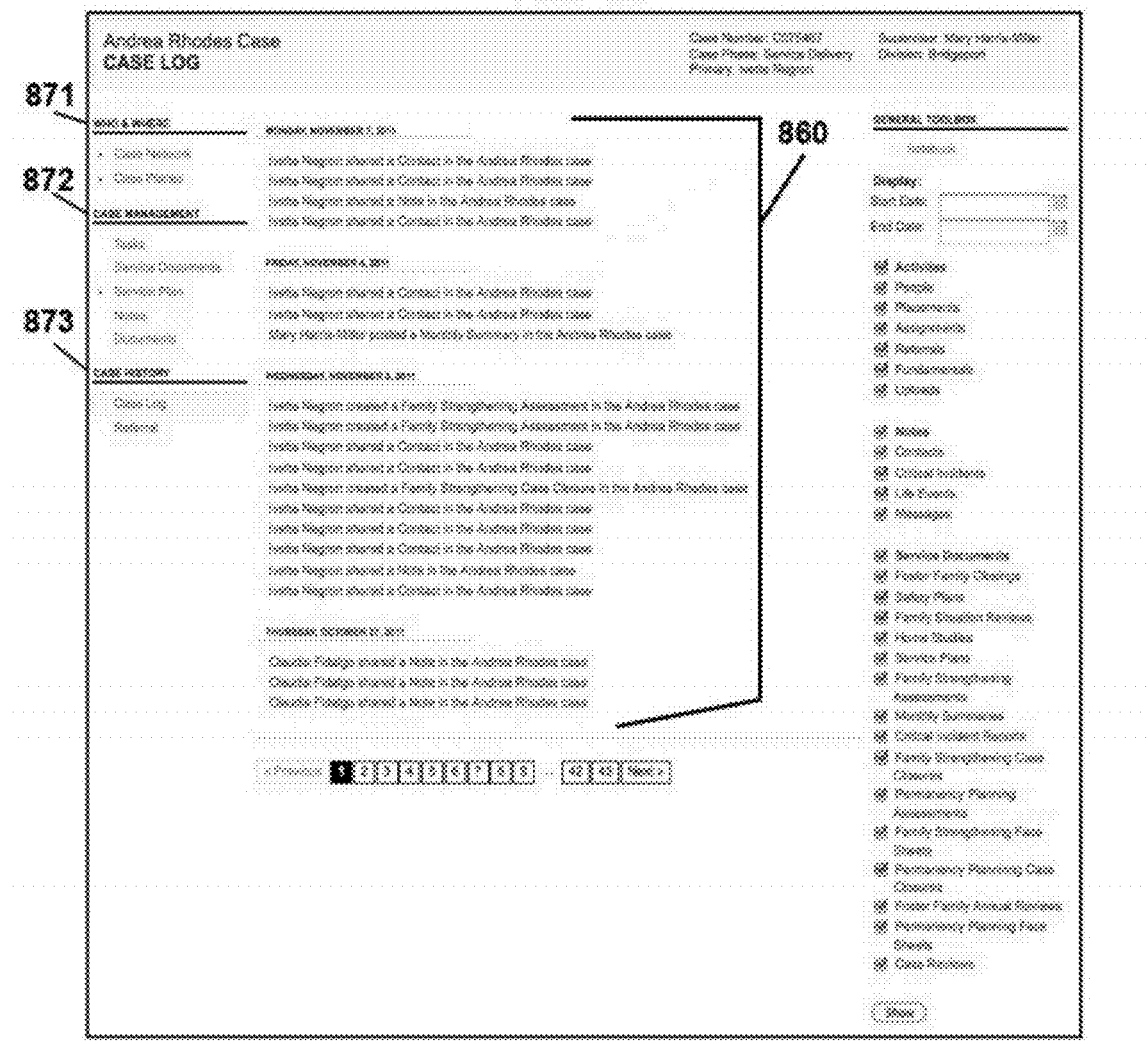

As described above, each case has a history attribute which may include case record and case log. Users use the case record to quickly come up to speed or review past action about a case. The case record may include notes, service documents, placements for the clients on the case, and service plan goals. Case log is a per-case version of the activity feed which captures all the work that individual users are doing on a case. FIG. 8F is a view illustrating a case log 860 according to an exemplary embodiment. A case log captures note creation, workflow state transitions for elements such as cases, placements, notes, the case itself, and referrals added to the case.

An exemplary case element explained above includes the who and where component 871 in which case networks and case places are managed. The exemplary case element may further include case management attributes 872 such as tasks, service documents, service plan, notes, documents, and allegations. The case may further include case history attributes 873 such as case record, case log, and referrals.

2. Additional Toolkit—Additional Functionality/Components of the System

Users may invite individuals to join the case management system in order to send messages, submit documents, provide reports via the system to the primary caseworker or other case team member users regarding the case. This approach uses role-based security in order to allow such invited individuals to have a very limited view of the system.

Notifications

Moreover, the user may broadcast a message to communicate directly with all of the PO's users of the case management system. Messages may appear at login and also in a one-time banner within the application. Broadcast messages may have a start time and an end time and may contain html formatting and hyperlinks. FIG. 9A is a view illustrating an exemplary broadcast message that appears on a login screen for a user according to an exemplary embodiment. FIG. 9B is a view illustrating an exemplary broadcast message that appears on a configuration screen for a super administrator.

Users may set up reminders for themselves and/or others. That is, users may initiate notifications to nudge a user to act upon a data field, email a particular document for processing. The users may also receive system generated reminders e.g., court date in two days. Further, the users may receive personalized notifications. That is, the users may define an event, action, or a modification of data in the case management system that will trigger a notification. The user may further define a delivery method such as email, SMS, in-system notification, and so on. The user may further define the text of the notification and other parameters.

Divisionality

The system supports divisionality of users and cases. Many POs have divisions in multiple states. To support multiple divisions on a unified platform while maintaining the private information of clients, the system utilizes divisionality attribute. The divisionality attribute allows a PO to assign unique service document, service document sections, checklist items, and grant search permissions per division. It also allows the system to filter searches by division.

Generating divisions for a PO is explained in greater detail. FIG. 10 is a flowchart illustrating a process of generating a division according to an exemplary embodiment. By way of an example, super-administrators create a division in operation 901 and assign users to divisions in operation 902. The division is then linked to headquarters in operation 903. Headquarters are not divisions. Headquarters users have no restrictions. Super-administrators create service document addendums and service documents per division in operation 904.

Super-administrators may then create checklist items, which may span multiple divisions in operation 905. Checklists aid users in completing required actions in managing resource family licensure. Checklists may be organized to have two parts: checklist labels are containers for checklist master items and checklist master items are individual actions, which must be completed to license and approve a resource family (for example). Checklist labels cannot be divisional but checklist master items are divisional. Updating a checklist does not change existing checklists, only new checklists receive the changes. Super-administrators may reorder checklist master items for all new checklists.

Cases, referrals, resource families, and user belong to a division. People do not have divisions. Deputy Directors may transfer cases and families between divisions. Search results are scoped by division but users may search all divisions which are then captured in an audit log.

Auditing

Figures 11A, 11B:
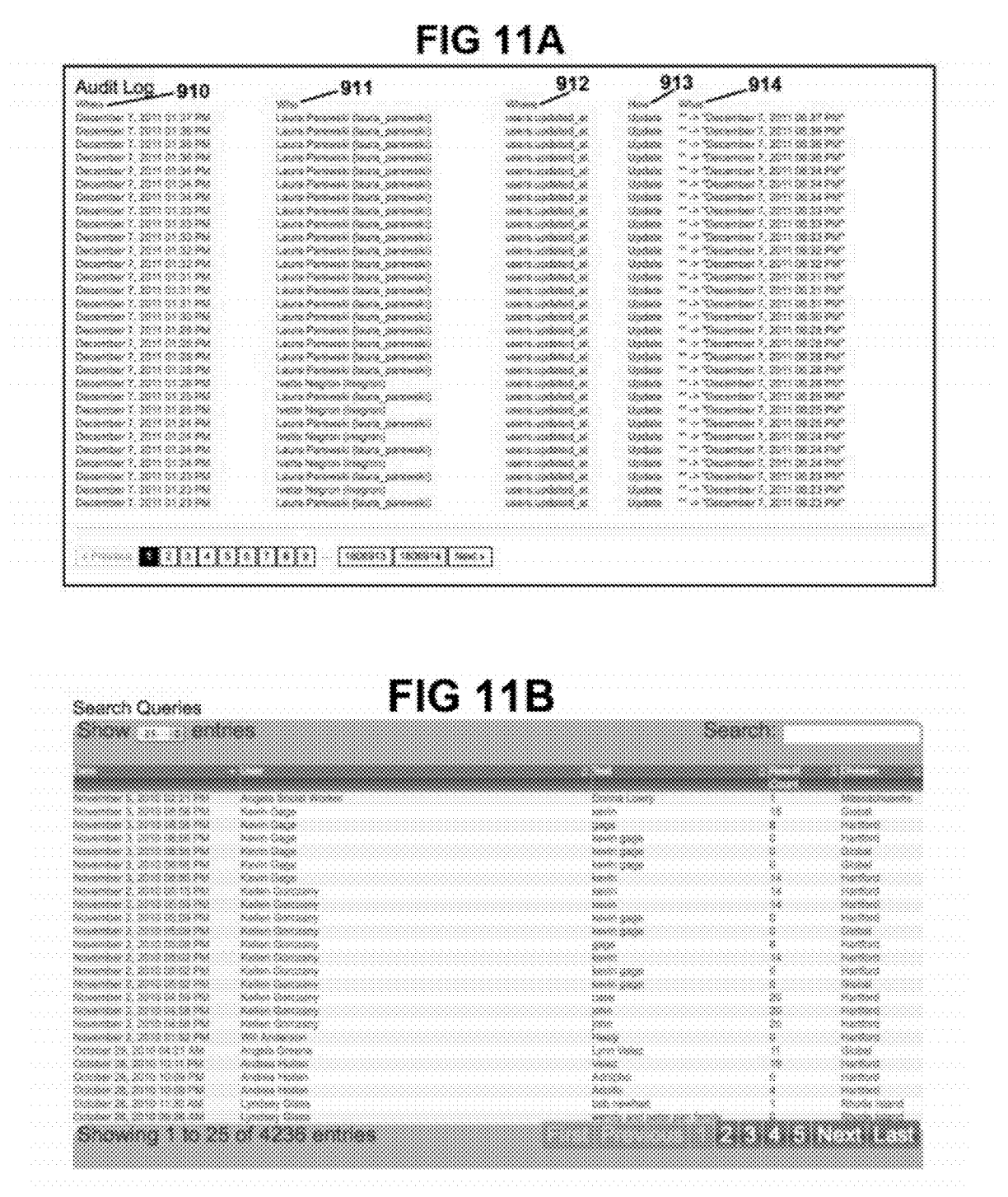

The system supports auditing of user actions. The audit log records transactions made by the users. The audit may be performed automatically overnight. FIG. 11A is a view illustrating audit log according to an exemplary embodiment. Auditing log captures activity by users and may export the auditing log to the PO data warehouse. For example, the auditing log may include when the action took place 910 by whom 911. It may further include which files were involved (where) 912, how the action was implemented 913 and to what the action was applied 914.

Additional auditing tools include the search query log and the background queuing log. FIG. 11B is a view illustrating a search query log according to an exemplary embodiment. The searches performed by the user are automatically recorded in a search query log. That is, the user search queries are logged. Search query results include the division of the user searching and the division of the searched object.

The PO may choose to exclude certain words from the search functionality so a search would not return results. This feature can be used to provide an additional level of confidentiality around sensitive data (e.g., HIV status).

Background Queue Log measures how long a particular task was in the queue. Background Queue may record any background jobs that failed to process. The background queue processes performance-intensive requests that users do not need immediately in the background of the application. Background queuing improves performance for the end users. Super-administrators view queue performance through the super-administrators' workbench:

Users submitting feedback automatically receive feedback system credentials. The system processes any attachments to the feedback forms and processes service document pdf snapshot creation when users submit a service document through approval work flow. The system may also process super-administrator requests to re-index search results.

The system further includes elements to import data, an import API ("Application Programming Interface") and a web form. Super-administrator needs to activate import mode to prevent users from logging into the system while new data is imported into the system. Super-administrators activate import mode through the super-administration configuration workbench. Super-administrators access import documentation and the latest XML schema definition ("XSD") through the super-admin workbench to assure better data quality.

The system may further include feedback/help items. Users may send feedback to a PO through the send feedback link. Send feedback is available to users from various screens. The first time a user sends a ticket, the system automatically creates an account with the PO help desk software. Users automatically receive updates on their ticket. Users may indicate the effect of the problem/question on their work by answering simple questions. Based on responses, the help ticket is automatically assigned a priority in the PO help system. Users receive confirmation that the ticket was received and confirmation when the ticket was completed. Users may upload attachments with their help tickets.

Searches

Figure 12:
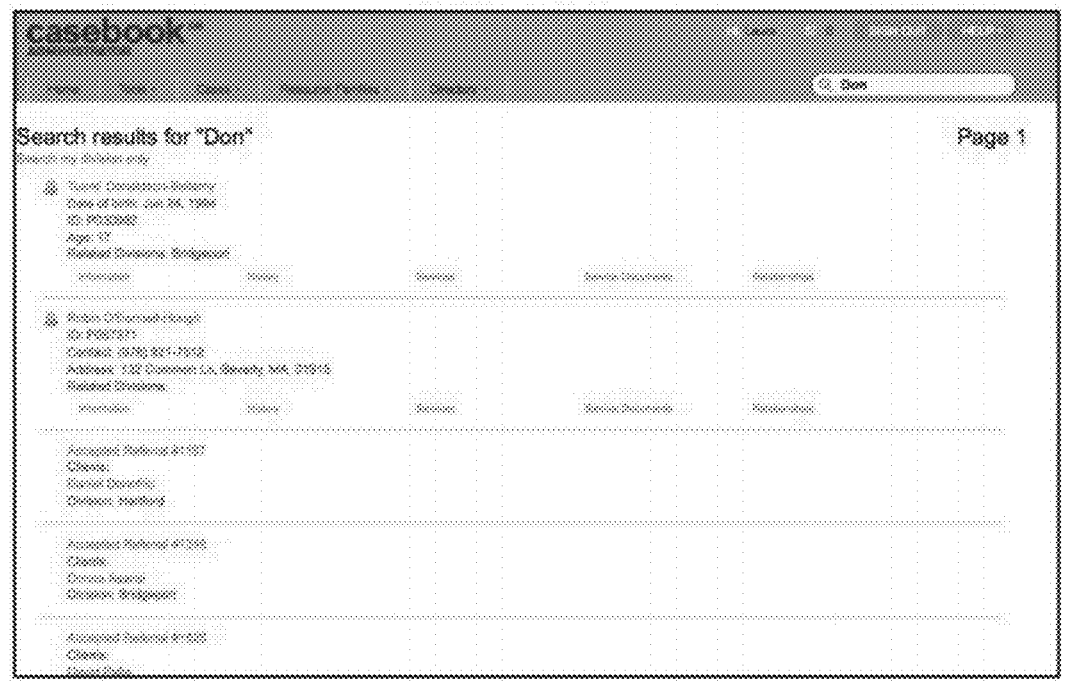
FIG. 12 is a view illustrating search results according to exemplary embodiments.

The system may further include searches. Users can search from any screen showing the primary navigation dialogue in the system. Search results may be ranked by object to show the most important and frequently accessed objects first. People, cases, resource families, and resource organizations appear before other search results. Users may search for: people, cases, resource families, resource organizations, referrals, notes, service documents, users, placements, and documents. FIG. 12 is a view illustrating search results according to an exemplary embodiment. In FIG. 12, keyword "Don" is used as a search term. The search results show all users with the keyword "Don".

In an exemplary case management system, the user may search/browse anything in the system including people, cases, resource families and so on. The user may set filters, sort, view maps and so on. The user can also set filters based on placement criteria such as number of beds, distance to school, number of other children, family income, and so on.

The user may further select documents for printing, exporting, deleting, emailing, submitting and so on. That is, the user may create a batch of record for performing various operations such as printing or emailing. Moreover, the user may select certain fields within cases for the noted operations.

Additional Features

The administrator may set up extended attributes to append fields to core functionality of the system such as the referral, placements, legal guardians/custodians, relationships, and emergency contacts.

The system further includes secure access control. The secure access control is designed to prevent outsides from accessing sensitive client information. The access control tool includes: SSL Encryption, users login with unique email address or nickname. The super administrator manages user accounts.

The system may further include resource library. The resource library includes custom documents, which are guides to thinking. These documents are intended to help caseworkers make appropriate practice decisions. Users may post any file type to the resource library. Once posted, the file is mage public. The file may include text, images, audio and/or video.

3) Other Analytical Component

Exemplary case management system has performance metrics including process, experience in care and outcome measures that support good family-centric Child Welfare practice. Metric calculation logic based on Casebook's unique longitudinal data model, which tracks persons, relationships, groups and social networks over time. Case management system manages family functioning and outcomes.

Exemplary case management system provides a seamless user experience. Users do not need to have their day-to-day work in one place and then switch to another application to look at data. Example system provides direct access to additional tools, such as searches, planning, and notifications. An integration of these various techniques provides a user with easy, one place solution to managing social welfare. In addition, exemplary case management system has 'Active' Performance Dashboard described below with interactive features, such as filter, sort, panel, pivot and drill down to case detail. Guided exploratory analysis, including visualization and mapping tools.

'Social Analytics,' including the ability to annotate, comment on, tag, set as favorite, follow and start conversation threads about particular graphs/analyses. An exemplary case management system is a social network from the ground up, and provides 'in place' analytical tools where they can have the greatest impact on frontline decision making and practice improvement. Predictive feedback to frontline teams. Predictive methods are applied to directly shape frontline decision making in Human Services. Plus, predictive calculations are based on underlying longitudinal data model and the attendant ability to detect patterns (trajectories) of interest.

Exemplary analytics includes 1) good human service practice, 2) metrics, 3), placement, and 4) trajectory. Good Human Services Practice is a collection of principles, processes, methods and tools to consistently improve outcomes for the children, youth and families served by human services agencies and programs. Metric is a quantitative measure used by human services agencies to gauge their performance in terms of both process (efficiency and practice fidelity) and outcomes for the families they serve. Metrics may be descriptive or predictive. Placement is the act of removing a child from their home to an out-of-home care setting, such as kinship (relative) care or foster care. Trajectory is a distinct named sequence of events, such as placements, enrollment in services or changes in an individual's life course. Examples of these features are illustrated below.

Figure 13A:
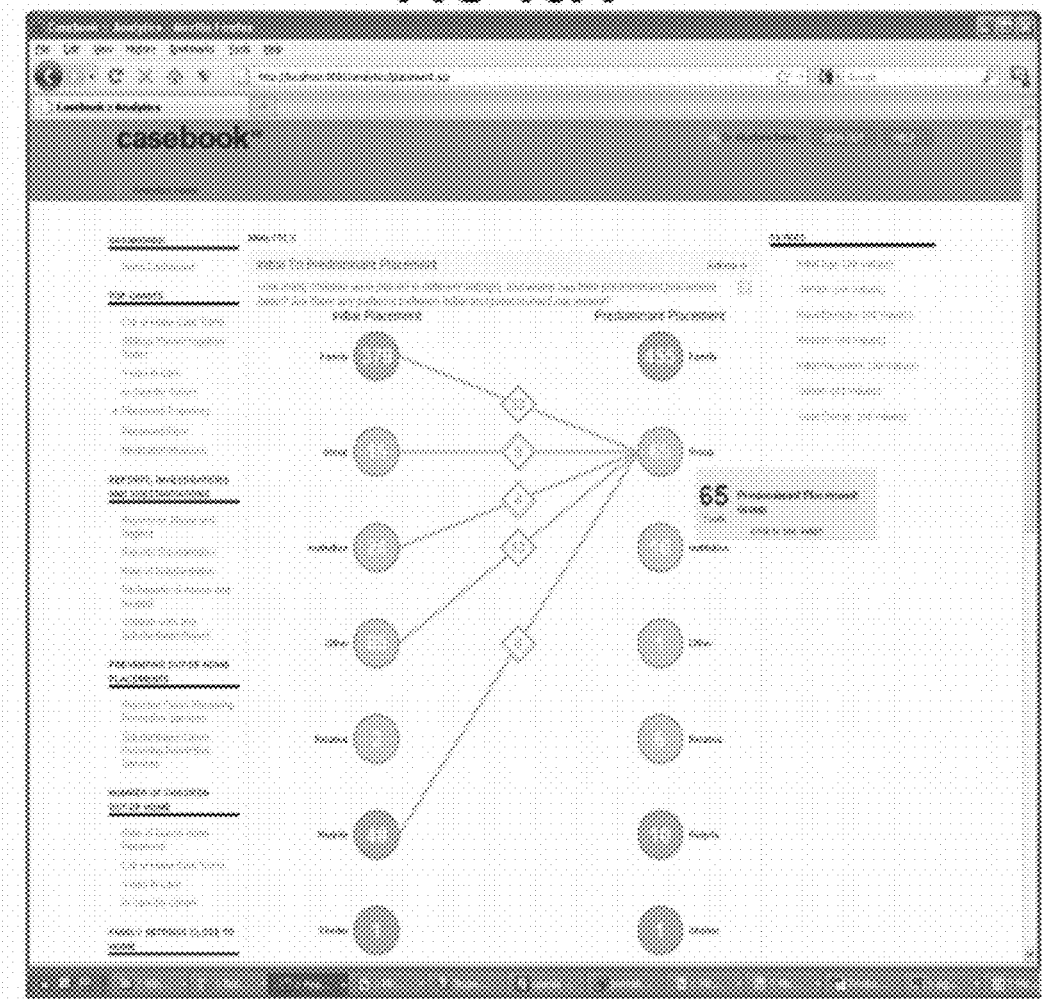
FIGS. 13A and 13B are views illustrating exemplary analytics diagrams according to an exemplary embodiment.

In an exemplary embodiment, metric is provided via a graphic visualization. The choice of each visualization method is based on knowledge of which methods best reveal patterns of concern in human services data. Data visualization methods show patterns that would not otherwise be apparent:

In an exemplary embodiment, the "Metric Pairs Diagram" as shown in FIG. 13A uses a visual frequency table to link a selection of initial placement types to a summary of placement history. This technique reveals where children and youth who start out in a given placement setting spend most of their time while in care and how many placement moves they experience.

This exemplary chart also works in reverse, showing, for each predominant placement type, where the children in that group start out. The categories for initial placement are based on selecting all initial placements for all children who have ever been in care, and then counting children by initial placement type. Predominant placement is calculated by first selecting all placements. Then children over 17 years of age at entry, and any placements with placement location type as home of birth parent or respite are excluded. Next, the number of days in each category: family, relative, group, shelter, institution, juvenile justice and other/unknown are counted. For example, if child spends > or = to 50 percent of total days in one category then that is reported as their predominant placement setting. The logic for determining number of placement moves is based on a unique longitudinal data model, which organizes event history at the person, relationship and group levels, not simply by unit of work (such as a case). This enables accurately determining number of placement moves for an individual child during any removal episode (also called a spell in out-of-home care) and across multiple removal episodes, using the following exemplary algorithm:

Select the start date of the first placement in a removal episode.
Select all other placements (ongoing or temporary) for child subsequent to first placement.
Do not select placements unless they are in either active, closing or closed workflow states.
Select start and end date for each placement.
Do not count placement if "placement location type" is "home of birth parent."
Do not count new placement if placement location type is "home of relative" and placement is for 30 days or less.
Do not count placement if placement location type is medical facility and child returns to the same placement as before the time spent in the medical facility.
If #7 is longer than 30 days, count placement even if the child returns to the same placement as before.
Do not count placement if type of placement is "temporary respite placement."
Do not count placement if placement location type is "camp."
If the camp stay is more than 30 days and child enters a new placement after the stay at camp, count the time in camp as a placement.
Count the total number of placements in accordance with the above rules.

Figure 13B:
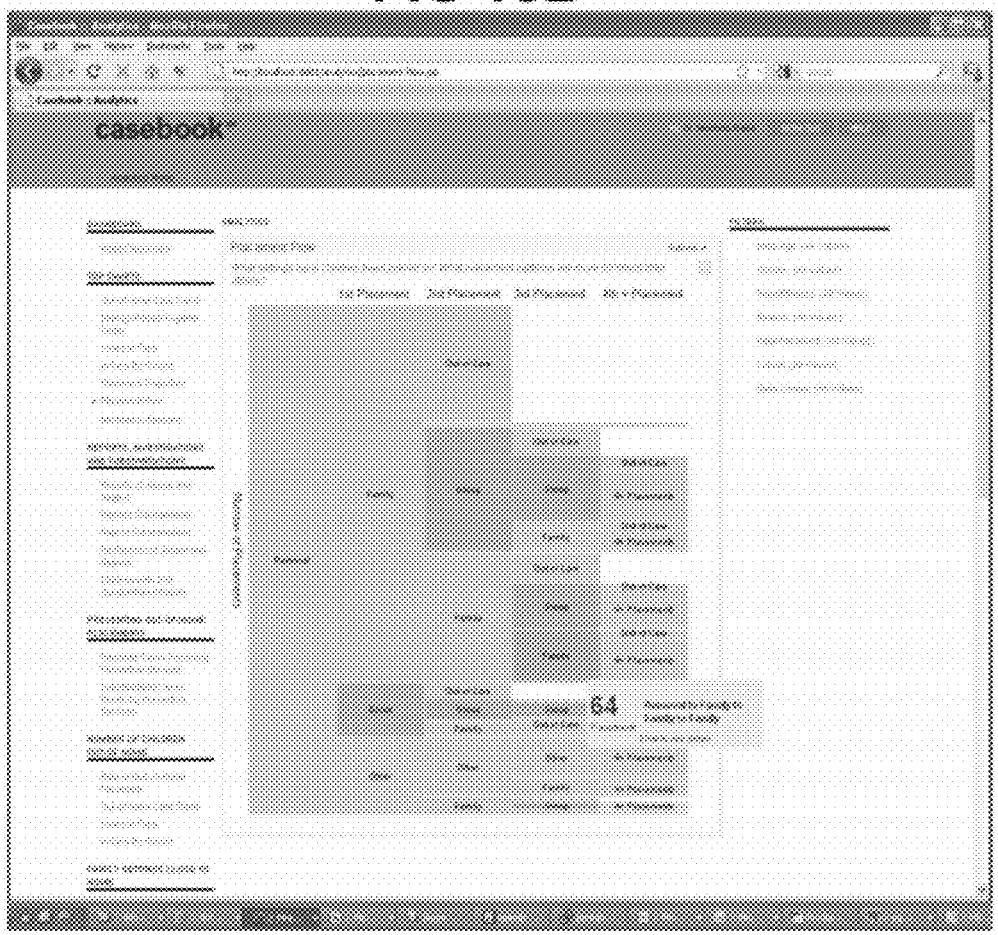

Another exemplary analytics component according to an exemplary embodiment is depicted in FIG. 13B. For example, the placement trajectory diagram shown in FIG. 13B applies an adjacency diagram, also called an icicle diagram, to placement history data to reveal all the distinct placement trajectories represented in an agency's data for a given period of time. The system flips a related art icicle diagram on its side to show these placement patterns in a uniquely informative way. An example placement pattern might be: start in a family setting, move to a relative setting, move to a group setting, then go on to have over 4 placement moves. The x axis does not show duration, but rather the permutations of placement types over time, while the y axis shows the relative size of the groups in each placement type.

This application of an adjacency diagram to a stream of placement data is unique in the way it reveals, at-a-glance, both historical trajectories and the relative size of each group represented by each distinct square in the diagram. It is possible to click on each distinct square to find a profile of the underlying population, and then drill down to individual case detail. Moreover, each distinct trajectory defines a population of interest for further analysis. The Placement Trajectory diagram also makes it possible to superimpose any individual or team caseload on the trajectory view to immediately see what children currently in care are experiencing and which children are on a trajectory that might lead to negative outcomes. The algorithm for finding distinct placement trajectories mines any given stream of placement data by sorting placement sequences, bounded by removal episodes as defined above in the calculations for Number of Placement Moves, into bins representing unique permutations of placement types.

The agency colleagues may share comments and hypotheses about designated metrics. This exemplary activity may include: setting "charts to watch" based on agency priorities and setting charts of interest as favorites and then following them, with the filter/sort/panel parameters set, as the data changes over time. The agency colleagues may also engage in online threaded conversations with multiple agency colleagues about metrics and charts of interest.

In an exemplary analytics component, allows the agency to make evidence-based decisions in human services. These metrics are embedded in the context of related features, such as persons, relationships, groups, social networks, units of work or task lists. The placement of these metrics reflects unique knowledge of at what point in the user's flow of work each metric would be most informative and actionable.

4) Hardware Components

Figure 14:
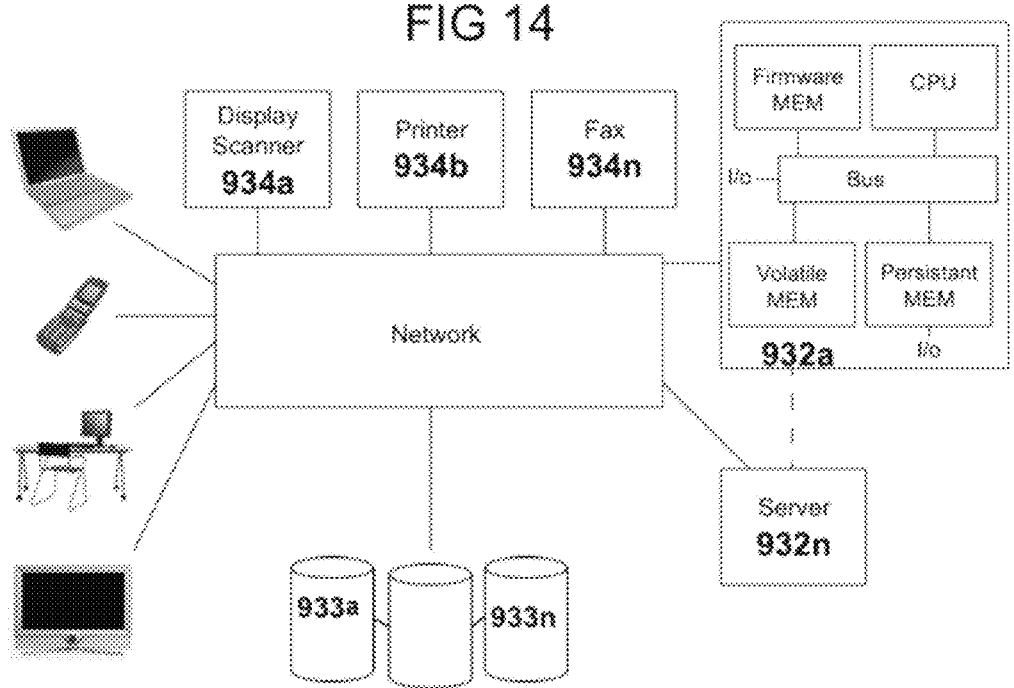
FIG. 14 is a block diagram illustrating case management system according to an exemplary embodiment.

FIG. 14 is a block diagram that illustrates components of a case management system according to an exemplary embodiment. The system 930 includes a number of user terminals 931a . . . 931n, servers 932a . . . 932n, databases 933a . . . 933n, and peripheral devices 934a . . . 934n. User terminals 931a . . . 931n include personal computers, laptops, ipads, notebooks, cell phones, and even televisions as the technology progresses. User terminals are consumer devices which provide access to a network such as internet. They include a memory, a processor, and an input/output interface. They maybe connected wired or wirelessly to each other or to another network. That is, the user terminals may form a personal network or local access network and then connect to the internet via a gateway.

Servers 932*a* . . . 932*n*, each include a memory, a processor (CPU), a data bus, and an input/out interface such as a network interface card. A data bus or other communication mechanism communicates data among various elements of the server. These elements may include a central processing unit processing data and performing computational and control tasks. These elements may further include various storage units. These storage units may include a volatile memory, such as a random access memory (RAM) or other dynamic storage device. The volatile memory may be used for storing variables or intermediate information during execution of instructions by the CPU. The storage units may include firmware memory such as a read only memory (ROM or EPROM), which stores BIOS and other system configuration data. The storage units may further include persistent memory such as a magnetic disk, optical disk, or solid-state flash memory. The servers may be connected to communicate with each other or function independently.

Data (information about people, resource families, and cases) are stored in one or more databases. 933*a* to 933*n*. Databases may be partitioned into a number of databases.

Peripheral devices 934*a* to 934*n* may include network printers, facsimile machines, scanners and so on. These devices may also be connected individually to a particular user terminal.

The term "computer-readable medium" as used herein refers to any medium that participates in providing instructions to a processor for execution. The computer readable medium may be a transitory computer readable medium or a non-transitory computer readable medium. A non-transitory computer readable medium may be, for example, but not limited to, an infrared, electronic, optical, magnetic, electromagnetic, or semiconductor apparatus or any combination of these. For example, non-transitory computer readable medium includes a floppy disk, magnetic medium, a hard disk, a random access memory (RAM), a flash memory, read-only memory (ROM), an erasable programmable read-only memory (EPROM), a memory card, any other memory chip, a portable compact disc read-only memory (CD-ROM), any other optical medium, punchcards, papertape, or any other physical medium from which a computer can read instructions. A non-transitory computer readable medium is any tangible medium that can store instructions for execution by a processor.

A transitory computer readable medium may include a propagated data signal with computer readable program code embodied therein, for example, in a base band or as part of a carrier wave. The signal may be propagated in coaxial cables, copper wire and fiber optics. A transitory computer readable signal medium can communicate, propagate, or transport a program for execution by a processor.

Computer program code for carrying out operations for aspects of the exemplary embodiments may be written in any combination of one or more programming languages, including an object oriented programming language such as Java, Smalltalk, C+, .Net or the like and conventional procedural programming languages.

Private cloud computing may be used to implement an exemplary case management system. That is, the program code may be executed entirely on the user's computer, partly on the user's computer, as a stand-alone software package, partly on the user's computer and partly on a remote computer or entirely on the remote computer or server. The remote computer may be connected to the user's computer through any type of network, including a local area network (LAN) or a wide area network (WAN), or the connection may be made to an external computer (for example, through the Internet using an Internet Service Provider).

The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device. Volatile media includes dynamic memory, such as volatile storage.

5) A Second Exemplary Case Management System

An exemplary case management system described above is helpful for private agencies that assist the state with placement of children. In another exemplary embodiment described below, a state child welfare case management system is described. This state child welfare case management system is useful in helping the state manage child welfare services such as managing allegations related to child abuse.

A. Assessments

Figure 15A:
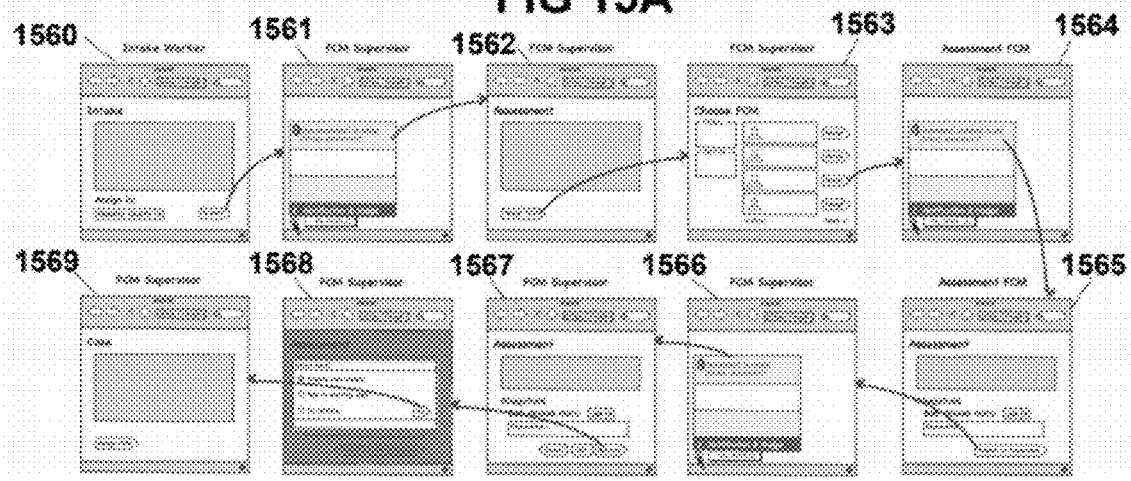

In an exemplary embodiment, generating a case may have the following operations: intake, assessment, and generating a case. FIG. 15A is a flowchart illustrating generating a case element according to an exemplary embodiment. In operation 1560, information about an incident is input and the case is assigned to a particular division of social services. In operation 1561, the initial intake is provided to a supervisor of the selected division. The supervisor may be notified of via email, facsimile, SMS, internal mail within the system and so on. In operation 1562, the supervisor assesses the incident based on the intake information. In operation 1563, the supervisor may choose a case worker (FCM) if the supervisor determines that a case should be opened. Once the supervisor assigns the case to a particular worker, this worker gets a notification (a nudge) that a case been assigned in operation 1564.

Figure 15B:
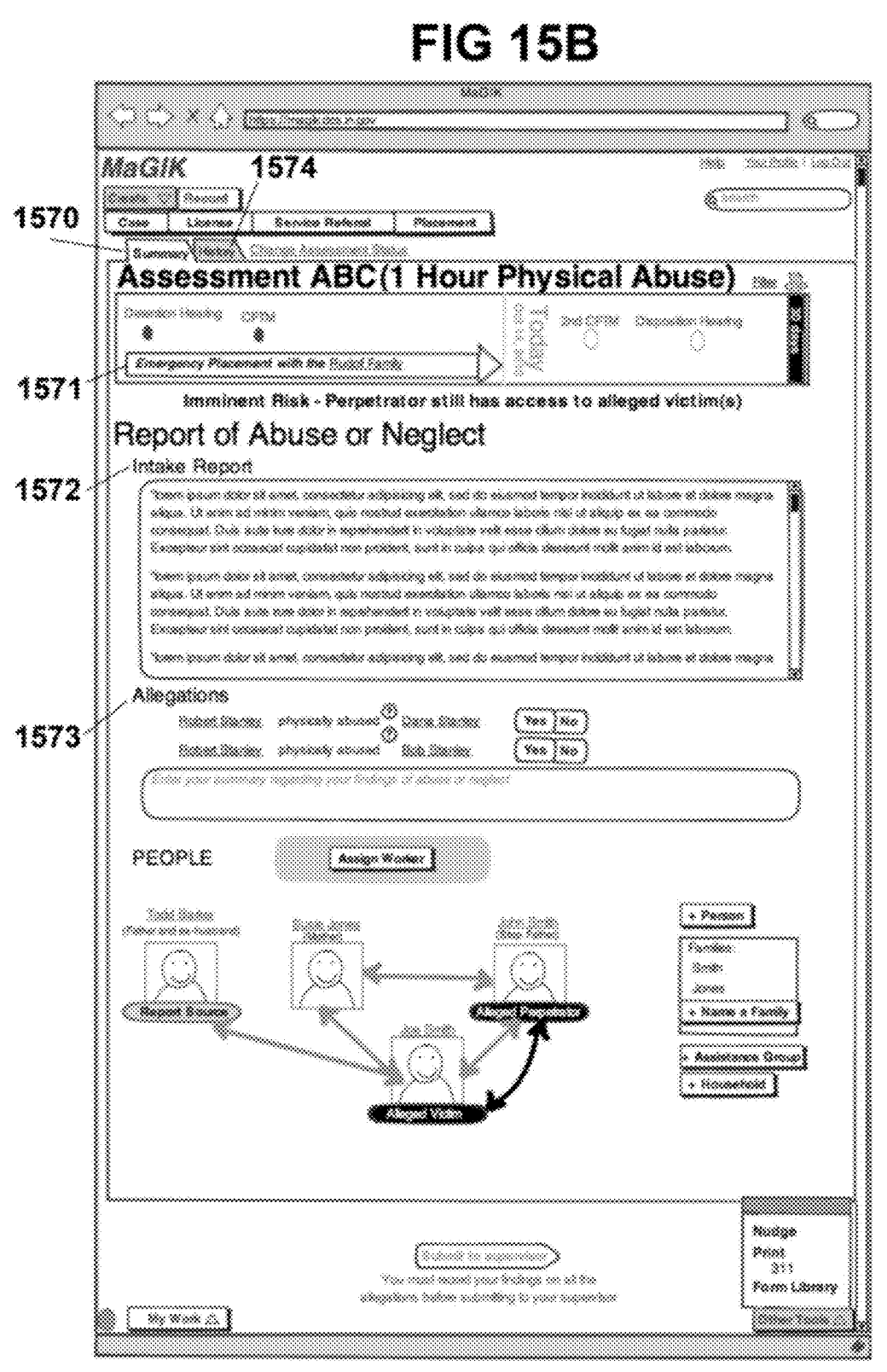

The assigned case worker assesses the case e.g., by investigating the allegation and talking to the people involved, in operation 1565 and provides his or her assessment for review by the supervisor in operation 1566. In particular, the case worker generates assessment summary and history. FIG. 15B is a view illustrating an assessment interface according to an exemplary embodiment. The Assessment Summary 1570 contains: a timeline 1571 that mixes relevant deadlines with case (participant) events such as placements, service delivery dates, dates of removal, and important contacts. Initial report 1572 of abuse or neglect from the central hotline. The initial report is transmitted to the field in an un-editable format to preserve point-in-time accountability and retrospective "what did we know, when?" analysis. The initial report includes: analysis of risk, list of allegations 1573 in the <Alleged Perpetrator> did <verb> to <alleged victim>, initial report summary/notes, list of relevant family members uncovered in the intake process. Each person is checked against a central registry of alleged and proven perpetrators. The initial report also includes name, contact information, and report source of the initial report. Users can add allegations to the assessment. Users can record the disposition for each allegation. Users may write a narrative summary of their allegation findings. Users submit the Assessment for supervisor review & approval. Once submitted, the assessment is snapshotted to provide a point-in-time reference.

Figure 15C:
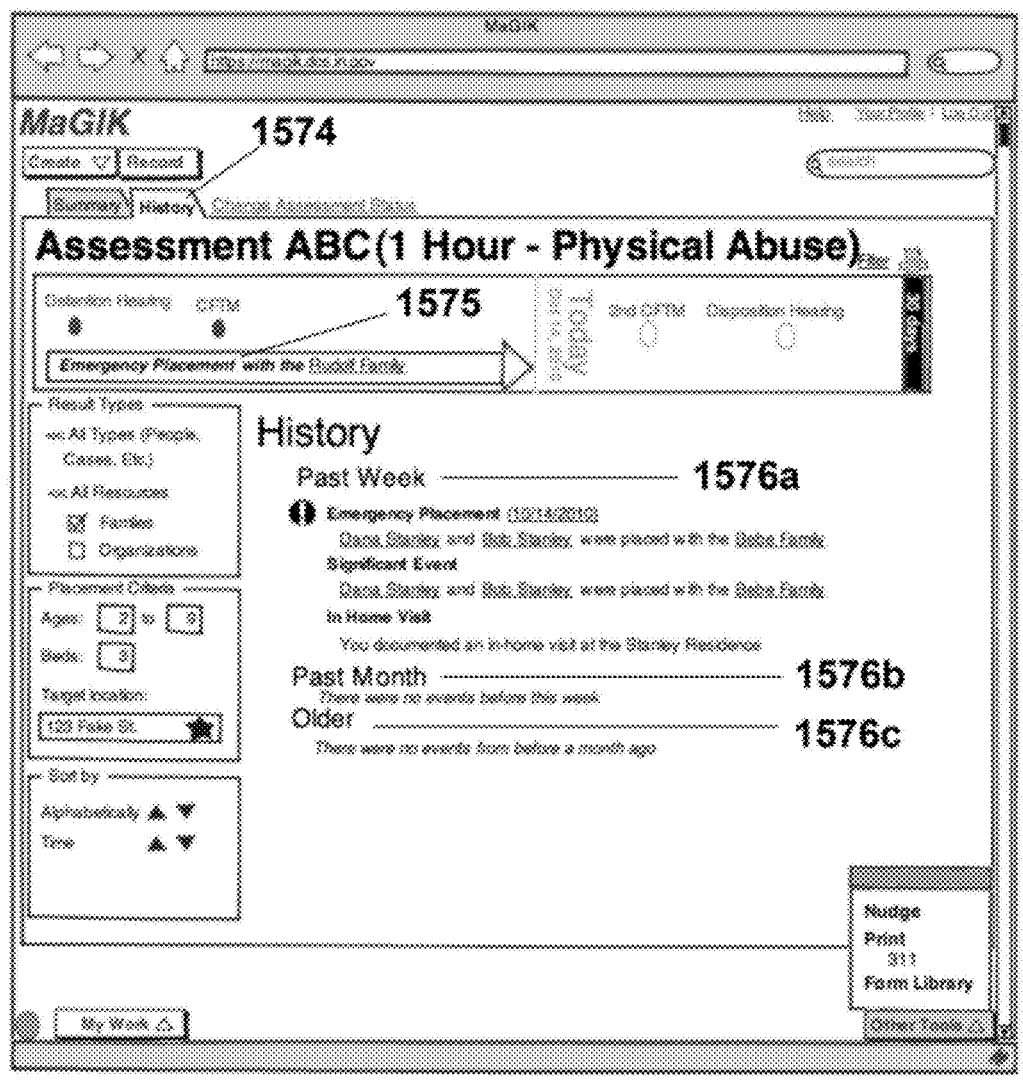

Assessment history 1574 aggregates all actions taking place in an assessment and organizes the data in a chronological format that can be filtered by the user to obtain deeper meaning. When users record events such as placements, contacts, service delivery, service referral, or other events the events populate the assessment history. FIG. 15C is a view showing assessment history interface according to an exemplary embodiment. In the assessment history 1574, the events may be organized by dates with a timeline 1575 and events listed under last week 1576*a*, last month 1576*b*, and older 1576*c*.

In another exemplary embodiment, shown in FIG. 15D, an intake date 1581 is provided, a due date and how late the assessment is for being evaluated in provided 1582. Intake narrative which includes structured and unstructured data is also provided 1583, family network of a child involved in an assessment process is also provided 1584. Once the assessment is completed, the worker may select to submit for review in one of the actions 1585.

The supervisor reviews the intake information and the worker's assessment in operation 1567 (shown in FIG. 15A) and in operation 1568, determines if a) a new case should be opened, b) the allegation and assessment added to an existing case, or c) it should be dismissed. Further, the supervisor may determine that not enough information is present to make the determination and return the assessment back to the worker with or without comments. Additionally, the supervisor may edit the worker assessments and intake. If it is determined that the intake with assessment is added to a case or a new case is created, the case element is displayed which the intake and assessment being auto populated into this case in operation 1569.

In the case element, when an allegation about potential child neglect and/or abuse is received (intake), the case workers will create an ordinary case. They will create and follow a checklist to remind them of the process. They will create home studies and perform whatever other is needed prior to the placement. When their work is done, they will remove themselves from the case. This avoids needing to create a new "unit of work" for receiving kids. When sending a child, the worker will get added to the case, causing it to show up in his/her work queue. He/she will perform whatever services are needed and then remove him/herself from the case. This avoids needing to create a new "unit of work" for sending kids through the system. When a special type of worker is needed, the system will automatically add eligible worker of the needed type to the case.

In a state child welfare case management system, a main page may be provided called Dashboard screen. When a caseworker enters the state child welfare case management system, they are taken to the Dashboard screen, as shown in FIG. 16A. This page details all of a workers assigned work by category including; Open Assessments 1601, Open Cases and Eligibility Applications 1602. Under each worker, the user can see outstanding assessments, cases, and resource families eligibility applications 1603. Each Unit of Work is organized into individual cards that display key pieces of information that a worker would need in order to ensure that the correct card is selected. These individual cards may be viewed when the worker clicks the small yellow triangle to the left of the unit of work for example.

Figure 16B:
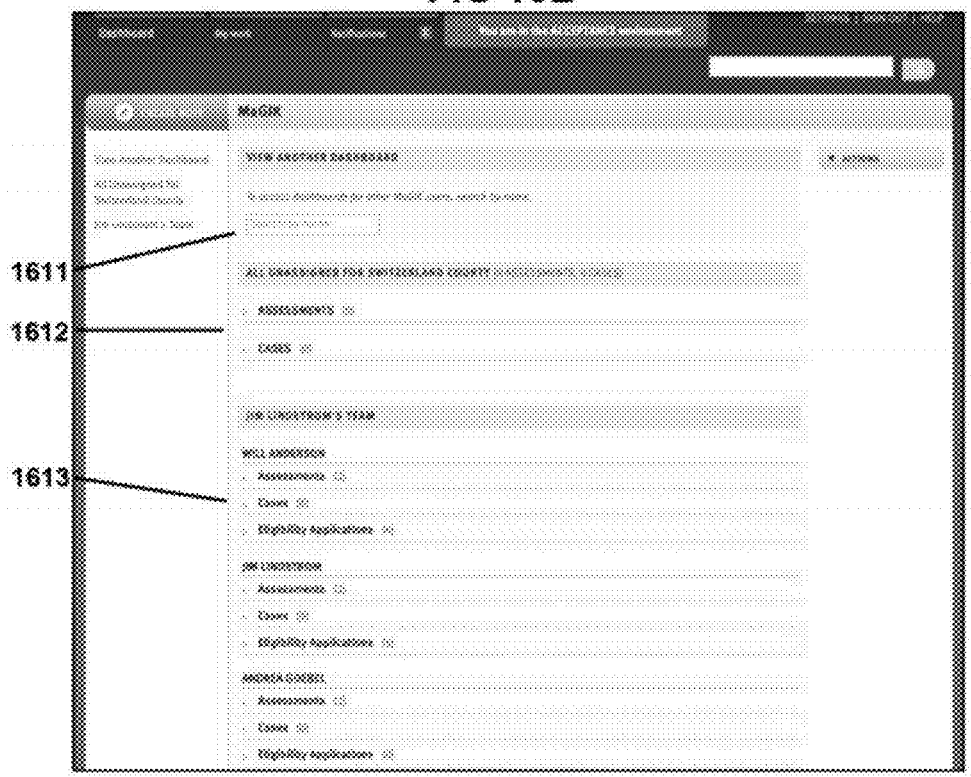

When a supervisor enters the dashboard screen, he or she may have three distinct sections as shown in FIG. 16B. The first section 1611 will allow the supervisor to access the dashboard of any user by searching by name. The second section 1612 will list all unassigned assessments and cases in their county. The third section 1613 will list the names of their team with drop down menus that reveal specific worker's assigned cases and assessments. Supervisors can click the yellow arrows on the left hand side to reveal the details of all the unassigned work and any caseworker's caseload. Once expanded, each individual unit of work will have a card that lists the vital information associated with the assessment or case. In addition, in FIGS. 16A and 16B an action dropdown button may be provided. This feature allows workers to create people, assessments, cases, and resources.

Figure 17:
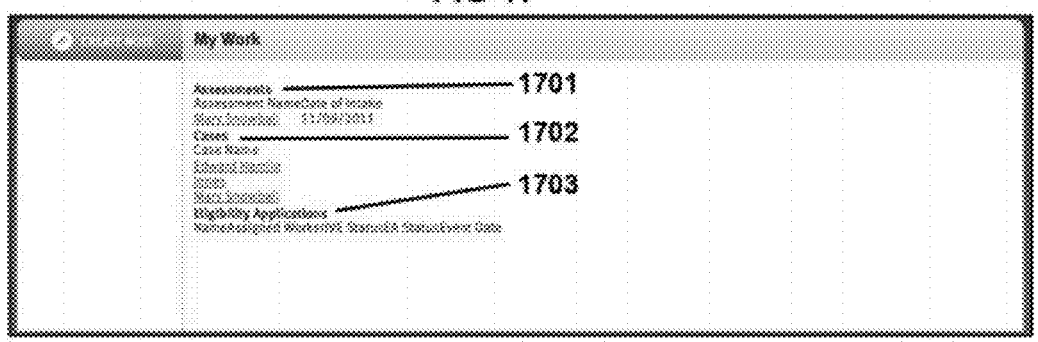
FIG. 17 is a view illustrating my work screen in a state child welfare case management system according to an exemplary embodiment.

In a state child welfare case management system, another main page called my work may be provided. An exemplary my work page is depicted in FIG. 17. Here a worker can see all of their assigned work broken down by type, assessments 1701, cases 1702, and eligibility applications 1703. The name of the assessment or case and the date and time of intakes will appear next to each work notification. Additionally, if a unit of work is newly assigned and has not yet been read by the worker "Unread" appears next to the assignment to bring attention to the new unit of work.

In an exemplary embodiment, assessments 1701 are usually the first unit of work that a user completes. Assessments will be received from an Intake proceeding and they will be assigned to workers by their supervisors. When the user accesses the Assessments they will see the victim, the perpetrator, the allegations and the details of the Intake Report. The user can then complete mandatory contacts, upload evidence, create safety and risk assessment. They then submit the assessment to supervisor, at which point the supervisor can review and send the assessment back to the worker for edits. Finally, a substantiated assessment can be reopened due to client appeal, unsubstantiated and approved. Attached to both Assessments and Cases are Strategic Decision Making Tools and Reports that workers need in order to fully complete an engagement. Assessments can be accessed from the Dashboard, the My Work tab in the top primary navigation bar, or searched for in the universal search bar.

On both the Assessment and Case pages, there are Overview/Summary view and History view. When a worker views the Overview/Summary page they see all of the pertinent information in its most updated state. When the workers view the History page, they see all of notes and contacts that a user has created over the life of the Assessment or Case.

The overview summary view includes left-hand navigation and right-hand navigation, and center page in an exemplary embodiment. The left-hand navigation of an assessment includes the Create Note element, and quick access links to the different sections of the Assessment page including: Overview; Allegation; Intake Information; Family Network; Mandated Contacts; Plans and Tools; File Uploads; Services; Placements and Other Locations; and Assessment Narratives. The right-hand navigation allows a worker to quickly access three often used functions. The menu includes: Assign—this link is present for supervisors and allows them to assign the assessment to a worker; print 311; create a case; and create court hearings. The Print 311—creates a word template form of the 311 form. The worker can type directly into this form, make edits as needed, and then print as they would a regular word document. Create a case link allows the worker to create a case out of the Assessment even without it being substantiated. Create court hearings link allows a worker to create a court hearing. This page includes boxes for: Hearing Type, Hearing Date, and Summary. The user can upload files to be associated with the court hearing and enter the resulting court order. This information can later be viewed in the history section.

In the Quick Information view, the following information is provided: workflow state of the assessment (e.g. supervisor review/substantiated/unsubstantiated), name of the assessing worker, name of the supervisor, county responsible for the Assessment, Date Reported On, and Eligibility Applications tied to the Assessment.

Addition, in a center page, the user is provided with the workflow state. That is, a timeline may be provided showing whether assessment is in progress, in review, or unsubstantiated. In an exemplary embodiment, progress timeline is provided showing the state of the Assessment. In an exemplary embodiment, a time bar may be provided which indicates what type of abuse or neglect was alleged to have occurred and how long the worker has to initiate the Assessment through a face-to-face contact with the victims. When a worker records a contact with the victims, the date and time of this initial contact is recorded. When this occurs, the Initiation Timeline may turn to a different color to indicate the initiation time frame was met successfully. A count down may also be provided from the point when the assessment was created. When a supervisor approves a finished assessment, the countdown ceases, as does the time line decrement.

The assessment page may also include an allegations section. The Allegations section of the Assessment page lists each of the allegations of abuse or neglect that a person has allegedly perpetrated against the focus child in a succinct statement. If the allegation has not been substantiated or unsubstantiated, the worker sees an exclamation point next to the allegation (highlighted below) and a message displays at the top of the section explaining the missing information. Clicking on the exclamation point next to an allegation opens a window which also explains the missing information. The information displayed is created by Central Intake Workers who select a person as a perpetrator, choose a high-level maltreatment type of physical abuse, neglect, or sexual abuse, and then choose a person as the alleged victim. The date and time that the Central Intake Worker creates the allegation is also displayed here. In a system, there are three allegation sub-types: physical abuse, sexual abuse, and neglect. When workers select one of these sub-types and substantiate the allegation an additional box of maltreatment subtypes appears. This box includes more specific information about the abuse. Workers select which types of abuse or neglect a victim has experiences and then save the information into the system.

The Allegation can also be generated from the Intake information. The Intake information includes information that is collected by the Central Intake Unit and is transmitted to the system via a web API. The Intake information provides a description of the incident sent over from Intake and includes fields for: allegation narrative, worker safety, name of person who reported it and their contact information, name of intake worker and supervisor. Editing of the intake information may be disabled.

Before submitting an assessment to their supervisor for approval, users must click the 'Substantiated' or 'Unsubstantiated' button of the Allegation section. A user can change their selection for each allegation until the assessment has been submitted. When Assessments are in review, the user's cannot change these selections unless they recall the Assessment from review or the supervisor sends it back for edits.

b. Searches

In an exemplary state child welfare case management system, a user may search for people, assessments, and cases. That is, workers can search for people, assessments and cases from anywhere in the system. Workers can type in the name of any client, assessment or case and search results—that match the spelling of the search criteria exactly and also that sound like the search criteria—will populate for those three categories. The system also has "Soundex" capabilities. Workers do not have to type in the exact name of an individual in order to return back search results that will capture them. For example if a worker is looking for Bart Simpson but types in BlartSlimpson, the search results will still return Bart Simpson. This means that workers do not have to have the exact information in front of them at all times in order to find the individual that they need.

By way of an example, typing in a single name will provide search results that include profile pages, assessments and cases populated as information cards that give identifying information to the worker that helps them select the correct work. This information includes Personal Demographic Information, Date of birth, Address and contact information, Age, Gender, Race, Caseworker, County, and Date Added On. These information cards are intended to minimize the chance that a worker would select an incorrect unit of work and input the wrong information that would have to be deleted and reentered.

As shown in FIG. 18A, a search for Jones is performed 1801. The results are shown broken down by categories. For example, Jones Assessment for sexual abuse is shown 1802 and Jones Assessment for neglect is shown 1803, opened cases for Jones are also shown 1804 and his information is also provided in 1805.

A search filter called Child Protection Index (CPI) may be set 1806. The CPI is a record of all people that are substantiated and approved victims or perpetrators on an Assessment. When users substantiate an allegation and get supervisor approval for the assessment, the profile pages of perpetrators and victims will show a red text label 'CPI' to indicate they are now entered into the Index. The CPI label will also appear in the search results. When a child victim turns 24 years old the CPI label will cease to display on their record, this only applies to victims, perpetrators do not have the CPI removed from their name at any point. The CPI label will also be removed if the Assessment is reopened due to appeal, unsubstantiated and then approved in the unsubstantiated state. Often workers need to understand if a victim or a perpetrator is in the Child Protection Index, which keeps track of all prior events for victims and perpetrators. When typing in a person's name, the search results can sometimes number in the hundreds. In order to just see the CPI results, there is a CPI toggle button to filter the search results.

Figure 18B:
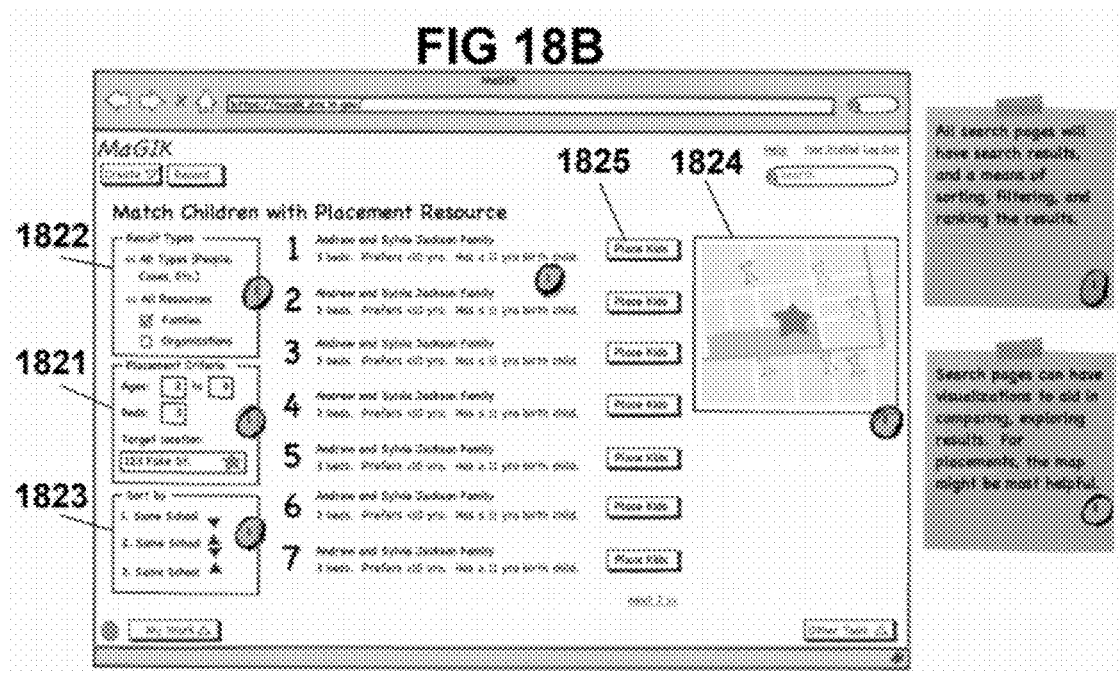

FIG. 18B is a view illustrating search results for matching a child with a placement resource according to an exemplary embodiment. In FIG. 18, a search is performed to match a child with a placement family. Placement criteria is specified 1821 and filters may be set 1822. The user may further sort the results 1823 e.g., use distance to sort the results. A map 1824 may be provided to show location of various placement resources. They user may select a placement resource 1825.

c. Notes

The case management system identifies a context and offers a suggestion to the user (an educated guess) of what the user is going to enter. When the user begins to enter keywords into a Subject field, the tool begins to populate with additional structured fields. For example, if a Worker types "Placem." into the Subject section, the interface will begin to add start and end dates, type of placement, address, etc. If a worker begins by entering a narrative string, the application will analyze the string for patterns and propose matches. So, if a user enters "Today I met with Susan and she told me about the birthday party they had for Roger on October 8th at McDonalds." A suggestion will appear to include today's date, and to enter an event for October 8th with Susan and Roger at McDonalds.

Figure 19:
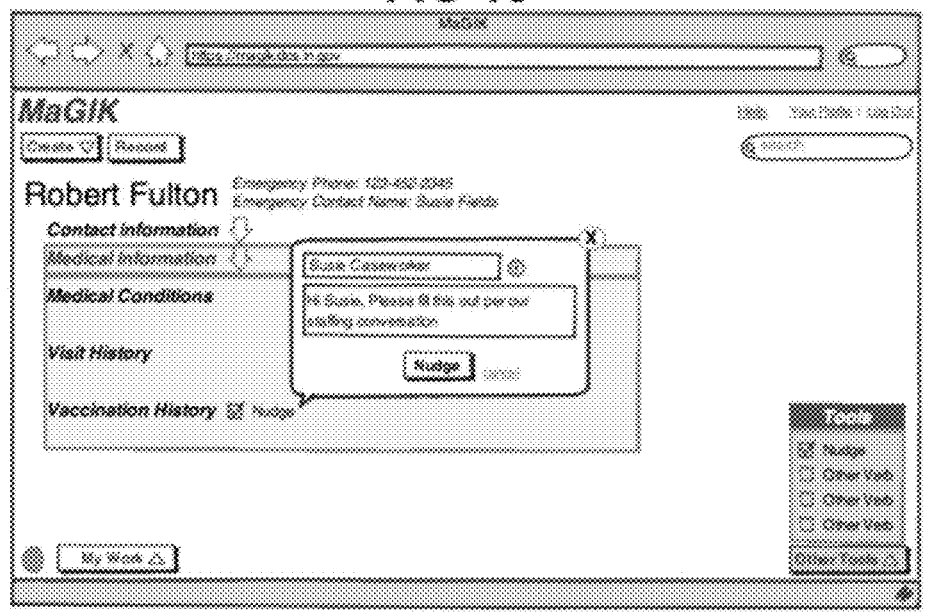
FIG. 19 is a view illustrating exemplary Supervisory Nudge/notification according to an exemplary embodiment.

Additionally, users will utilize shortcuts to enter frequently recorded pieces of data like placements, medical information, and service referrals (among others). Moreover, as illustrated in FIG. 19, supervisory nudge/notification is provided to remind the worker to fill in certain information. For example, when the worker fills in medical information for a child, a reminder may pop up asking the worker to fill in the vaccination history, as shown in FIG. 19

Figure 20:
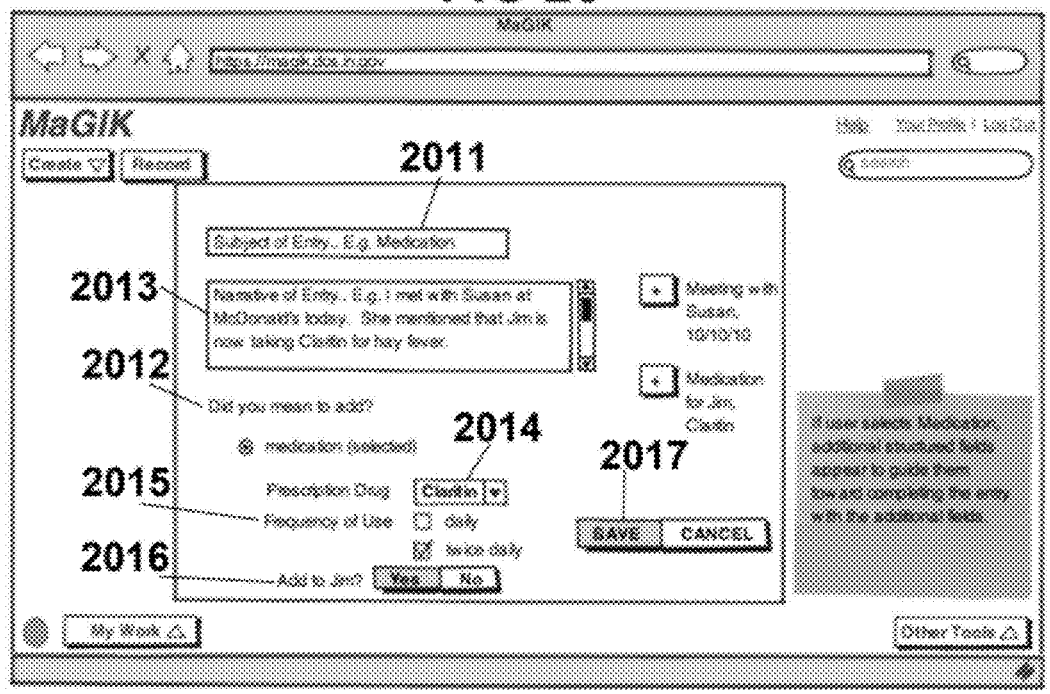
FIG. 20 is a view illustrating notes attribute in a state child welfare case management system according to an exemplary embodiment.

Users will click on a "New Placement" button that will take them to a pre-populated screen with as much contextual information as available and the relevant placement fields ready to be filled in by the user. FIG. 20 is a view illustrating an interface which identifies narrative notes according to an exemplary embodiment. In FIG. 20, in the subject 2011, the user types medication. A question 2012 may appear asking if the user is inputting medication. If the user answers "yes", the case management system may then monitor user input for various drug names. For example, when the user inputs "Claritin" 2013, a new question will appear asking "name" 2014, frequency 2015, and person 2016. Once the user selects save 2017, the information is added to the person and as such is linked to all cases, resource families that the person is listed in.

The Create Note function is available to all worker roles from most pages within the system. Not only does it commonly appear, but the button also follows the workers as they scroll up and down whatever page they are on. This function allows the worker to write narrative text into an empty box and then immediately fill in relevant and related data associated with the narrative.

Create Note is where workers will go to record important information for the case, including contacts, phone numbers, medications, medical conditions, allegations, child and family team meetings, and conversations with colleagues pertaining to the assessment. Placing this in the note provides the workers with added flexibility and a place to record all information that they need to capture.

Workers can launch the create note function at any time. In the note, they will use the autocomplete search box to select the unit of work (i.e. child, assessment, case) about which they would like to write a note. If a worker clicks 'Create Note' from an assessment page, the system will automatically place that unit of work in the dropdown box. If this is not correct, the worker can override this default by selecting anther unit of work from the autocomplete search results. Once the correct unit of work is selected, the worker writes narrative text into the empty text box. When the note is complete, the worker clicks 'Save and Process'.

The General Entry Tool or GET provides workers the opportunity to capture more information while entering a Note. After the worker clicks 'Save and Process', they will be taken to a new screen that allows the worker to specify which type of Note they are entering. On the screen the worker will see the text of the original note they just entered and a drop down menu below the text. This dropdown menu lists: Allegations (From Assessment pages only); Contact; Phone Number; Medical Conditions; Medications; and Child and Family Team Meeting. The worker will select from this drop down menu and then click "Add". Workers will notice a reminder in the top right hand corner that the note is 'editable for 30 days.' The system allows edits to Notes for 30 days and then locks the text for editing.

When the type of supplementary notes is selected and the worker clicks 'Add', further text boxes expand on the page. Functionality for these boxes includes auto-complete boxes for names. At the end of each supplementary note box, the user may select add to add the information to the system. As seen in the first "Add to the Note" box above, when a worker types in a phone number in the initial Note text box, and clicks save, the phone number will appear highlighted in blue. Workers can click the highlighted phone number and a yellow box will appear. The yellow "Add a Phone Number" box is designed to be clicked. When clicked, the Add a Phone number box will expand below, and the user can add the contact information necessary. This is provided by way of an example only and not by way of a limitation. This prompt system might be extended to other key words.

d. Relationship Representation

Figure 21:
FIG. 21 is a view illustrating a family network in a state child welfare case management system according to an exemplary embodiment.

In an exemplary state child welfare case management system, the Family Network diagram displays the household members and all people related to a victim on the assessment, as shown in FIG. 21. In an exemplary FIG. 21, the family network diagram displays the victim Andy Keaton. That is, the network diagram picks the first child victim in an allegation and focuses the network around him/her. When viewing the Family Network, a user can click in the card and drag the mouse to the right or left. This will continue to display further relationships that do not appear in the central overview page.

Each person on the diagram has his or her own perspective in the family network. When the user changes the family network perspective from one person to the other, the way the network looks will also change. This is because Mothers and Father will have different relationship webs from their children, and doctors will have different relationship webs from their patients, etc. Workers can also change the perspective of the network diagram without leaving this specific page by clicking on the yellow boxes of other people shown. This will display another person's perspective and relationships from within the page.

A worker can navigate to the person's Profile page by clicking on any name in the diagram, where they can then review, edit, and add information to the person's profile page.

Relationships between people are spatially represented by the placement of their avatar in relation to the avatar of other people. For example, members of the same household (people listed at the same address) are also visually noted in the Family Network page. For any person who shares the exact same address as the victim, their individual rectangle will appear in a shared larger rectangular box that represents the household. Family members that are not in the household will appear outside the household box. For instance, a Grandmother that does not live at the same address as a focus child will appear at the top right hand corner of the family network because they are above the parents but outside of the household. In the state child welfare case management system, there is a class of relationships outside of family members named formal and informal support persons. Informal and formal support persons are persons who are not relatives of the focus child but still involved with the case. These individuals appear below the household in a separate box. Exemplary formal and informal relationships are shown in FIG. 20. These relationships are shown by way of an example and not by way of a limitation. Many other types of relationships can be selected in the system. The user can add the relationships, edit the relationships, and delete the relationships via easy user interfaces.

For example, to Add/Edit/Delete a Relationship, the user can navigate via edit/add/delete buttons or select the functionality via a drop down menu. A new page is provided to edit the family relationships. On this page worker drop down tabs may be provided for Household, Extended Family, Formal Supports, and Informal supports. A person's relationships with individuals will be sorted into these categories. When these pages are expanded, the individuals in that category will expand with all of their relationship types listed under these names. The relationship types have arrows underneath them that reveal the number of people who fit that relationship type for them. When a dropdown list is clicked a list of names is revealed. Workers can click "Edit" to edit a relationship or the "x" button to delete a relationship. The information contained in a card includes the Name, Age, relationship type and the duration of the relationship, i.e. when the relationship began and ended.

In order to bulk add relationships, i.e. add many of the same relationship at a time, the user may fill in the appropriate information, and then click the 'Add' button, then click the 'Save' button. Worker can add multiple people to a relationship at same time using blue links circled for example.

e. Eligibility Element

The Eligibility Application functions around a set of rules that have been set by Federal standards. Previously all Eligibility Applications were completed by the workers assigned to a case. A new policy set by federal or state government will require most of the Eligibility Application to be processed by the Central Eligibility Unit (CEU). Accordingly, the Eligibility Application link is only visible to the CEU worker in the system. The system deals with four eligibility programs, which include: Emergency Assistance, Guardianship Assistance, and Adoption Assistance. The workflow that triggers each different eligibility program is different and are briefly explained below.

In Emergency Assistance program, an assigned worker will gather the majority of demographic information and complete the actions that initiate an Eligibility Application. When a worker gives a child an IA case involvement and their supervisor approves an IA plan, the system is triggered to automatically create an Eligibility application on the back end, i.e. the application is created without any action from the users. These actions also trigger the start of the 30-day Eligibility clock which requires all of the necessary information for the application be gathered within that time frame.

The application in the system revolves around an event month and the individuals that live in the same household as the focus child during the specific month. The system locates all individuals that share an address with the focus child during the month in question and also indicates if all the needed information has been compiled and indicates what is missing.

The system forces users to enter beginning and end dates for addresses so the application can capture this information. The system also excludes any person who received SSI or AAP in the event month. Families must be under 250% of the poverty level in order to qualify for federal aid and the system program will help users prioritize eligibility applications and work with the most likely applications first. Focus children are not eligible if they are a JD/JS case. Anyone who has not had his or her US citizenship verified will automatically be ineligible. All household members (i.e. individuals who share the same address) must have a value entered for earned or unearned incomes. The date of the eligibility application is set as soon as the supervisor approves the IA plan for a child. The living arrangements for people are now imported into the system which will help users move forward with eligibility applications. This feedback tooltip is in real-time, meaning that as users update a client's information, the tool will re-assess and make a new suggestion. The eligibility dashboard shows the workers all open eligibility applications that are not submitted.

Figure 23:
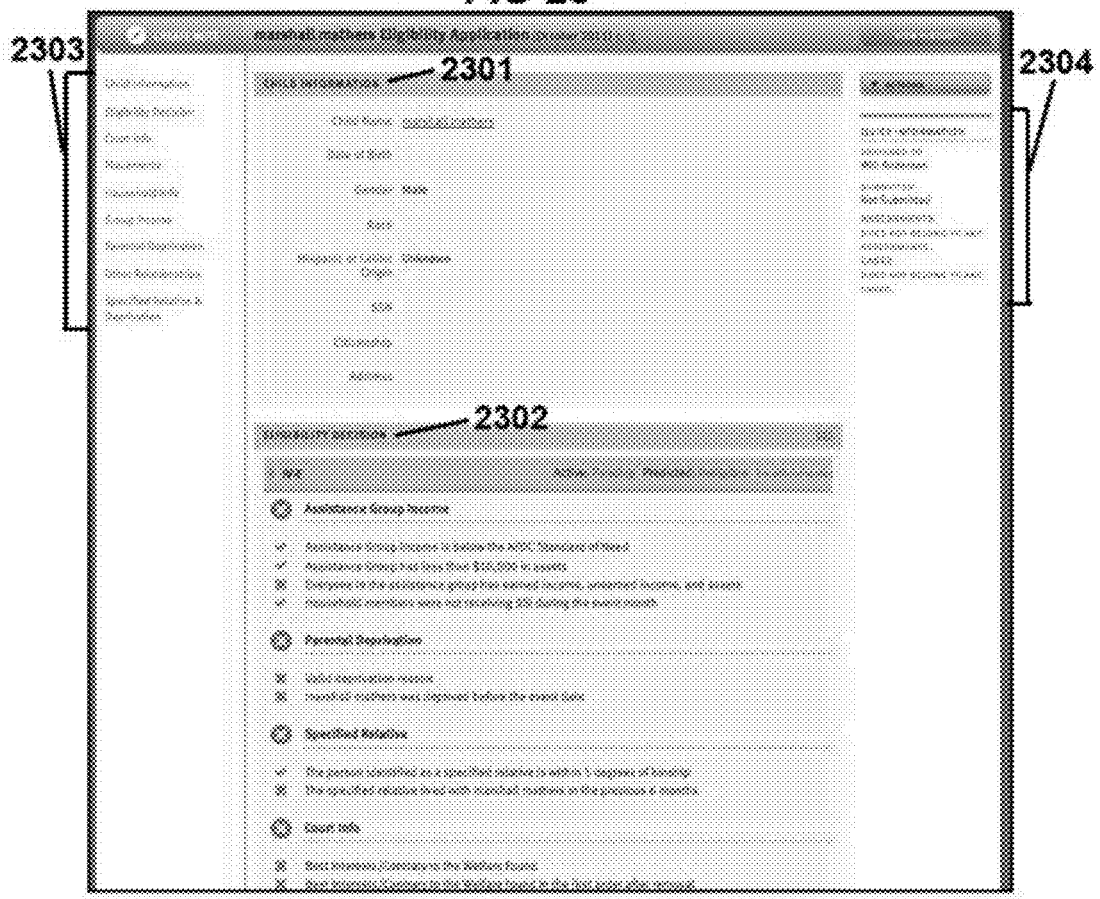
FIG. 23 is a view illustrating an exemplary eligibility component in a state child welfare case management system according to an exemplary embodiment.

The Eligibility page is structured as the other major unit of work in the system. An exemplary eligibility page is illustrated in FIG. 23. In FIG. 23, child information 2301 and eligibility decisions 2302 are shown. There is the Overview view, with the Left Hand Navigation Jump Menu 2304 and the Right Hand Quick Information button 2304. There is the History view (not shown) which is a historical record that shows all of the events that occurred in multiple eligibility applications based on episodes, i.e. triggers that automatically generated applications. The Jump Menu allows users to jump to a specific portion of the case without having to scroll. The menu follows users as they scroll down the page. The Quick Information menu details the state of the case, who the case is assigned to, and the county the case takes place in.

In addition, the Emergency Assistance Overview page may include the eligibility decision in an at-a-glance summary of a given focus child's status in any of the eligibility applications that they are connected to, as shown in FIG. 23. The eligibility programs, as well as Medicaid and SSN are listed, and the Active and Predicted status of the application is also listed. When the text next to the active and predicted statuses is red, they can be clicked and the system will indicate that information is missing. Also a button "Set Active Status" may be provided. When this button is clicked, it transfers the Predicted status to the Active status location. There may also be another icon such as a yellow arrow next to the Emergency Assistance. When clicked this arrow drops down a checklist that will help the worker determine which information is missing from the Eligibility Application. Missing information may be emphasized e.g., marked with a red X, and completed information is also indicated e.g., marked with a green check mark. This is provided by way of an example and not by way of a limitation. Many variations of the above-described implementation are within the scope of an inventive concept.

The system allows an assigned worker to gather the majority of demographic information and complete the actions that initiate an Eligibility Application. The system is triggered to automatically create an Eligibility application on the backend by a few methods, first when a worker gives a child an IA case involvement and their supervisor approves an IA plan, when the court approves a CHINS [what is CHINS] petition and when a placement is made. Generating the application on the back means the application is created without any action from the users. These actions also trigger the start of the 30-day Eligibility clock which requires all of the necessary information for the application be gathered within that time frame. In an eligibility program, a center page may include information cards that describe a given focus child's identify information, eligibility decision, court hearings, placements, household, group income, other relationships parental deprivations, and specified relative and deprivation. These cards are populated with information previously entered into the assessments and cases related to the given focus child. The cards that can be edited from this page include eligibility decision and specified relative and deprivation; these cards have a 'edit' link in the top right hand corner.

Similar to the Emergency Assessment eligibility decision, this is an at-a-glance summary of a given focus child's status in any of the eligibility applications that they are connected to. There are two sections, one for IV-E requirements for the governmental requirements and one for Emergency Assistance. Eligibility decision includes information about any hearings or court orders related to the focus child. This information is populated with information that has been previously entered in related cases or assessments. If a worker finds information for a court order previously not found, the worker can click the found check box and fill in the pop up box that opens to update the court info box on the eligibility application. Workers can select a court hearing from the pre-populated list, enter a QUEST URL, and date to create a court language citation.

This information about the placements of the focus child is also provided. Information about the current placement is easily viewed. The placement history can be viewed by expanding the card by clicking the small yellow triangle to the left of the subheading. In addition, the income details for every member in same household as the focus child are also provided. The people listed will align with the household listed on the related assessment or case page in the family network. The name of the family member is a link that takes the worker to his/her person profile page. A box which lists the parents of the given focus child and illustrates whether or not they have deprived the focus child is provided. The worker selects the appropriate checkbox and, if the parent has deprived the focus child, a pop up box appears to allow the worker to describe the nature of deprivation and the date the incident occurred.

A box which lists detailed information about people related to the focus child and which are outside of the household, is also provided. These people are also listed in the focus child's family network. The information contained in this box is condensed by default; the worker only sees the total number of other relatives and supports with information contained in this box. The box can be expanded to allow the worker to see detailed income information about people related to the focus child outside of the household. The expanded view also includes a box in the upper right hand corner that is highlighted yellow if the person is a member in the IV-E eligibility group.

A Specified Relative and Deprivation box is also provided and is automatically populated by the system with information entered into the focus child's related assessments or case. Any relative within five degrees of blood relation to the focus child that he/she has lived with in the six months prior to the eligibility application will be included in this box. Information such as the relative's name, judicial removal date, physical removal date, the date the focus child last lived with the relative, and type of deprivation are included. Workers can edit this information as needed by clicking the edit link in the upper right hand corner. Specifically, the worker may select a specific relative, fill in associated dates, and the nature of the deprivation. The nature of the deprivation may be selected from a drop down menu.

This licensing section reviews the features in the system that will be most commonly used by the Central Licensing unit. The workflow begins when the system places a child in one of two resource types, Foster Family Home or Residential Resource. This resource then gets fed into the New Resource Index. Licensing workers will verify that it is not a duplicate and if the resource is not yet licensed, they will begin the licensing process for the resource.

The other exemplary main workflow is the process that potential resources must go through to become fully licensed resources by the government. In this workflow, resource applicants submit to become either a Foster Family Home, a Residential Resource or a Service Provider, and the Licensing workers ensure that all necessary components of the application are present and complete. These components are compiled in a number of checklists present in the system.

f. New Resource Index

Figure 24:
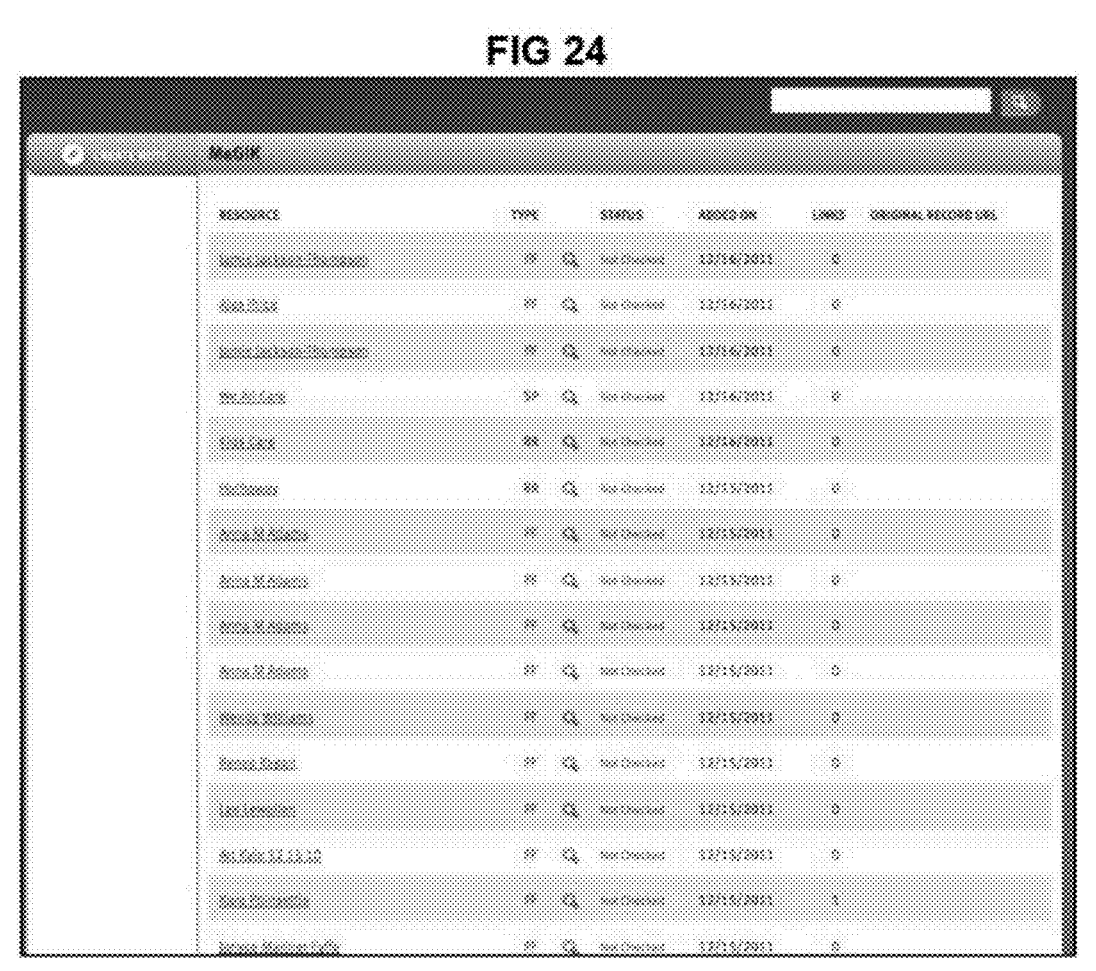

Another page is a new resource index where resource workers verify that resources created are not duplicate resources, as shown in FIG. 24. The types shown in FIG. 24 refer to the type of resource (FF=foster family; RR=Residential Resource; SP=Service Provider). This screen populates as workers enter resources into the system to place children. The status refers to whether a licensing worker has checked for a duplicate resource in the system. Clicking the magnifying glass opens up a search for the resource in a new tab. Once the licensing worker has performed this search, they can click the link in the status column and select: verify (for a new unique resource) or duplicate (and enter an ID number to link back to the original resource).

From this page, workers understand which type of resource they are looking at, the resource status, either verified, duplicate or not checked, what date the resource was added on, search for all instances of a resource by clicking on the magnifying glass, see how many children are linked to a specific assessment and the Url for the original record, if the resource does turn out to be a duplicate. This page allows resource workers to quickly and easily understand which resources have been recently entered, if they are a unique record, or if they are a duplicate of an already existing resource. In the latter instance, Resource workers must work to rectify duplicate resources. The Resource worker alerts the other workers that the file they created is a duplicate and then the worker must go into all cases or assessments that contain the duplicate as a resource and switch the placement to the original, proper resource. Workers can edit the status of a resource by clicking on the link in the status column. This will bring up a pop up box where the worker can change the status using a drop down menu. In the status section, if workers enter that a resource is a duplicate of (Original), they must enter the Resource number of the original resource. This is located in the quick information box on the right hand side of the main resource page. Resource workers should locate and take note of this number when they have concluded that resource is a duplicate during the search process. Pressing "Save" will updated the resource list. The resource may be edited including resource information, license summary, application/inquiry details, placements, checklists, plans and reports, and file uploads.

A page which contains general needed information about the applicant that is applying to become a resource may be provided. It includes the applicant(s), the family structure which must be filled out, the address of the resource, and with county, supervising agency and licensing worker will be involved in the application. This page may include drop down arrows which expand and hide information in the card. When workers click edit they are taken to an edit page where they can add and edit information for the card. Editing this page also populates the licensing summary card. Once a resource is fully licensed many changes to this information like editing the address, require a checklist of information to be completed and submitted for approval before the change is made final on the page.

Another page may be an application inquiry page. This page details the reason why the resource applicant wishes to be licensed and allows workers to detail any previous fostering experience the resource may have had. This would be relevant if an individual was licensing in another state and wished to become licensed in a different state as well.

Another page may be a checklist card. This card lists the many checklists that have to be completed before an application can be submitted to the supervisor for approval. These checklists cover the initial licensing process, the annual review processes, and changes to the license processes such as change in address or change in capacity. When a checklist is created an edit page is accessible to workers. There workers fill out the date in which they receive a necessary part of the application. Workers can save this information and revisit the checklists over a period of months, as the information is time-consuming to compile. Once the checklist is complete the application in its entirety can be submitted for approval.

The state child welfare case management system includes many detail implementations of various views, pages, cards, and so on. These detailed implementations are provided by way of an example only and not by way of a limitation. Many variations will be readily apparent to one of ordinary skill in the art.

6) Concluding Remarks Regarding an Exemplary Case Management System

The views, flowcharts, and block diagrams in the FIGS. illustrate the architecture, functionality, and operation of possible implementations of the case management systems, methods and computer program products according to various exemplary embodiments. In this regard, each element in the view, flowchart, or a block diagram may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or two blocks may sometimes be executed in the reverse order, depending upon the functionality involved. It will also be noted that each block of the block diagram and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a.", "an" and "the" are intended to include the plural forms as well, unless the context clearly indicates otherwise. It will be further understood that the terms "includes", "including," "comprises," and/or "comprising" when used in this specification, specify the presence of stated features, integers, steps, operations, elements, and/or components, but do not preclude the presence or addition of one or more other features, integers, steps, operations, elements, components, and/or groups thereof.

The description of the exemplary embodiments has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An entity-centric social welfare services management method with a temporal aspect, comprising:
   receiving, by a computer, user input data about at least one minor child and entities, and storing the received user input data in a memory;
   automatically linking, by the computer, said at least one minor child and the entities based on relationships between said at least one minor child and the entities;
   assigning, by the computer, to each of the entities, in relation to the at least one minor child, a relationship category from among a plurality of relationship categories comprising a family member, a formal support person, and an informal support person;
   organizing and storing in the memory the input data based on the automatic linking in an entity-centric datastore;
   generating at least one view comprising information about said at least one minor child and said assigned categories of said entities related to said at least one minor child, each with a respective temporal attribute indicating a duration of a relationship in the assigned category with respect to each of said entities, and information about a government defined unit of work;
   performing the government defined unit of work utilizing the generated at least one view,
   wherein the government defined unit of work relates to the social welfare services,
   wherein the organizing of the input data is primarily based on the relationships among the entities and the at least one minor child,
   wherein the temporal attribute tracks the duration of the respective assigned category of the relationship between said at least one minor child and each of said entities, thereby temporally tracking relationships in the entity-centric datastore, and
   wherein the family member category comprises a kin type sub-category.

2. The social welfare services management method according to claim 1, wherein:
   the generating and performing the government defined unit of work comprises at least one of: processing an allegation about child abuse or neglect of the minor child, performing placement of the minor child, managing history information about the minor child, referring to services the minor child or at least one related entity, generating a service plan for the minor child, managing documents related to the social welfare services and to the minor child, and
   the method further comprising: generating a new case comprising user input data regarding a plurality of the government defined units of work with respect to the same minor child, and organizing data of the generated new case to store in the entity-centric datastore based on the relationships of the same minor child with other entities from among the entities involved in the generated new case.

3. The social welfare services management method according to claim 1, wherein the entities comprise at least one perpetrator involved in at least two cases of abuse or neglect of the at least one minor child, wherein the linking comprises automatically linking the perpetrator to the entities involved in the at least two cases.

4. The social welfare services management method according to claim 1, wherein the linking comprises automatically linking, by the computer, a first entity from among the entities from a first case to a second entity from among the entities from a second case based on the kin type of relationship subcategory such that the first entity and the second entity involved in different allegations with respect to the minor child are linked to the minor child.

5. The social welfare services management method according to claim 1, wherein the user input data further comprises initial intake information regarding an event involving the minor child and wherein the at least one view generated by the computer comprises a first view with structured fields configured to receive input of the initial intake information;
   determining whether to generate a new case based on whether the initial intake information input into the structured fields meets a predetermined criteria;
   in response to the determining that the initial intake information meets the predetermined criteria, generating a second view comprising a plurality of additional structured fields configured to receive input of data related to a plurality of government defined units of work.

6. The social welfare services management method according to claim 5, further comprising:
   if the intake is screened in, generating assessment information with respect to the intake information;
   evaluating the assessment information based on the predetermined criteria; and
   if the predetermined criteria is satisfied, generating the case and linking the assessment information to the case.

7. The social welfare services management method according to claim 1, further comprising:
   selecting a subject comprising at least one of the minor child, a parent, or a child welfare related entity,
   automatically generating, by a computer, a social network and relationships with respect to the selected subject based on data about the minor child and the entities stored in the memory; and
   displaying the generated social network and the relationships for each of displayed entity with respect to the selected subject,
   wherein each of the relationships is displayed with a trajectory showing progression of the respective relationship overtime.

8. The social welfare services management method according to claim 7, further comprising selecting a number of levels of the relationship categories for the generating of the social network and wherein a first entity from among the entities is assigned to at least two different distinct categories from among the plurality relationship categories with respect to the minor child and wherein trajectories of the two different distinct categories are independently tracked.

9. The social welfare services management method according to claim 1, further comprising:
   inputting additional data related to the social welfare services in a freeform text with respect to the government defined unit of work;
   applying pattern recognition to the input additional data in the freeform text;
   extracting at least one data element from the input additional data based on the applying pattern recognition;
   generating a new record in the entity-centric database for each of the extracted at least one data element; and
   automatically adding the generated new record to at least two different forms.

10. The social welfare services management method according to claim 1, further comprising:
    inputting placements of the at least one minor child, wherein the at least one minor child comprises at least two children;
    generating a metric pair diagram based on the placements; and
    displaying the generated pair metric diagram.

11. The social welfare service management method according to claim 10, further comprising: automatically linking an initial placement of each child with a predominant placement, wherein the displaying comprises displaying the generated metric pair diagram which shows a number of placements for said each child and a type of each placement.

12. The social welfare service management method according to claim 10, wherein the displaying further comprises displaying an indicator illustrating an initial placement place for each of displayed predominant placements.

13. The social welfare service management method according to claim 10, wherein, in response to receiving a selection of a placement, displaying children in the selected placement, and in response to one of the children being selected, displaying data for the selected one child.

14. The social welfare service management method according to claim 10, further comprising modifying the displayed metric pair diagram based on user manipulation of at least one of the placements displayed in the metric pair diagram.

15. The social welfare services management method according to claim 1, further comprising:
    input placements of at least two of the entities, wherein the at least two of the entities are children;
    sorting the input placements into bins representing unique permutation of placement types; and
    displaying the sorted placement sequences in a placement trajectory diagram.

16. The social welfare services management method according to claim 15, wherein the placement trajectory diagram is an icicle diagram and wherein each block in the placement trajectory diagram is user-interactive.

17. The social welfare services management method according to claim 1, wherein the government defined unit of work comprises: referring social services to the minor child or at least one of the entities linked to the minor child and wherein the performing the government defined unit of work comprises generating notes in which user free style input is structured into a plurality of predetermined fields.

18. An entity-centric social welfare services management apparatus with a temporal aspect, comprising:
    a memory storing software instructions; and
    a processor executing the software instructions, wherein the software instructions comprise:
    receiving user input data about at least one minor child and entities and storing the received user input data in the memory;
    automatically linking, by the processor, said at least one minor child and the entities based on relationships between said at least one minor child and the entities;
    assigning, by the computer, to each of the entities, in relation to the at least one minor child, a relationship category from among a plurality of relationship categories comprising a family member, a formal support person, and an informal support person;
    organizing and storing in the memory the input data based on the automatic linking in an entity-centric datastore;
    generating at least one view comprising information about said at least one minor child and said assigned categories of said entities related to said at least one minor child, each with a respective temporal attribute indicating a duration of a relationship in the assigned category with respect to each of said entities, and information about a government defined unit of work; and controlling the generated at least one view to perform the government defined unit of work based on received input, wherein the government defined unit of work relates to the social welfare services, and wherein the organizing of the input data is primarily based on the relationships among the entities and the at least one minor child, wherein the temporal attribute tracks the duration of the respective assigned category of the relationship between said at least one minor child and each of the entities, wherein the temporal attribute tracks the duration of the respective assigned category of the relationship between said at least one minor child and each of said entities, thereby temporally tracking relationships in the entity-centric datastore, and wherein the family member category comprises a kin type sub-category.

19. The social welfare services management apparatus according to claim 18, wherein the government defined unit of work comprises at least one of: processing an allegation about child abuse or neglect of the minor child, performing placement of the minor child, managing history information about the minor child, referring to services the minor child or at least one related entity, generating a service plan for the minor child, managing documents related to the social welfare services and to the minor child and wherein the software instructions further comprise generating a new case comprising user input data regarding a plurality of the government defined units of work with respect to the same minor child, and organizing data of the generated new case to store in the entity-centric datastore based on the relationships of the same minor child with other entities involved in the generated new case.

20. The social welfare services management apparatus according to claim 18, wherein the entities comprise at least one perpetrator involved in at least two cases of abuse or neglect of a minor child and wherein the automatic linking comprises linking the perpetrator to other entities involved in the at least two cases.

21. The social welfare services management apparatus according to claim 18, wherein the automatic linking comprises automatically linking entities from different cases based on familial or indirect relationships such that entities involved in different allegations for the minor child are linked to the child.

22. The social welfare services management apparatus according to claim 18, wherein the user input data further comprises initial intake information regarding an event involving the minor child and wherein the software instructions further comprise: generating the government defined unit of work based on the initial intake information; determining whether to generate a new case based on whether the initial intake information meets a predetermined criteria; and generating a plurality of government defined units of work for forming the new case based on the determining that the initial intake information meets the predetermined criteria.

23. The social welfare services management apparatus according to claim 22, wherein the software instructions further comprise:

if the intake is screened in, generating assessment information with respect to the intake information;

evaluating the assessment information based on the predetermined criteria; and if the predetermined criteria is satisfied, generating the case and linking the assessment information to the case.

24. The social welfare services management apparatus according to claim 18, wherein the software instructions further comprise:

selecting an entity comprising at least one of the minor child, a parent, or a child welfare related entity, automatically generating a social network and relationships with respect to the selected entity based on data about the entities stored in a datastore; and displaying the generated social network and the relationships for each of displayed entity with respect to the selected entity.

25. The social welfare services management apparatus according to claim 24, wherein the software instructions further comprise selecting number of levels of relations for the generating of the social network.

26. The social welfare services management apparatus according to claim 18, wherein the software instructions further comprise: generating a case involving at least one of the linked entities; and generating an email dedicated to the case.

27. The social welfare services management apparatus according to claim 18, wherein the software instructions further comprise: inputting additional data related to the social welfare services in a freeform text with respect to the government defined unit of work and applying pattern recognition to the input additional data in the freeform text to pre-populate forms based on the input additional data.

28. The social welfare services management apparatus according to claim 18, wherein the software instructions further comprise:

inputting placements of at least two of the entities, wherein the at least two of the entities are children;

generating a metric pair diagram based on the placements; and displaying the generated metric pair diagram.

29. The social welfare service management apparatus according to claim 28, wherein the software instructions further comprise: automatically linking an initial placement of each child with a predominant placement and generating a diagram depicting a number of placements for said each child and a type of each placement.

30. The social welfare service management apparatus according to claim 28, wherein the software instruction of displaying further comprises displaying an indicator illustrating an initial placement for each of displayed predominant placements.

31. The social welfare service management apparatus according to claim 28, wherein the software instructions further comprise in response to a placement being selected, displaying children in the selected placement, and in response to one of the children being selected, displaying data for the selected one child.

32. The social welfare service management apparatus according to claim 28, wherein the software instructions further comprise:

receiving user manipulation of the placements displayed in the metric pair diagram; and modifying the displayed metric pair diagram based on the received user manipulation.

33. The social welfare services management apparatus according to claim 18, wherein the software instructions further comprise:

receiving input of placements of at least two of the entities, wherein the at least two of the entities are children;

sorting the placements into bins representing unique permutation of placement types; and displaying the sorted placements in a placement trajectory diagram.

34. The social welfare services management apparatus according to claim 33, wherein the placement trajectory diagram is an icicle diagram and wherein each block in the generated diagram is user-interactive.

35. The social welfare services management apparatus according to claim 18, wherein the government defined unit of work comprises: referring social services to the minor child or at least one of the entities linked to the minor child and wherein the performing the government defined unit of work comprises generating notes in which user free style input is structured into a plurality of predetermined fields.

36. A non-transitory computer readable medium storing software instructions to execute an entity-centric social welfare services management method with a temporal aspect, comprising:

receiving, by a computer, user input data about at least one minor child and entities and storing the received user input data in a memory;

automatically linking, by the computer, said at least one minor child and the entities based on relationships between said at least one minor child and the entities;

assigning to each of the entities, in relation to the at least at least one minor child, a relationship category from among a plurality of relationship categories comprising a family member, a formal support person, and an information support person;

organizing and storing in the memory the input data based on the automatic linking in an entity-centric datastore;

generating at least one view comprising information about said at least one minor child and said assigned categories of said entities, each with a respective temporal attribute indicating a duration of a relationship in the assigned category with respect to the at least one minor child and information about a government defined unit of work; and controlling the generated at least one view to perform a government defined unit of work based on received input, wherein the government defined unit of work relates to the social welfare services, and wherein the organizing of the input data is primarily based on the relationships of the entities with respect to the at least one minor child, wherein the temporal attribute tracks the duration of the respective assigned category of the relationship between the at least one minor child and each of said entities, thereby temporally tracking relationships in the entity-centric datastore, and wherein the family member category comprises a kin type sub-category.

37. The social welfare services management method according to claim 2, wherein:

the linking comprises linking a plurality of entities involved in a plurality of different cases, thereby integrating a plurality of sources of social welfare services information into the entity-centric datastore, the family member category further comprises a household subcategory in which one of the entities resided with the minor child and the temporal attribute indicates the duration said one of the entities resided with the minor child and the kin subcategory indicates family related to the minor child and the temporal attribute is unrelated to interactions with the minor child, and the automatic linking is based on a longitudinal data model.

38. The social welfare services management method according to claim 37, further comprising:

generating a new case comprising identifying at least one of the entities involved in the case;

searching for the identified entity in a datastore, which stores a plurality of linked entities;

assigning the identified entity found during the searching to the generated new case; and automatically assigning at least one additional entity to the generated new case based on the linking of the assigned found entity to said assigned at least one additional entity.

39. The social welfare services management method according to claim 38, further comprising:

searching the datastore for said at least one additional entity based on the assigned entity and said linking; and determining whether a current relationship exists between the assigned entity and each of said at least one additional entity found during the searching, wherein, in response to the determining yielding that the relationship is current between the assigned entity and a respective one of said at least one additional entity found during the searching, the automatically assigning said at least one additional entity to the generated new case comprises automatically assigning the at least one additional entity, wherein the current relationship indicates that the relationship is ongoing and no end date is provided.

40. The social welfare services management method according to claim 1, wherein said data about entities comprises general information about the respective entity, history information comprising a timeline of events and the relationships associated with the respective entity, and service information, and wherein the performing the government define unit of work comprises determining potential foster parents to said at least one entity from among said other entities based on the history information and the relationships of said other entities with respect to said at least one entity.

* * * * *